US008542593B1

(12) United States Patent
Kumar et al.

(10) Patent No.: US 8,542,593 B1
(45) Date of Patent: Sep. 24, 2013

(54) SYSTEM AND METHODS FOR ERROR TOLERANT CONTENT DELIVERY OVER MULTICAST CHANNELS

(75) Inventors: Derek D. Kumar, San Jose, CA (US); Gregg Brian Levin, Los Altos, CA (US)

(73) Assignee: Vucast Media, Inc., Sunnyvale, CA (US)

( * ) Notice: Subject to any disclaimer, the term of this patent is extended or adjusted under 35 U.S.C. 154(b) by 265 days.

(21) Appl. No.: 12/908,853

(22) Filed: Oct. 20, 2010

Related U.S. Application Data

(63) Continuation-in-part of application No. 12/728,094, filed on Mar. 19, 2010, and a continuation-in-part of application No. 12/728,108, filed on Mar. 19, 2010.

(60) Provisional application No. 61/365,310, filed on Jul. 16, 2010.

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl.
USPC ........... 370/235; 370/236; 370/312; 370/390; 380/279; 380/280; 380/281; 380/284; 713/160; 713/162; 713/163; 713/165; 713/168

(58) Field of Classification Search
USPC .................... 370/235, 236, 312, 390, 395.52; 380/239, 242, 270, 33, 43, 279–281, 284; 713/151, 153, 155, 160, 162–163, 165, 168
See application file for complete search history.

(56) References Cited

U.S. PATENT DOCUMENTS

| | | | | |
|---|---|---|---|---|
| 8,005,216 B1* | 8/2011 | Agrawal | ........................ | 380/200 |
| 2003/0046539 A1* | 3/2003 | Negawa | ........................ | 713/163 |
| 2004/0123109 A1* | 6/2004 | Choi | ............................ | 713/176 |
| 2005/0259584 A1* | 11/2005 | Chen et al. | .................... | 370/238 |
| 2006/0007930 A1* | 1/2006 | Dorenbosch | .................. | 370/390 |

(Continued)

*Primary Examiner* — Benjamin H Elliott, IV
(74) *Attorney, Agent, or Firm* — Raj Abhyanker, P.C.

(57) ABSTRACT

In one embodiment of the invention, a system and method for error tolerant delivery of data is provided. A data file is received for transmission which includes metadata and data. The metadata includes mandatory portions and optional portions, which are grouped together, respectively. The mandatory portions of the metadata include file control data. The file is parsed into packets and transmitted as a data stream to a plurality of receiver devices. In some cases this data stream may be transmitted multiple times for redundancy. Once the data stream is received, the receiver device may look for transmission errors in the control data of the data stream. If such an error is present the data stream is discarded; otherwise, the receiver device converts the data stream back into the native file format and stored for later playback or queued processing. In some other embodiments, a data rights management (DRM) file is encrypted using a master key, which, in turn, is encrypted with a unique encryption key for each copy of the file. The unique encryption corresponds to a single target receiver. The system may bifurcate each data file into the common encrypted content and the uniquely encrypted portion. The commonly encrypted portion of the file may be transmitted to a plurality of receiver devices using a multicast transmission medium, and the relatively small uniquely encrypted portions may be transmitted in a unicast method to each receiver individually. The receiver device may then reconstitute the DRM data file.

10 Claims, 38 Drawing Sheets

(56) References Cited

U.S. PATENT DOCUMENTS

| | | | |
|---|---|---|---|
| 2006/0085553 A1* | 4/2006 | Rachwalski et al. | 709/233 |
| 2006/0221963 A1* | 10/2006 | Takayanagi et al. | 370/390 |
| 2007/0078009 A1* | 4/2007 | Lockton et al. | 463/43 |
| 2009/0187593 A1* | 7/2009 | Chen et al. | 707/104.1 |
| 2010/0165974 A1* | 7/2010 | Nibe | 370/350 |
| 2011/0197111 A1* | 8/2011 | Zhang | 714/785 |

\* cited by examiner

SYSTEM AND METHODS FOR ERROR TOLERANT CONTENT DELIVERY OVER MULTICAST CHANNELS

CROSS REFERENCE TO RELATED APPLICATIONS

This non-provisional application claims the benefit of provisional application No. 61/365,310, filed Jul. 16, 2010, by Derek D. Kumar and Gregg Brian, entitled "System and Methods for Error Tolerant Content Delivery Over Multicast Channels", which application is incorporated herein in its entirety by this reference.

This application is also related to an application being filed concurrently herewith by Derek D. Kumar and Gregg Brian Levin, Ser. No. 12/908,850, entitled "System and Methods for Reducing Power and Cost When Delivering Content Over Multicast Channels", which claims priority to provisional No. 61/365,309, filed Jul. 16, 2010, entitled "System and Methods for Reducing Power and Cost When Delivering Content Over Multicast Channels", by Derek D. Kumar and Gregg Brian Levin, which are incorporated by reference herein for all purposes.

This application is a continuation in part to co-pending application Ser. No. 12/728,094 filed Mar. 19, 2010, entitled "System and Methods for Delivering Content Efficiently Over Multicast Channels", by Derek D. Kumar, Hui Huo, Tamilselvakumar Vengan, and Nagendra Siravara, which is incorporated by reference herein for all purposes.

Further, this application is also a continuation in part to co-pending application Ser. No. 12/728,108 filed Mar. 19, 2010, entitled "System and Methods for Receiving and Correcting Content Transmitted Over Multicast Channels", by Derek D. Kumar, Hui Huo, Tamilselvakumar Vengan, and Nagendra Siravara, which is incorporated by reference herein for all purposes.

BACKGROUND OF THE INVENTION

The present invention relates to content delivery systems and methods. More particularly, the present invention relates to systems and methods for reducing the power requirements and cost for delivering content over multicast channels, such as Radio Frequency (RF) spectrum. In some embodiments, this content delivery may provide content on a one-to-many (multicast) platform whereby a central broadcaster transmits data to a plurality of receiver devices. The receiver devices may, in some embodiments, be configured to postpone processing of the content in order to minimize processor requirements. This method enables the receiver devices to maintain a lower overall cost. Furthermore, existing non-receiver-enabled devices, e.g., a remote controller, may be readily enhanced to enable it to receive content via transmission with minimal increase in cost, since the major components may also be used, e.g., during less active periods, to perform tasks associated with the receipt and processing of the transmitted content. Further, devices may be enabled to selectively shut down the receiver until an awaited transmission is being sent, thereby reducing power requirements on the receiver devices. This enables receivers to have smaller battery supplies, enhanced battery life, reduced cost and a better user experience.

As is well known by those skilled in the art, modern digital data communication networks may require the delivery of frames or packets of data (datagrams) from a source endpoint to one or more destination endpoints. Additionally, digital data may instead be streamed. A unicast transfer is the delivery of datagrams, or streamed data transmission between one source endpoint and one destination endpoint. A multicast transfer is the delivery of datagrams between one source endpoint and a subset of possible destination endpoints. The method of transfer depends upon the underlying physical medium used to accomplish data transfer. Physical media used to deliver datagrams include, but are not limited to, short-range unlicensed wireless, long-range unlicensed and licensed wireless, satellite, optical fiber, cable, hybrid fiber/cable and direct point-to-point wiring, among others. Certain media are, by their inherent nature, more suited towards unicast or multicast transfers. In a wireless environment, many endpoints may be within the same radio-frequency (RF) signal coverage, especially in the case of centralized, high-powered transmissions such as radio, satellite, and television.

In particular circumstances the use of a multicast delivery platform may have distinct advantages over unicast delivery. These advantages usually include overcoming financial constraints, and availability constraints.

Availability constraints are most easily exemplified in the context of developing countries, where the infrastructure for a unicast (cellular) network is simply lacking. For example, in many parts of India there is a lack of cellular networks. Delivery of content by cable is likewise unavailable in many cases. Often a single video feed will service an entire village or set of villages. However, while unicast delivery of data is unavailable, there is often radio broadcast coverage in these under-developed regions. The reasons for this are numerous: radio technology is older, and established infrastructures are existent; cost of broadcast on a radio tower is relatively inexpensive; and each radio transmitter covers a very wide area. Further, even if a region isn't serviced by radio transmissions, the cost of installing this kind of an infrastructure is typically within practical reach, as opposed to cellular networks which require large capital investment. Moreover, even in regions that have an established cellular network, access to this network may be prohibitively costly for a large portion of the population.

Thus, if content is distributed via a multicast system, such as using radio frequency (RF) signals, individuals in such areas may gain access to a great deal more information and media content than is currently available. In the India example, this may be utilized to meet particular cultural desires, such as sports (i.e., soccer and cricket) content.

While availability constraints are most easily seen in developing areas where alternative content delivery systems are nonexistent, or too costly for much of the population, other locations and scenarios exist where multicast transmission of content may be preferred due to availability constraints. One such scenario may include a disaster zone where other content delivery systems are either down, or are saturated beyond their ability to properly work. During an emergency, the load on a cellular network increases dramatically. Even if the cellular network is unaffected by the emergency itself, the additional load often results in an overload of the system, wherein many users are unable to access the network resources. Such a strategy is utilized, maliciously, in denial-of-service attacks. Thus, reliable delivery of content through multicast transmission may be particularly useful in emergency situations.

In a similar vein, particular areas of the world have large concentrations of people. Ironically, these areas have the most developed unicast infrastructures for unicast delivery; however, technological limitations, and the sheer density of persons may saturate local networks. An example of this is in New York City, where the density of 3G enabled mobile devices has the propensity to saturate the network and limit cellular connectivity. Again, in such situations, content delivery by multicast may be particularly beneficial as it avoids already saturated unicast networks.

As important as availability constraints, there are financial constraints which may be overcome by using multicast networks for content delivery as well. The financial benefits of multicast are pronounced when common content is being delivered to a large number of receiver devices. This is because, in unicast delivery, network capacity is consumed for each endpoint, even if all endpoints are receiving the same content. Thus, to unicast a video clip to, say, a million users in a metro area requires one million transmissions of the content. In multicast, by comparison, transmission costs are reduced because each piece of content requires only a single transmission. Thus, for the above example, a single transmission of the video clip is sufficient to provide the content to all one million users.

An additional financial constraint is the cost of network connection electronics. Embedding a transceiver (like a 3G cellular modem) into a device is much more costly than embedding a simple receive-only device like an FM data receiver. The savings result both from the absence of transmit circuitry (and the lower power requirements of receivers vs. transmitters), as well as the complexity of the protocols involved in supporting two-way devices on a mobile network. Also, network infrastructure support for two-way data services is inherently more costly than for one-way multicast receiver devices, where both upstream and downstream capacity must be provisioned, and where network infrastructure must be densely deployed so that relatively low-power endpoints can successfully transmit data back to base station locations.

The impact of financial constraints to content delivery may be easily explained through e-reader (e-book) examples. E-readers, such as Amazon's Kindle® and Barnes & Noble's Nook®, are mobile electronic devices which receive and display written content. E-readers are designed to replace paper bound books, newspapers and magazines. In order to offer an effective alternative to traditional printed books and periodicals, e-reader devices must have prolonged battery life, similar weight, convenience, and comparable media costs as compared to printed media. Amazon's Kindle® is currently the leader in e-reader sales and usage. Part of Amazon's success with their e-reader is that the user pays for the device and for content, the wireless plan and back-end costs are managed by Amazon without further cost, or inconvenience, to the user. Thus, the user is not required to pay for or manage a wireless service plan for the device. This is problematic for the distributor, however, since they must manage and pay for the content delivery via the cellular network. While the burden for the delivery costs may be somewhat shifted to the user, content costs must remain "reasonable" in order to compete with traditional print media.

In the case of Amazon's Kindle®, this is mitigated by delivering small sized files to the e-reader device. In general, text-based content is typically less than a megabyte. Magazines and newspaper articles are purposefully 'stripped' of images and graphics to prevent content sizes from growing beyond a couple megabytes in size. However, to address user demand for full 'rich' versions of content, as well as emerging, even richer versions of content, there is a need to deliver much larger sized content. For example, a typical magazine, with photos intact, can easily reach tens of megabytes in size; a Sunday local newspaper with all advertising supplements may reach over one hundred megabytes in size. The cellular network data delivery costs for content in these size ranges far exceeds the prices that subscribers are willing to pay for the content. Thus, truly "rich" content becomes financially prohibitive to deliver on these devices without shifting wireless plan charges to the user. This is where multicast delivery again provides companies with a competitive advantage by enabling the transmission of "rich" content to a large number of e-reader devices for virtually the same cost as a single transmission. Between financial restraints, and availability constraints, a number of scenarios emerge where multicast may be of particular benefit. These include 1) entertainment content such as sports, music and video segments; 2) digital signs; 3) emergency services; 4) advertisements/schedules for busses/trains; 5) saturated 3G markets; 6) developing countries; 7) brand displays 8) E-readers; and 9) software or database updates for consumer/commercial electronics devices.

In addition to the strong benefits for using multicast to deliver content in particular situations, there is also very little cost associated with developing devices capable of receiving multicast signals over radio frequencies (RF). First, FM receivers are very low cost devices, typically costing no more than one dollar. Second, many devices that already provide FM radio reception and contain the hardware components necessary to receive multicast transmissions. Third, many products contain the hardware necessary to receive FM transmission even though they do not provide FM radio interfaces to users; this is because many combo chipsets designed today include a RF receiver as part of the chip design. These combo chips often include a digital FM filter, an analog to digital (A/D) converter, and a digital signal processor (DSP).

This is the case because chip sizes with or without a small RF receiver typically remain the same; however the circuitry is constantly being reduced in size for power and processing benefits. Thus, there is typically an excess of available room on a typical chip for additional circuitry. The cost to include frequency modulated (FM) radio tuner circuitry on these chips becomes minimal for the chip manufacturers. In fact, the cost of including the FM circuitry on the chip is often substantially lower than generating multiple chip types. A manufacturer packs as much functionality on a combo chip as possible to reduce manufacturing costs and allows the purchaser to use whichever function it desires in their device. Thus, many combo chips include a FM tuner circuit in case a purchaser of the chip desires its functionality. Thus, many devices which do not currently have FM receiver functionality actually include the required hardware to enable the receipt of these signals. In many cases, minor firmware changes are all that is necessary to enable current devices to become capable of receiving radio multicasts.

In view of the foregoing, systems and methods for reducing power and cost for the delivery of content over multicast channels, such as radio frequency spectrum, are disclosed. The present invention provides methods and systems for reducing the need for additional hardware components in receiver devices, as well as minimizing power requirements for multicast receiver devices. Such a system may be utilized to enable a wider range of devices to be connected to external data, and further may remove logistic and financial hurdles to the sale and operation of wirelessly connected consumer devices.

SUMMARY

Embodiments of the present invention disclose systems and methods for error tolerant delivery of data. In these embodiments, a data file is received for transmission. The file includes metadata and data, and the metadata includes mandatory portions and optional portions. The optional portions of the metadata are grouped together, and the mandatory portions of the metadata are grouped together in a separate grouping. The mandatory portions of the metadata include file control data, and the optional portions of the metadata include descriptive metadata.

The file is reordered such that metadata comes before the data. The file is then parsed into packets and transmitted as a data stream. A file header is transmitted prior to the parsed packets.

The data stream may be sent to a plurality of receiver devices includes a multicast transmission. In some cases this data stream may be transmitted multiple times for redundancy. This number of times may be a set number, according to a delivery schedule which has a decay in retransmit frequency, or may include a cost minimization optimization.

Once the data stream is received, in some embodiments, the receiver device may look for transmission errors in the control data of the data stream. If such an error is present the data stream is discarded. However if there are no errors in the control data the receiver device may convert the data stream back into the native file format. The converted file is stored within a receiver device for later playback or queued processing.

Some embodiments may also be able to correct for errors in the content data of the data stream. However, if the errors are too numerous, the device may also be able to discard the file as well.

In some other embodiments of the invention, a system and method for transmitting data rights management (DRM) data is provided. In these embodiments a DRM file for content is received. The file is encrypted using a master key, which, in turn, is encrypted with a unique encryption key for each copy of the file. The unique encryption corresponds to a single target receiver. The system may be enabled to bifurcate each data file into the common encrypted content and the uniquely encrypted portion.

The commonly encrypted portion of the file may be transmitted to a plurality of receiver devices using a multicast transmission medium. In contrast, the relatively small uniquely encrypted portions may be transmitted in a unicast method to each receiver individually.

The multicast platform may include a frequency modulated radio signal, in some embodiment. In contrast, the unicast transmission includes transmission over any of a cellular network, a digital television signal, a short range wireless channel, power line carrier, optical transmission, infrared transmission, satellite transmission, and a physical multicast channel.

The receiver device may then receive the commonly encrypted data, as well as its uniquely encrypted file header. The data file may then be reconstituted by the receiver device. The unique portion may be decrypted by decryption keys loaded within the device. This decodes the master key, which may then be utilized to decode the common portion of the file.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION

Figure 1:
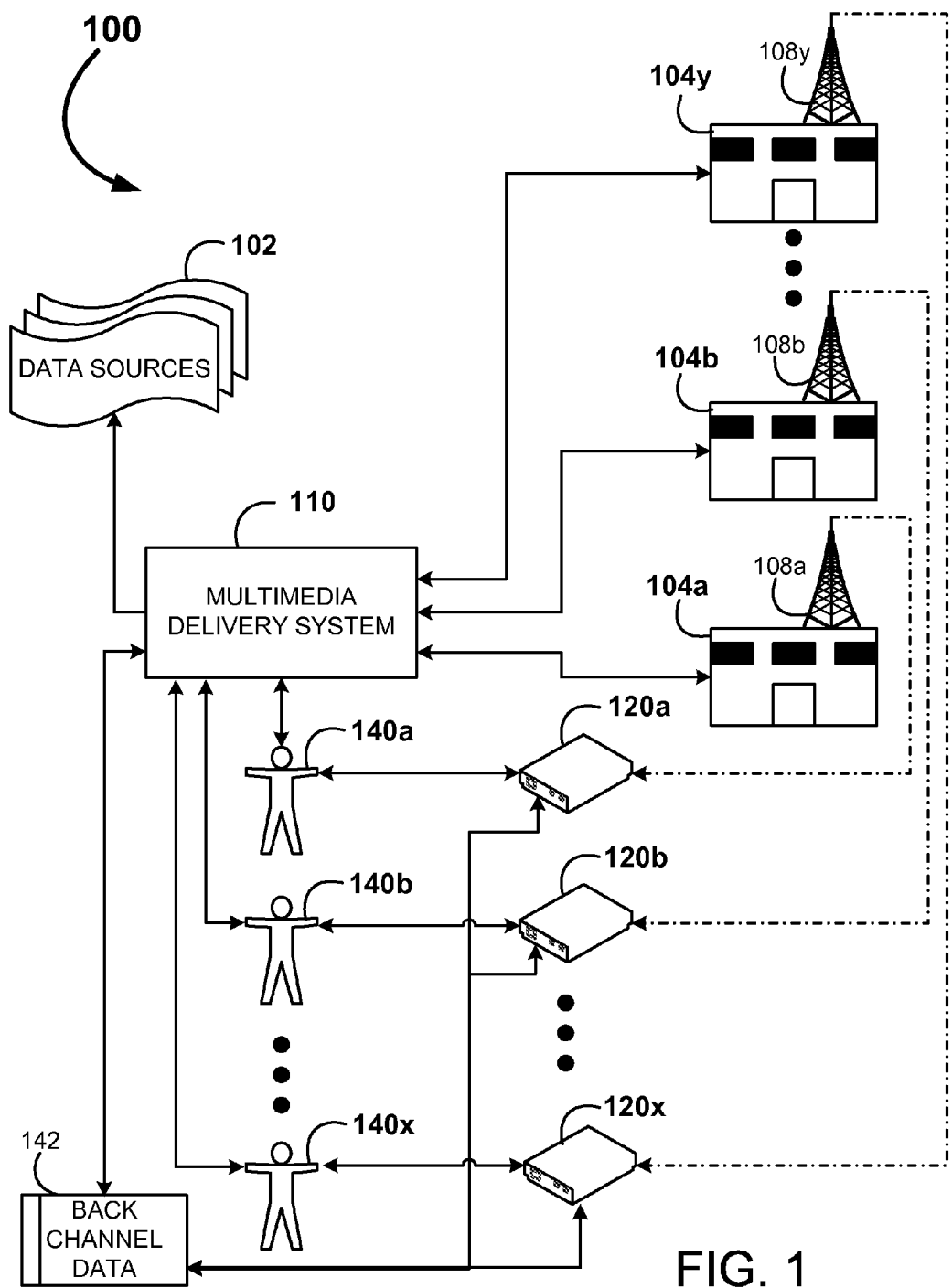
FIG. 1 is a structural block diagram of an example of a secure content delivery system in accordance with an embodiment of the present invention.

The present invention will now be described in detail with reference to selected preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Certain embodiments of the present invention relate generally to systems and methods for reducing power consumption and cost when delivering content over multicast channels. In some embodiments, the multicast channels may include underutilized Radio Frequency (RF) spectrum. In general, the system and methods aim to reduce the need for additional hardware in existing electronic devices in order to minimize overhead costs associated with content delivery over multicast radio media. Further, by reducing the time the receiver is active; power requirements for devices may be significantly reduced. This enables smaller, cheaper and more user-friendly devices.

In some embodiments, the content delivery system is capable of effectively providing content on a one-to-one (unicast), one-to-many (multicast), and one-to-all (broadcast) basis, while a central broadcaster transmits data to a subset of receiver devices. In some embodiments, the content may be encrypted utilizing predefined content encryption keys to ensure particular content is only viewable by a subset of receivers (which includes the corresponding content decryption key). In other embodiments, the content may be transmitted in the clear. Content transmissions, regardless of encryption status, include one or more authentication key identifiers for authentication purposes and therefore proper routing of the content. For the sake of this application, the term "broadcast" may be defined as sending information from a source to all destinations simultaneously. In some embodiments, the system takes advantage of the distributed nature of the Internet and broadcast capability of FM/TV transmission to create an efficient unicast and/or multicast network for data delivery.

Note that, in the remainder of this application, particular attention will be placed upon transmission through radio towers. Further, attention is placed upon coding content for transmission on Frequency Modulated (FM) radio subcarrier signals (viz., SCA subcarriers). It is intended, however, that the present invention be adapted for use with any broadcast media type, regardless of origin or spectrum. Thus, satellite transmission, television, AM frequencies, in band on-channel (IBOC) broadcasting in the AM and FM bands, and other broadcast signals may be also suited for use in conjunction with the present content delivery system.

The following description of some embodiments of the present invention will be provided in relation to numerous subsections. The use of subsections, with headings, is intended to provide greater clarity and structure to the present invention. In no way are the subsections intended to limit or constrain the disclosure contained therein. Thus, disclosures in any one section may apply to other sections, as is applicable.

I. Secure Content Delivery System

FIG. 1 is a structural block diagram of an example of a Content delivery system 100 in accordance with an embodiment of the present invention. A Multimedia Delivery System 110 may access Data Sources 102 in order to compile the content for multicasting. The Data Sources 102 may include any public data source (i.e., free-to-distribute content) as well as possible private databases (such as individual or corporate datasets, and/or data uploaded by the user). The Multimedia Delivery System 110 may determine which content is to be delivered, as well as delivery time requirements, through accessing of user profiles. The Users 140a to 140x may directly access the Multimedia Delivery System 110 in order to set up and personalize these profiles. The user profiles may be generated and accessed through a web-based application, web-service or mobile applications, in some embodiments.

In some embodiments, the Multimedia Delivery System 110 may provide the content to be transmitted to any of a plurality of Stations 104a to 104y. The Stations 104a to 104y may, in some embodiments, generate a Subsidiary Communications Authority (FM SCA) transmission signal for transmission via the Transmitters 108a to 108y. Additionally, other known methods of data multiplexing may likewise be utilized for the transmission of content datagrams. The transmitted data may then be received and decoded by each of the Receivers 120a to 120x. Each of the Transmitters 108a to 108y may include a particular known geographic coverage. Therefore, the data deter-mined to be sent to a particular Receiver 120a may be routed by the Multimedia Delivery System 110 to one or more of the particular Stations 104a to 104y such that the data is broadcast to an area capable of being received by the targeted Receivers 120a to 120x.

In some embodiments, one or more of the Receivers 120a to 120x may be associated with a given User 140a to 140x. In some cases, any particular User 140a to 140x may have multiple Receivers 120a to 120x. For example, where the particular User 140a is a corporation, it may be desirable for each of its managers to have access to a Receiver 120a. Moreover, given the range of devices a Receiver 120a may be integrated into, a single individual may wish to have a variety of Receivers 120a to 120x for personal use.

As will be discussed in greater detail below, each Receiver 120a to 120x may include one or more authentication keys associated with the device, as well as one or more user decryption keys associated with the device. The identity of these authentication keys and/or user decryption keys may be known by the Multimedia Delivery System 110 through reference to an internal key registry and/or access to the user (subscriber) profile. The Multimedia Delivery System 110 may encrypt content intended for a particular receiver with a content encryption key corresponding to one of the content decryption keys included in that receiver. Other times content may remain unencrypted when security of the transmission is not at issue. For example, emergency notifications may be transmitted in the clear as there is little need for security. In fact, it may be advantageous for emergency notifications to be as widely distributed as possible. The system may further embed an authentication key identifier with the content indicating which receivers the content is intended for. Likewise, an authentication tag is included in a separate field in the content packet. The authentication key identifier indicates which authentication key loaded within the receiver to utilize for the authentication protocol. The authentication result is then compared to the authentication tag to determine authenticity of the data. Thus, the authentication key identifier paired with the authentication tag may facilitate routing of the datagrams. Thus, the Receivers 120a to 120x may monitor the authentication key identifiers embedded with the broadcasts to efficiently select from the broadcast stream the data packets which they have a authentication key for. Further, the content decryption keys may be utilized by the Receivers 120a to 120x to decrypt particular received encrypted content which is intended for the particular Receiver 120a, when applicable. Thus, a wide range of data may be broadcast over a particular geographical area, yet the intended recipients of particular content authenticate the datagrams. Further, when desired, content may be transmitted securely (encrypted) and only the intended receivers are allowed access to that content.

Note that in some embodiments, each receiver may initially include a user decryption key or keys. Thereafter, additional content decryption keys may be sent to the receiver and/or content decryption keys may be updated at any later given point, via an encrypted transmission that includes a new or updated content decryption key. This transmission may be encrypted using the initial user encryption key which is the counterpart to the user decryption key which was preloaded within the receiver. In some embodiments, each user decryption key may be unique to that given receiver. Likewise, the authentication keys stored within a given receiver may be updated in a similar manner. Further, instructions for the proper management of key may be received. These instructions may direct the receiver to delete unused or cancelled authentication keys and/or decryption keys.

Occasionally, as with any broadcast system, there may be data corruption or loss. To address this issue, the Receivers 120a to 120x may compile data regarding device status and content received. This information may be provided over a backchannel as Backchannel Data 142 to the Multimedia Delivery System 110. The backchannel, in some embodiments, uses a different media than the transmitted data. For example, a modem, or cellular network may be readily adapted for use as the backchannel. As the volume of Backchannel Data 142 is relatively small, there is very little burden placed upon the backchannel networks.

The Backchannel Data 142 may be analyzed by the Multimedia Delivery System 110 to determine which data packets have been received and which been lost or corrupted. Thus, the Multimedia Delivery System 110 may utilize this Backchannel Data 142 to determine retransmission of particular content to the Receivers 120a to 120x. Retransmission may occur via the FM SCA, and/or may include transmission over the backchannel medium as well, to ensure proper delivery. In some embodiments, the receivers may send periodic status messages regarding content received to the Multimedia Delivery System 110. The Multimedia Delivery System 110 may then perform the analysis on the backchannel data when the status messages are received.

In yet other embodiments, the receivers may be configured to be able to monitor completeness of transmissions, and may be able to identify transmission failures and losses, including the failure of particular data packets to arrive or decrypt. In these embodiments, the receivers may communicate with the Multimedia Delivery System 110 via the backchannel when a transmission failure occurs.

Figure 2:
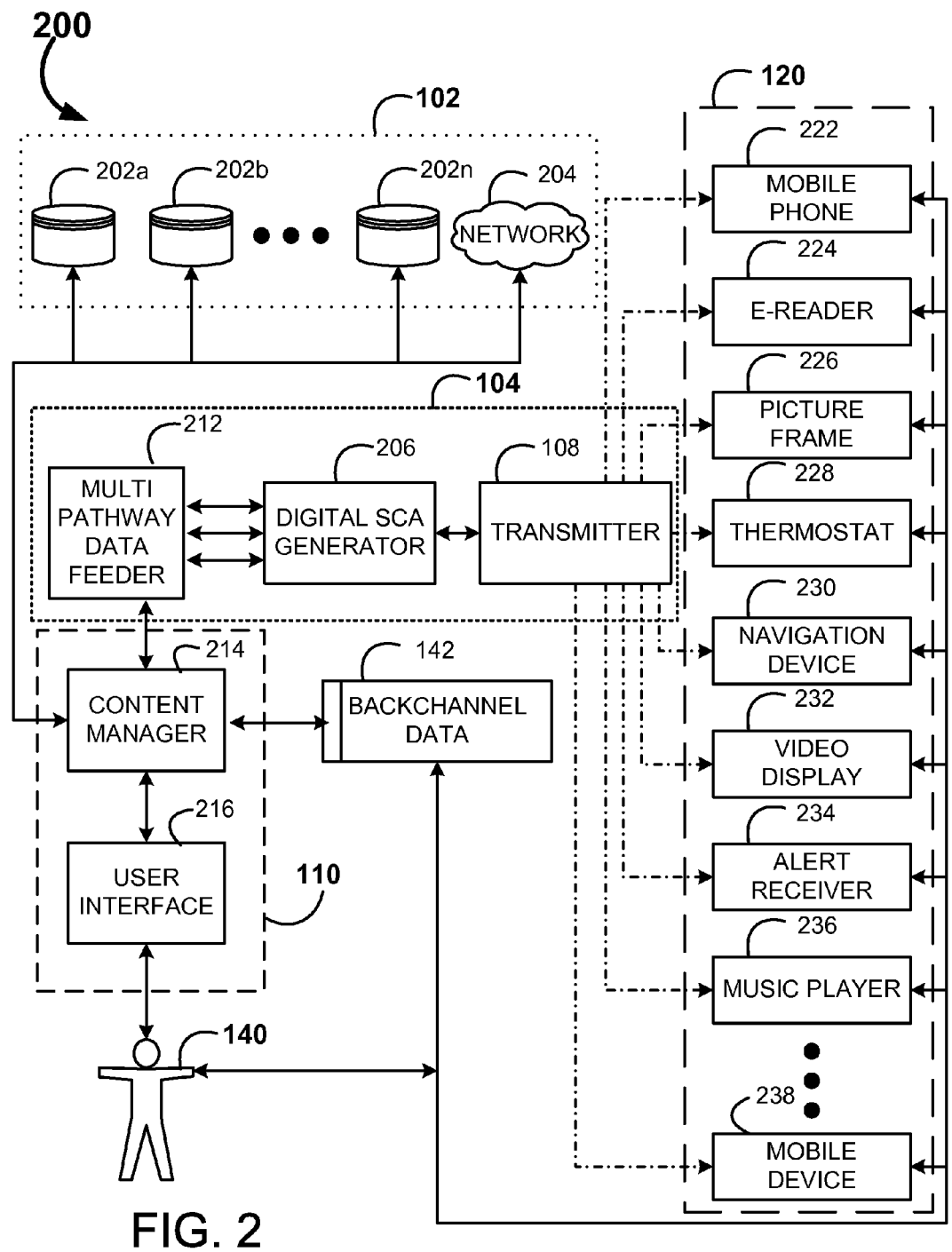
FIG. 2 is a detailed structural block diagram of the multimedia delivery system providing content to a variety of receiver devices in accordance with an embodiment of the present invention.

FIG. 2 is a detailed structural block diagram of the Multimedia Delivery System 110 providing content to a variety of Receivers 120a to 120x in accordance with an embodiment of the present invention. Here particular components of the Content delivery system 100 may be seen illustrated in greater detail as to enable a greater understanding of a particular embodiment of the present invention.

For example, a Receiver 120 may be seen as including a variety of devices, including, but not limited to Mobile Phone 222, E-Reader 224, Digital Picture Frame 226, Thermostat 228, Navigation Device 230, Video Display 232, Alert Receiver 234, Music Player 236 and any other applicable Mobile Device 238. The Multimedia Delivery System 110 may securely and efficiently provide useful data to each of these device types. For example, a Mobile Phone 222 equipped with a receiver may receive mobile formatted content. The user may have the ability to choose and personalize the content; the system may, in some embodiments, intelligently schedule and deliver the content in the right format to the targeted mobile device at the appropriate time. Likewise, the E-Reader 224 may receive personalized content such as electronic books, electronic newspapers and electronic periodicals. A Digital Picture Frame 226 may receive digital photos, advertisements and videos.

A Thermostat 228 may receive information relating to demand response and load balancing, for energy management and saving, in some embodiments. For example, during peak load situations, utility companies could send digital data to targeted thermostats over FM channels. The Thermostat 228 may automatically adjust to run more efficiently in response to these instructions. Information such as system status, weather, pricing, emergency status, etc., may also be sent to thermostats equipped with receivers.

A targeted Navigation Device 230 may receive traffic information, road conditions, weather updates, driving maps, etc., in some embodiments. A Video Display 232 equipped with a receiver may receive and store the content in local storage and render the content. This could be used in commercial as well as non-commercial applications, in some embodiments, to disseminate multimedia content. An Alert Receiver 234 may receive emergency alerts or disaster management information. This information may be broadcast in localized areas or over a broad area depending on the need. Using the unicast and multicast capabilities of the system, the information may be targeted to the receivers in a localized areas affected by the emergency situation. The end devices could, in some embodiments, include handheld devices or devices installed in public places, or personal mobile devices equipped with the receivers. Other Mobile Devices 238 may include computer systems, automobiles, PDA's or similar device types.

As noted before, the User 140 may access the Receiver 120 (regardless of device type the Receiver 120 is integrated into) for consumption of the received content. Likewise, the Receiver 120 may generate the Backchannel Data 142 as noted before.

The User 140 may access the Multimedia Delivery System 110 via a User Interface 216. The User Interface 216 may, in some embodiments, include a web-based application, web-service or mobile applications for the personalization of the user profile. The User 140 may choose the content and sets preferences for the delivery of the content based on location, time, etc. The User Interface 216 may couple to a Content Manager 214 for generation of a content schedule. One embodiment of the User Interface 216 is explored in more detail below in conjunction with FIG. 3.

Figure 4:
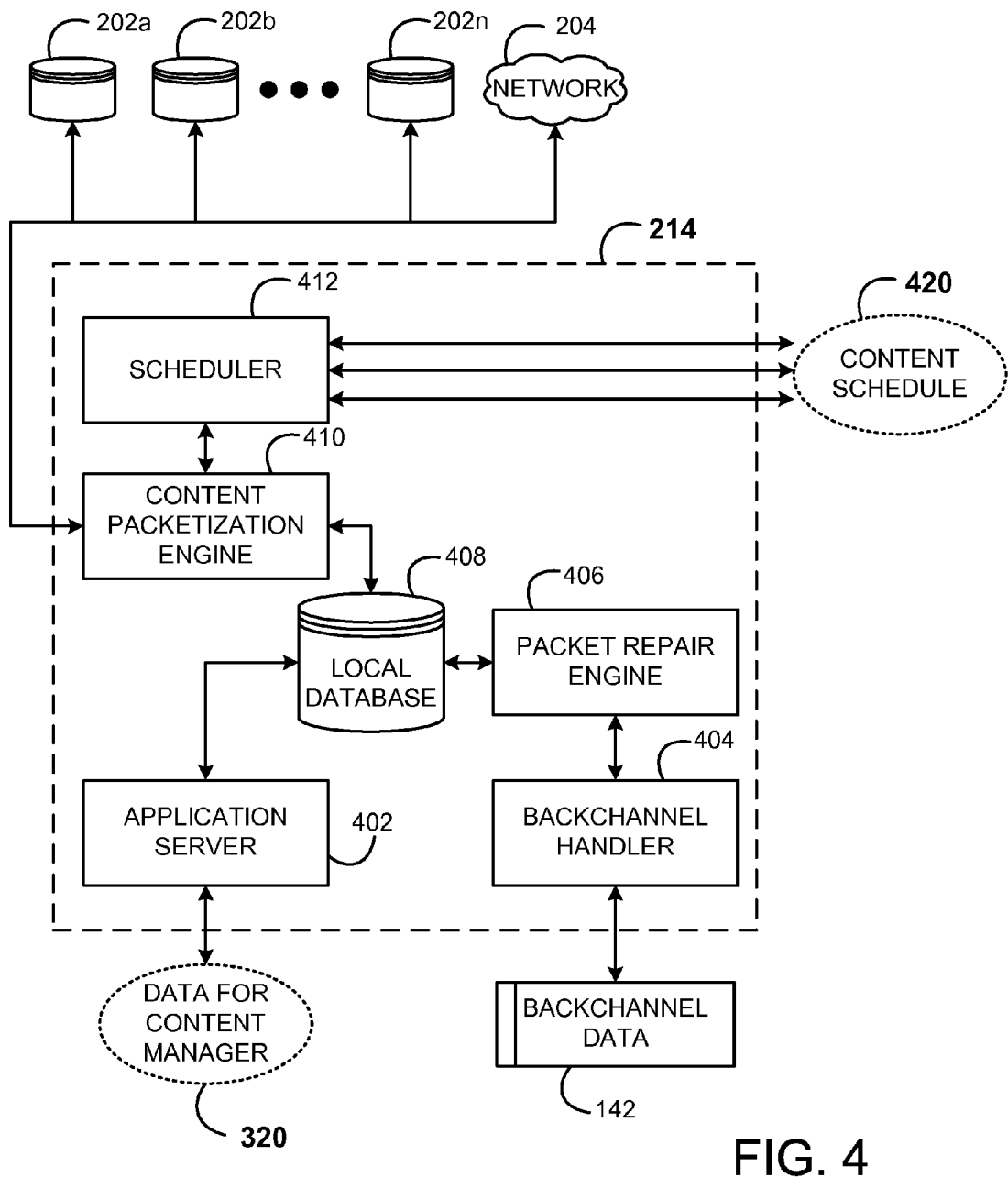
FIG. 4 is a structural block diagram for a content manager of the multimedia delivery system in accordance with an embodiment of the present invention.

The Content Manager 214 may access the Data Sources 102 to manage content collection and delivery scheduling. The Content Manager 214 may, in some embodiments, intelligently schedule delivery of content to various targeted devices taking into account the bandwidth available for broadcast transmissions, time at which the content needs to be received by the receiver, and size of content to be broadcast. This allows for efficient use of the FM bandwidth in broadcasting data (content) to a large number of receivers, with different items of data content effectively being broadcast, multicast and unicast, all from the same transmission source. One embodiment of the Content Manager 214 is explored in more detail below in conjunction with FIG. 4.

The Data Sources 102 may include a plurality of sources labeled 220a to 220n. These sources include, but are not limited to, video databases, music databases, picture databases, personal databases, public databases, corporate databases, and virtually any other content the User 140 has authorized access to. Content may also be uploaded using the application user interface by the user or users. For some content, automated software tools may be used to upload content without further manual intervention, for example, uploading scheduled content which is regularly updated from a known location. Additionally, the Data Sources 102 may include any content accessible from the Internet 204. Thus, a virtually infinite amount of content may be available for delivery based upon user preferences and accessibility. In general, content data may be stored as files on traditional file systems or in other forms such as BLOBS (Binary Large Objects) or other storage mechanisms.

After collecting the required content and generating the content schedule, the Content Manager 214 may provide the content to a Multi-Pathway Data Feeder 212. The Data Feeder 212 parses the content file in packet format, reads the packets, adds an RTP header and sends the packets to the SCA generator subject to the constraints of the SCA generator (e.g., throughput limitations). In some embodiments, the Multi-Pathway Data Feeder 212 pumps content data to the Subcarrier Generator 206 on multiple pathways. These pathways may include logically and physically distinct data paths. Each pathway may carry different content types; for example, audio, video, images, etc. The Multi-Pathway Data Feeder 212 may be capable of identifying different content type and guiding them through multiple pathways. The content may be packetized and, when appropriate, encrypted for security. In some alternate embodiments, the content packetization and, when appropriate, encryption may be preformed by the Content Manager 214 prior to receipt by the Multi-Pathway Data Feeder 212. The Multi-Pathway Data Feeder 212 may also embed the content key identifiers in the data packets of the content to facilitate key based routing.

The Subcarrier Generator 206 may be configured to, in some embodiments, combine various input data sources and generate the FM subcarrier signal. The subcarrier signal, as will be discussed in greater detail below, may be injected into the SCA port on a standard FM transmitter 108 which connects to an FM tower. The Subcarrier Generator 206 may be configured to occupy specific bandwidth in the allocated FM spectrum. Every targeted Receiver 120 is, in some embodiments, coded with one or more content authentication keys before it may authenticate the content. Also, when applicable, the target receiver is coded with one or more decryption keys such that it is capable to decrypt the content. Authentication key identifiers may be embedded with the content (regardless of encryption status) for authentication purposes. The content to specific targeted devices may thus be routed based on the authentication key(s) resident on each receiver. Likewise, when content is encrypted, only a receiver with a specific content decryption key or keys may decode particular encrypted content.

Figure 3:
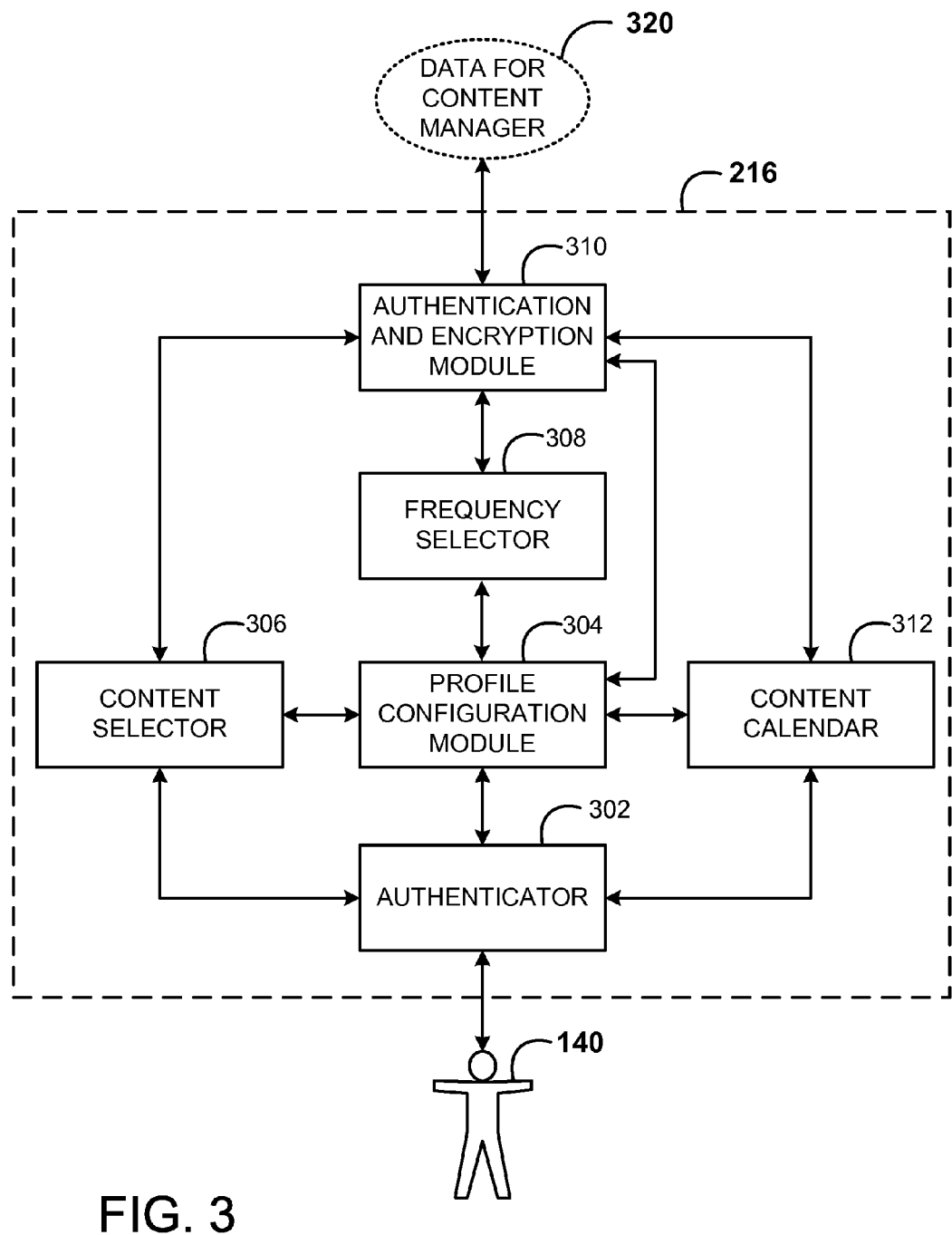
FIG. 3 is a structural block diagram for a user interface of the multimedia delivery system in accordance with an embodiment of the present invention.

FIG. 3 is a detailed structural block diagram for an embodiment of the User Interface 216. Along with the user management, the system may have other components such as key management, end device location management, encoder management, and various reporting tools, depending upon the application. In this figure, the User 140 is seen accessing the User Interface 216 via an Authenticator 302. The Authenticator 302 may utilize any authentication methodology known in the art in order to provide secure access to the proper User 140. Authentication may include the usage of passwords and usernames or other identification methods. This access may be across a web-based application, web-service or mobile applications, in some embodiments.

The User Interface 216 may include a Content Selector 306, a Profile Configuration Module 304 and a Content Calendar 312. Aspects of any of these modules may be configured to enable the User 140 to personalize or alter the data stored in them. For example, the Profile Configuration Module 304 may include information related to the User 140 including address, contact information, demographic information, billing information and receiver information. This receiver information may include which receivers are associated with the given User 140, categories/capabilities of the receivers, as well as the authentication keys associated with each receiver, and user decryption keys associated with each receiver. Below, at Table 1 is an example Key table:

TABLE 1

| Key Table | |
| --- | --- |
| NAME | LOCATION_NAME |
| RECEIVER_ID | |
| ENCODER_NAME | |
| FREQUENCY | |

In this example key table, RECEIVER_ID field uniquely identifies an end receiver, and is used to send service/content decryption key(s) to targeted receivers. The FREQUENCY field identifies the frequency to which the receiver is tuned to. The coverage area to which the receiver belongs to is identified by the ENCODER NAME field which is linked to the ENCODER table shown below at Table 2.

TABLE 2

Encoder Table

| NAME | | LOCATION NAME | | IP ADDRESS |
|---|---|---|---|---|
| BANDWIDTH | | ACCESS_PORT | | |
| PORT_1 | | PORT_2 | | PORT_3 |
| PORT_4 | PORT_5 | PORT_6 | | PORT_7 |
| BITRATE | | | | |

In some embodiments, the location information within the Profile Configuration Module 304 may be longitude and latitude coordinates, or may include GPS feeds to actual location. The use of GPS may be particularly useful when the receiver is mobile, such as a receiver in a vehicle, a Navigation Device 230, or a receiver associated with a Mobile Device 238.

The Content Selector 306 may be accessed by the User 140 to determine what content the User 140 may wish to receive on each of her receiver devices. This module, in some embodiments, may be logically divided by device type or content type. The User 140 may then select content from personal databases, public databases, subscribed to databases, and from the internet. Thus, for example, a user may schedule delivery of randomized songs from her music library to be delivered to her Music Player 236, the most recent copy of the New York Times®, of which she has a subscription, delivered to her E-Reader 224, and breaking news found on a public website to be sent to her Mobile Device 238.

At the Content Calendar 312, the User 140 may then be able to schedule the time she wishes to receive the content. In some embodiments, the Content Calendar 312 can support both time-based scheduled or sequential scheduling. Time-base scheduling ensures that content is played at specific times while sequential scheduling guarantees the order in which content is played. Returning to our previous example, the User 140 may wish that the New York Times® be available during the week by 7:00 am and on Sunday by 9:00 am. Further, she may wish the songs be delivered to her Music Player 236 by 10:00 am, so that she can listen to music at work. Lastly, assume that she wishes any urgent news be directed to her Mobile Device 238 promptly after it becomes available. All of such deadlines for data delivery may be designated utilizing the Content Calendar 312.

In some embodiments, a Frequency Selector 308 may access the Profile Configuration Module 304 for device capabilities and location restrictions to determine the frequency of the subcarrier signals which provide the best coverage of the transmitted data to the Receivers 120a to 120x. Alternatively, in some embodiments, the frequency selection may occur at a later stage closer to transmission based upon level of use of the subcarrier frequencies.

An Authentication and Encryption Module 310 may determine which authentication key identifiers to embed within the content for proper routing to the intended receiver. This decision may be based upon the intended receiver the content is supposed to be received by. Thus, returning to the above example, the authentication key identifier selected to be embedded with the transmission of the music data may indicate that the authentication key found within the Music Player 236 may be utilized to authenticate the content. Likewise, the Authentication and Encryption Module 310 may, in some embodiments, determine whether the content is to be encrypted. If so, the Authentication and Encryption Module 310 may indicate which content encryption key(s) to utilize to encrypt the data when the content requires a secure transmission. Again returning to the music example, it may be required that the music data be encrypted due to copyright restrictions. Thus, the Authentication and Encryption Module 310 may utilize an encryption key corresponding to a decryption key found within the Music Player 236 in order to ensure the music player is the only device capable of accessing the transmitted data (as opposed to determining the authenticity of the transmitted data).

Lastly, in some embodiments, the content identification, content delivery deadlines, frequency selections authentication key identifiers and content encryption keys each content may be encrypted with (when encryption is desired) may be provided as Data 320 to the Content Manager 214. This may also be seen at FIG. 4, which provides an embodiment of a structural block diagram for the Content Manager 214.

The Data 320 for the Content Manager may be received by an Application Server 402. The Application Server 402 may also enable administration of the entire network and individual elements of the network. The Application Server 402 may store encoder location information and cross reference this with the receiver location information. Thus, the appropriate transmitter tower(s) for broadcasting the data may be identified for each set of data. This location data may be stored within a Local Database 408. The Local Database 408 may also be enabled to provide local information storage for the entire Content Manager 214.

A Data Packetization Engine 410 may packetize the collected content. One or more authentication key identifiers are embedded with the data packets to enable the receivers to rapidly determine which packets are intended for each receiver (i.e., for proper routing). Thus, the receivers may authenticate the data using the authentication key identifiers in order to verify that the data is genuine (i.e., sent from an authentic data source). The Data Packetization Engine 410 may also, in some embodiments, encrypt the data, when desired, at the point of packetizing using one or more encryption keys. Thus, only Receivers 120a to 120x which include the appropriate content decryption key(s) may access the secured data once it has been transmitted. These two features enable key-based routing of data, and ensures that data is only accessible by the appropriate recipient (when content is encrypted) even though it is being multicast.

The packetized data may then be provided to the Scheduler 412 for generation of a content schedule. The Scheduler 412 cross references the delivery deadline, content size and bandwidth availability to generate a scheduled time for content to be broadcasted. In addition, the Scheduler 412 may provide a time buffer to allow for packet re-transmission to correct for corrupted or incomplete transmissions, and to balance load on the system. The Scheduler 412 may, in some embodiments, utilize a simple optimization algorithm to allocate time slots to the transmission of the content encoded in data packets. The Content Schedule 420 may then be provided to the broadcasters for transmission.

In some embodiments, the Content Manager 214 may also receive the Backchannel Data 142 indicating what content was, or was not, received by the targeted Receivers 120a to 120x. A Back Channel Handler 404 may collect this Backchannel Data 142 and compare against what the Receivers 120a to 120x were supposed to have received to determine what content was corrupted or lost. Weather, interfering signals, weak signal strength, and device outages are all possible causes of data loss.

The Packet Repair Engine 406 may then determine which data packets are needed to be retransmitted in order to correct the errors in the original transmission. This process of feedback and retransmission to correct for incomplete data receipts may be repeated as many times as necessary, in some embodiments, in order to provide a robust system of delivery. In some alternate embodiments, errors may be tracked and unusually large levels of data loss may trigger the system to cease transmission and an error message to be generated. In yet other embodiments, this may elicit a repair request or a test protocol to determine if there is a hardware malfunction or other system correction required. Further, in some embodiments, repair data may additionally be provided via the backchannel to ensure robust transmission.

In some embodiments, errors to the transmission of content may be corrected by retransmitting those data packets that are damaged and/or lost. In these embodiments, the receiver may be enabled to recognize packet order and repair and/or replace the retransmitted packets. Thus, retransmission bandwidth requirements may be greatly decreased.

Additionally, in some embodiments, the receiver itself may be enabled to track the data packets received and notify the delivery system that a transmission error has occurred when data packets are not received, or are corrupted. These embodiments further decrease the burden placed upon the backchannel since receivers with transmission errors are communicating with the delivery system.

Figure 5:
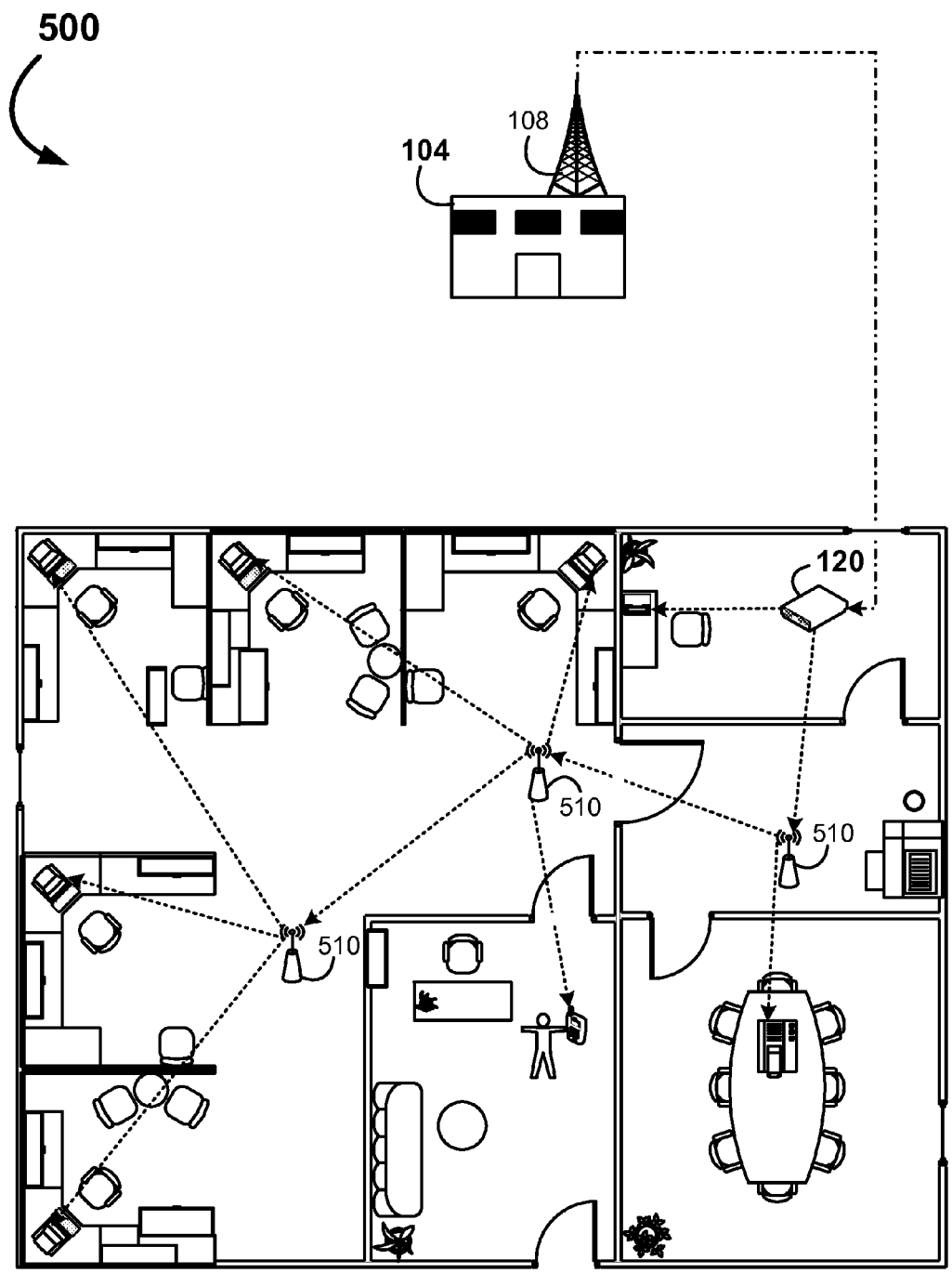
FIG. 5 is an example illustration of a relay system for the delivery of content in accordance with an embodiment of the present invention.

FIG. 5 is an example illustration of a relay system for the delivery of content in accordance with an embodiment of the present invention, shown generally at 500. Here a Station 104 may be seen with a Tower 108 transmitting a FM band subcarrier signal to a Receiver 120. The Receiver 120 may be situated in a location adapted to readily receive the transmission with little interference. However, it may be the case that the content data is not usable at this location, and retransmission of the content over Industrial, Scientific and Medical (ISM) band would be particularly helpful. This example layout may be particularly helpful in situations where FM/TV signals may not be strong enough inside multi-walled buildings and commercial structures to facilitate direct transmission. Note that although retransmission of the content is described in terms of ISM band frequencies, it is intended that any unlicensed bands suitable for localized low power transmission may be applicable.

In the illustrated embodiment, the Receiver 120 may include an ISM transmitter as well as an FM receiver. The Receiver 120 may likewise include a set of authentication keys such that data desired to be delivered to the particular building are retransmitted. In a corporate office, the Receiver 120 may include content decryption keys associated with each corporate device. In some alternate embodiments, all authenticated data received by the Receiver 120 may be retransmitted over the ISM bands regardless of encryption.

In addition to the Receiver 120, a series of Relays 510 may be deployed to receive the ISM transmission and retransmit the data for access by the end use devices. In this way, transmitted data may be enabled to penetrate deeply into office buildings where an FM or TV transmission would not be able to penetrate.

II. Methods for Secure Content Delivery

Below are provided a number of exemplary process flows for the delivery of data over a multicast radio transmission with key based routing. These examples are intended to provide an understanding of some embodiments of the process of data delivery utilizing at least one of the above system examples provided in the previous subsection. It is intended that any logical permutations, alterations and deletions to the foregoing process is included in the purview of the present invention if it were reasonably evident to one skilled in the present art.

Figure 6A:
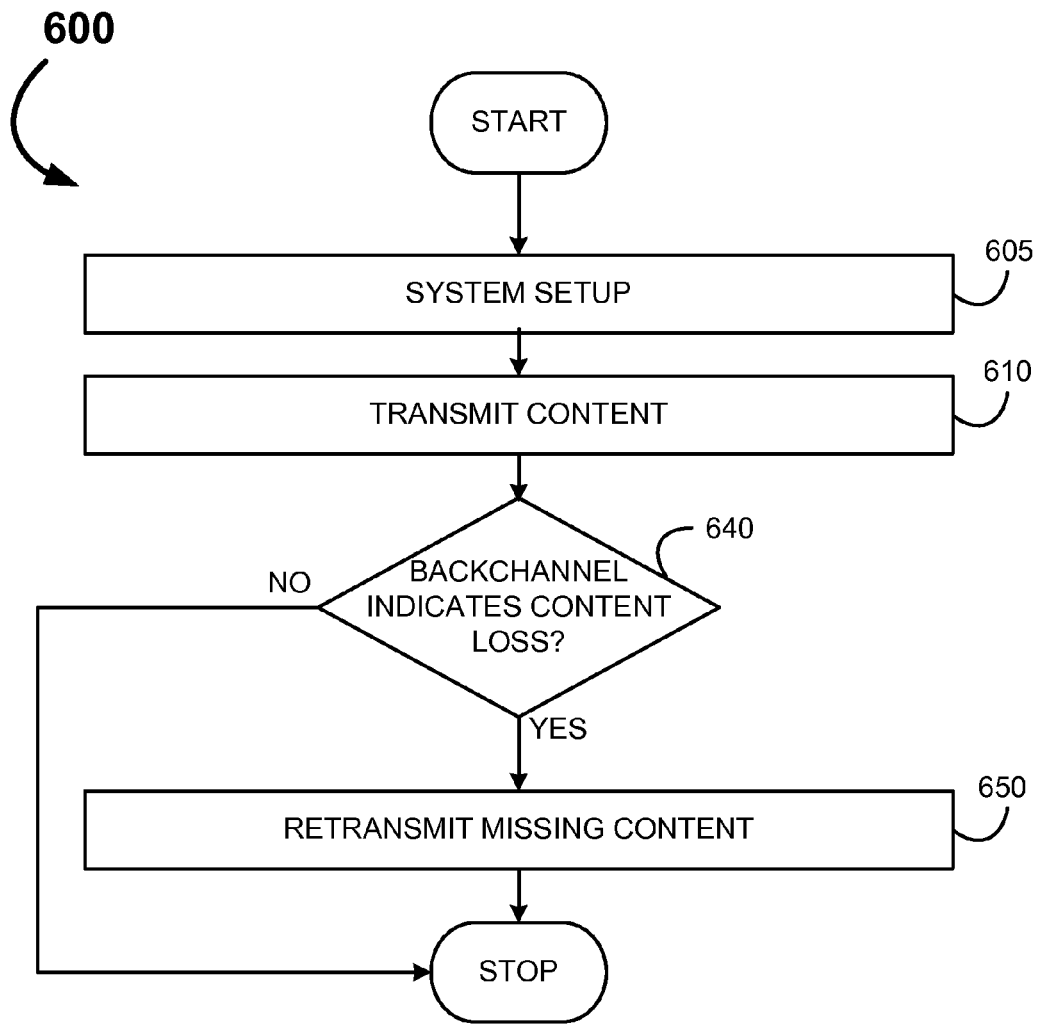
FIGS. 6A to 6G provide example flow diagrams for the process of delivering and repairing content to receivers, using the content delivery system, in accordance with an embodiment of the present invention.

FIG. 6A is an example flow diagram for the process of securely delivering content, using the content delivery system, shown generally at 600. This process begins from step 605 where the system undergoes a setup. Then, at step 610, the content is transmitted to the receivers. An inquiry is then made, at step 640, as to whether a backchannel message has been received indicating an error in transmission. If a transmission error has occurred, then the process progresses to step 650 where the missing content is retransmitted. The process then ends. Specifics of each of these steps are explored below in more detail.

A. System Setup

Figure 6B:
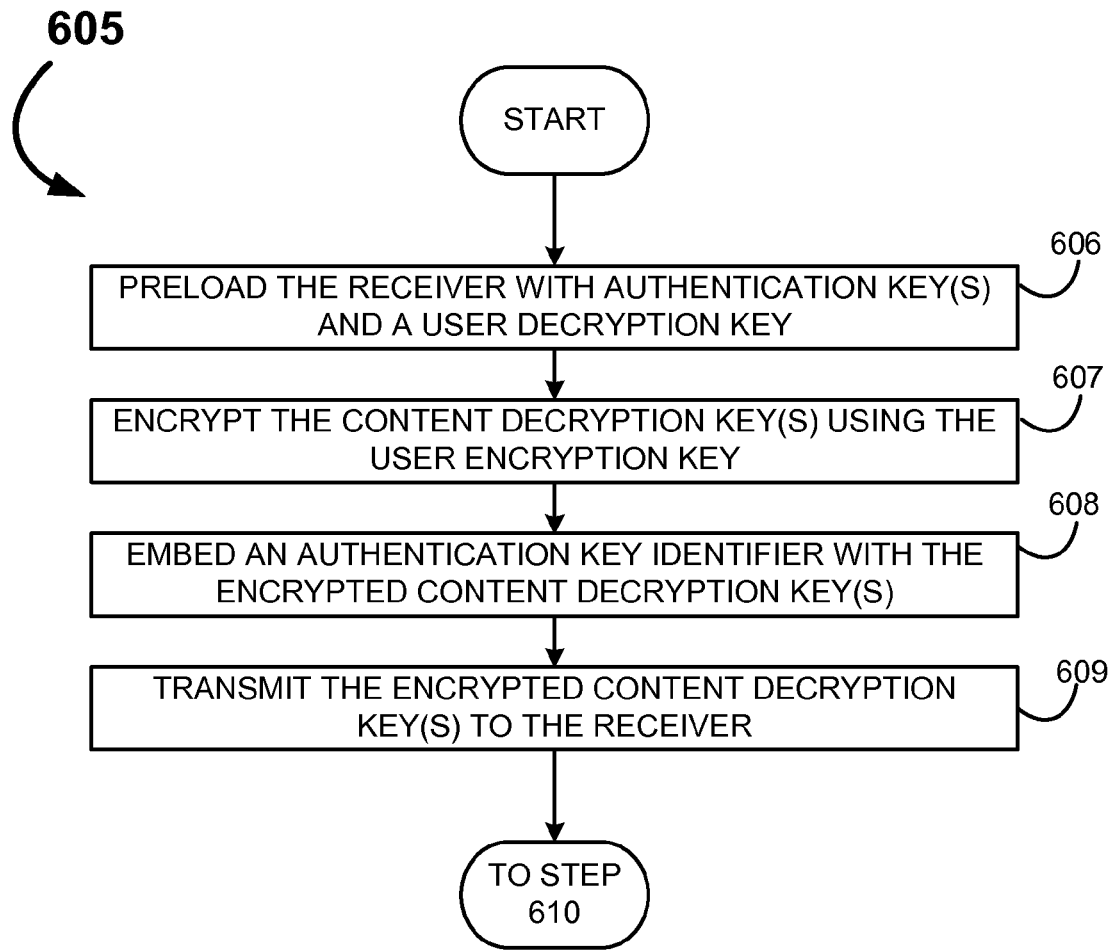

FIG. 6B is an example flow diagram for the process of setting-up the content delivery system for content delivery, shown generally at 605. This process begins with the receiver being preloaded with authentication keys. Likewise, the receiver may be preloaded with a user decryption key, at 606. In some embodiments, the authentication keys and/or user decryption key are preloaded into the receiver during manufacturing. Thus, the user may obtain the receiver with the initial set of authentication keys and user decryption key already installed. In some other embodiments, the user may have access to the authentication keys and/or user decryption key. Thus, when the user gets a new receiver unit, the authentication keys and/or user decryption key may be installed into the receiver post retail.

The user decryption key may be a singular key, or a collection of user decryption keys. Authentication keys may be unique to the receiver and/or common to many receivers. Likewise, in some embodiments, the user decryption keys may be unique to either of the user or the receiver.

Then, often dependent upon changes to the content schedule, it may be desirous to update the keys within the receiver in order to successfully receive the transmitted content. Thus, in some embodiments, new content decryption key(s) may be encrypted using a user encryption key which corresponds to the user decryption key loaded in the receiver, at 607. Likewise, an authentication key identifier corresponding to at least one of the authentication keys loaded within the receiver may be embedded with the encrypted content decryption key, at 608. This identified and encrypted decryption key update may then be transmitted, at 609, for consumption by the proper receiver(s). Although not illustrated, updates to the authentication keys may likewise be transmitted to the receiver, in some embodiments. The process then ends by returning to step 610 of FIG. 6A.

B. Content Transmission

Figure 6C:
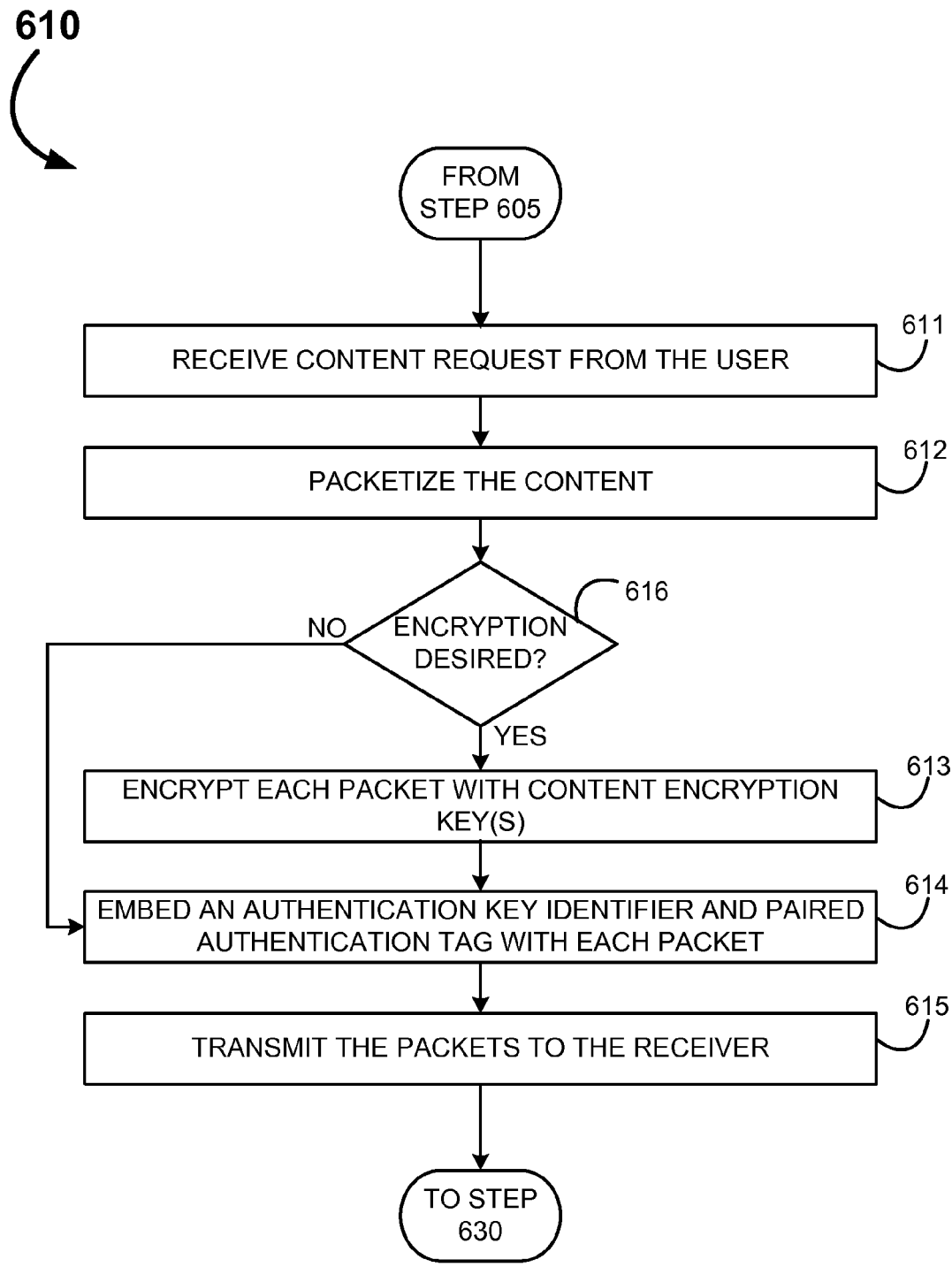
Figure 6D:
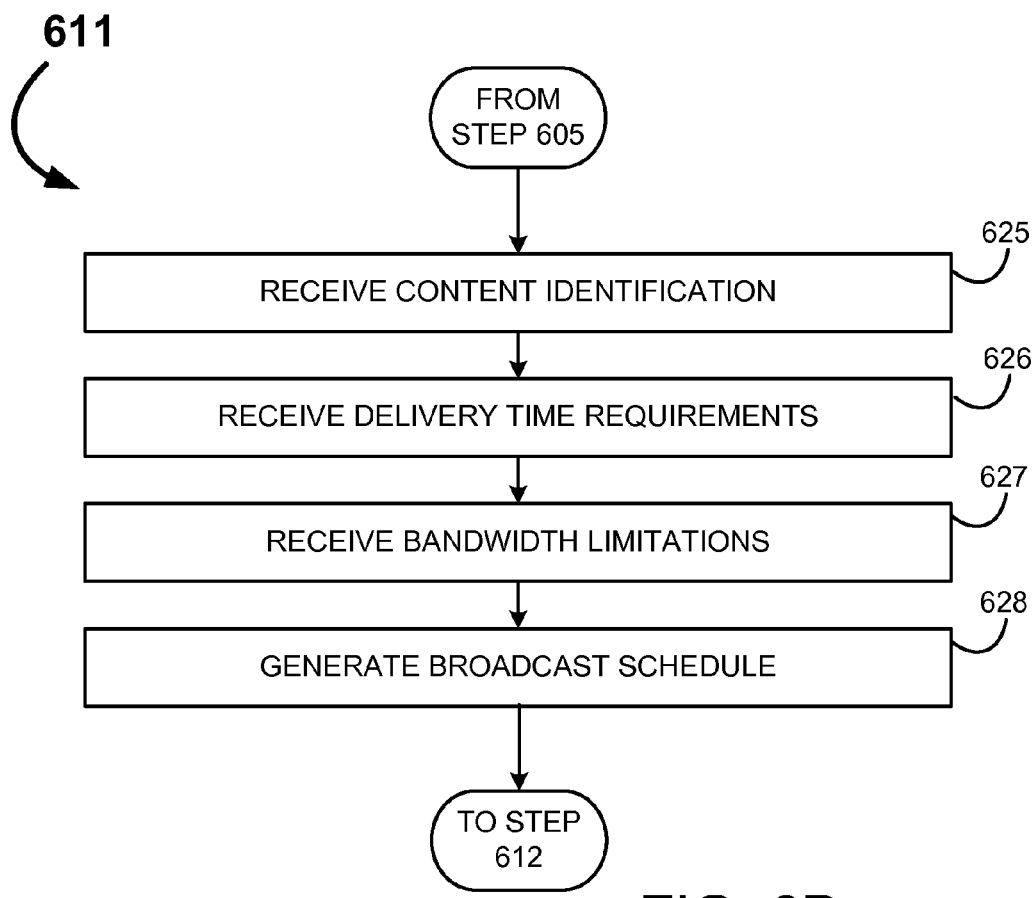

FIG. 6C is an example flow diagram for the process of content transmission, shown generally at 610. This example process begins from step 605 of FIG. 6A. After which a content request is received from the user, at 611. This content request may take the form of a content schedule, as has been discussed above. Briefly refer to FIG. 6D where the process 611 is expanded. The content request, in some embodiments, includes receiving content identification (at 625), receiving delivery time requirements (at 626), receiving bandwidth availability (at 627), and generating a broadcast schedule (at 628). The broadcast schedule may compare bandwidth limitations to delivery time requirements to content size to generate an optimized delivery schedule. In some embodiments, the broadcast schedule includes buffers for retransmission of corrupted packets and for unplanned system slowdowns or other events.

The content schedule may be utilized to identify and collect the content from any of the above mentioned data sources. Data collected may be from a local database, or external databases. Additionally, internet and network queries may be utilized to collect the content.

Returning to FIG. 6C at 612, the content may then be packetized into discrete content packets (also referred to as data packets or datagrams). Packetization enables transmission of relatively large content data without the risk that an error in transmission will endanger the entire data transfer.

An inquiry is made at step 616 whether encryption of the data packets is desired. If so, the process progresses to step 613 where each of the packets may be encrypted utilizing the content encryption key(s). This step may be optional dependent upon security needs for the content. Thus, content where security is not at issue may skip the encryption step entirely. If, however, encryption is desirable, the choice of which content encryption key to use to encrypt the content packets may depend upon the intended recipient receivers' content decryption keys. For example, some receiver may include a personal device content decryption key as well as a universal emergency content decryption key and any number of subscription content decryption keys. A subscription content decryption key may be common among all subscribers who have a subscription. Thus, returning to a previous example, all users who have access to New York Times® may have a common content decryption key in their respective receivers which is associated with this subscription, and a transmission of the New York Times® may be encrypted with the corresponding content encryption key. All receivers with the content decryption key may then decode the transmission. Thus, a single encrypted New York Times® transmission is required to reach a number of targeted receivers and users.

After encryption, or if encryption was not desired, the process may continue to step 614 where an authentication key identifier may be embedded with each packet to help facilitate efficient delivery and routing. The authentication key identifier may remain unencrypted, thereby allowing all receivers to readily read the authentication key identifiers associated with each packet. If the authentication key identifier corresponds to a authentication key within the receiver, the receiver may then actively authenticate the packet. Likewise, the packet may also be decrypted when applicable. This efficiency is required due to the enormous volume of packets a typical receiver may be presented with. At very large packet numbers, a brute force attempt at authenticating and/or decrypting every packet to find the ones intended for the particular receiver becomes impractical. Thus, authentication key identifiers provide a method of selectively picking the packets for authentication by the receivers.

At 615, the packets are then transmitted to the receiver. The process then ends by returning to step 630 of FIG. 6A.

Figure 6E:
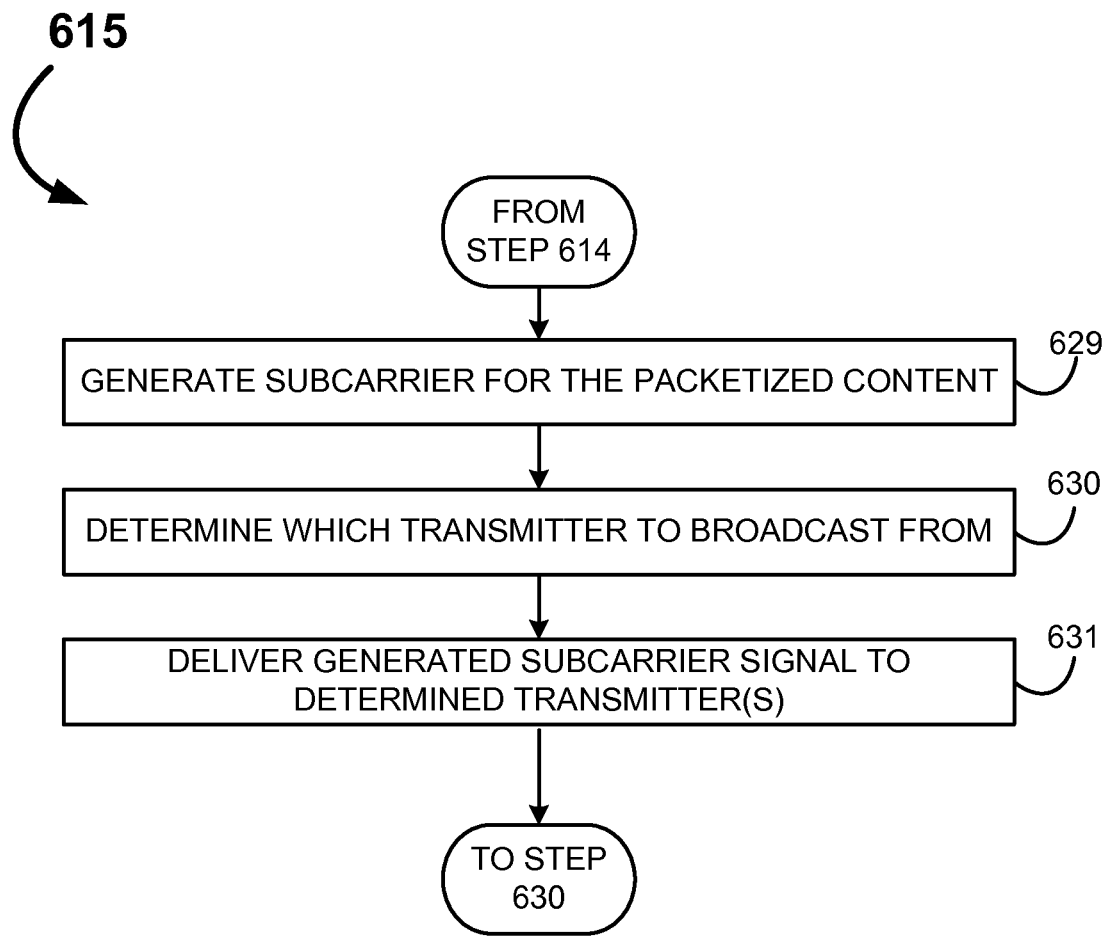

Briefly refer to FIG. 6E where the process 615 is expanded. Here a FM SCA subcarrier for the content packets is generated, at 629. The Subsidiary Communications Authority (SCA) is a subcarrier on a broadcasting station. The subcarrier is a modulated signal transmitted with the baseband signal. Typical subcarrier frequencies are 67 kHz and 92 kHz. The subcarrier at 67 kHz is typically received with more clarity and less interference. Additionally, sometimes data transmissions may occur at 71 kHz. Additional frequencies may be utilized as well. The transmitter from which to broadcast from is then selected, at 630. Lastly, at 631, the generated subcarrier signal is provided to the appropriate transmitter(s).

Figure 6F:
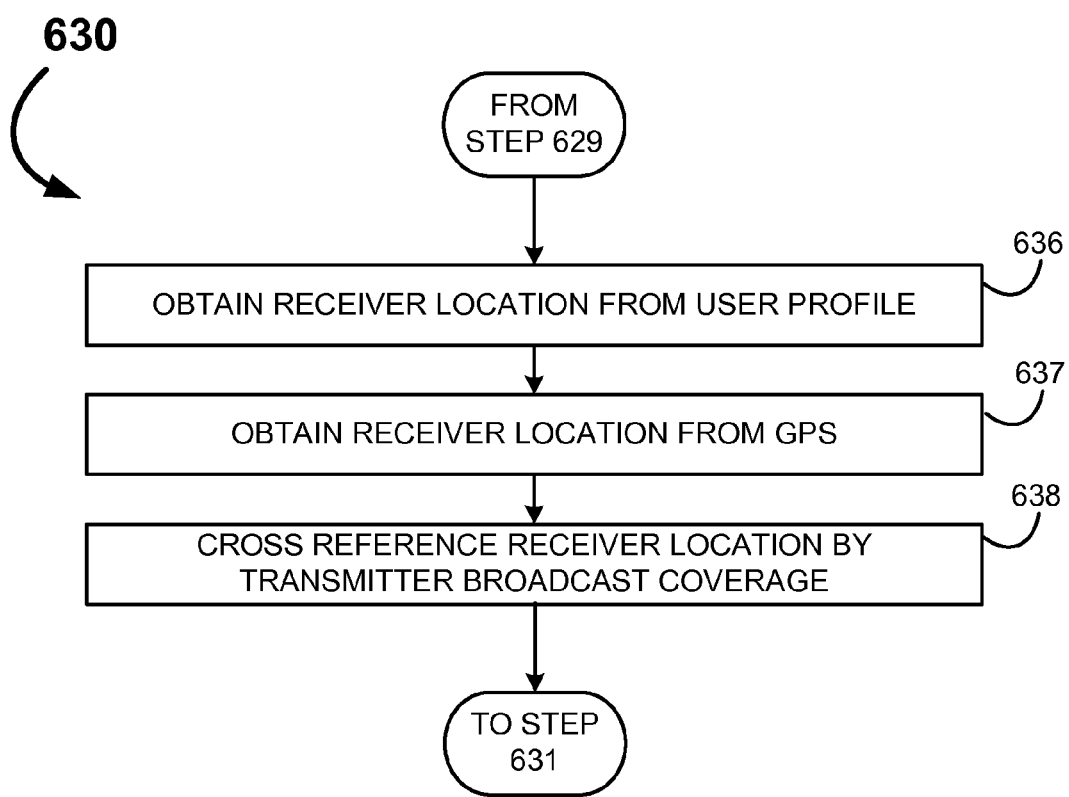

Now refer to FIG. 6F where step 630 is expanded. The method obtains receiver locations from the user profile (at step 636). Receiver locations may include set longitude and latitude coordinates for fixed receivers, or GPS coordinates (at step 637) for receivers which are mobile (such as receiver in cell phones or other mobile devices). Receiver location may then be cross referenced with the transmitter coverage area (at step 638) to determine which transmitters are best suited to transmit particular data packets.

After the last process of content transmission to the receivers is performed, the system may await a response from the receivers over a backchannel for error correction purposes.

C. Error Correction

Processes 640 and 650 of FIG. 6A disclose the method of error correction for the present system. At 640, an inquiry is made whether a backchannel message has been received, and if so, whether the backchannel message indicates that there has been a transmission failure. Transmission failure may include failure of packet receipt, packet corruption, packet loss, and unsuccessful decryption of packets. If any of these failures are detected, the system may initiate a repair by retransmitting the damaged packets, at 650. This repair may include retransmission along the original transmission medium, and/or transmission of the repair data via the backchannel. In some embodiments, it is unnecessary to retransmit all of the content since the receivers are capable of storing all properly received packets and reconstituting the entire file once the newly retransmitted packets are received. Further, given the versatility of the present invention, any known methods for data recovery and repair of packets may be utilized by the present invention.

Figure 6G:
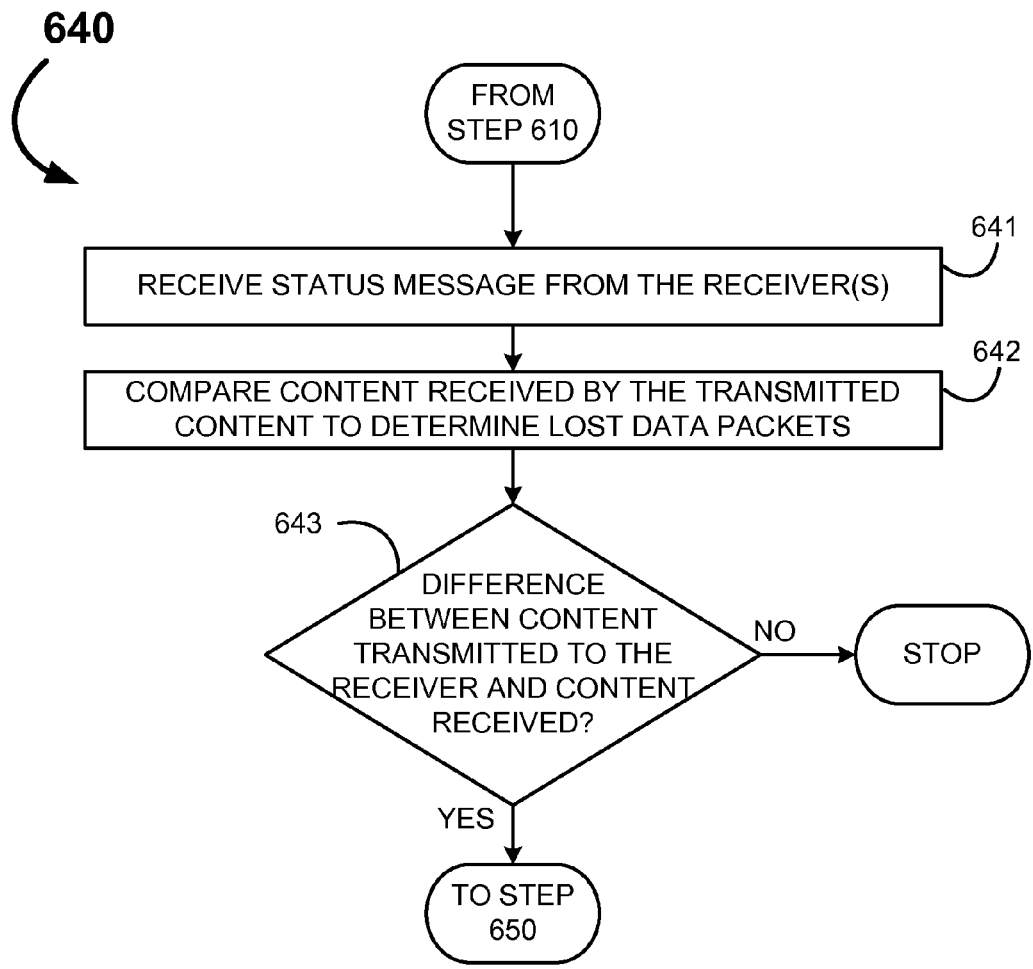

Briefly refer to FIG. 6G where the process 640 is expanded. Here a status message from the receiver is received by the delivery system, at 641. In some embodiments, the receivers provide periodic status updates where the content received is provided to the delivery system. In alternate embodiments, the receiver is capable of determining when a delivery error has occurred. In these embodiments, the receiver does not need to periodically send status messages, but rather needs to send a notification to the delivery system when an error has occurred.

At 642 the content received (as indicated by the status message) may be compared against the content transmitted to determine if and where a transmission error has occurred. In the embodiments where the receiver is capable of identifying and reporting errors, the error notification is sufficient to inform the system of a transmission error.

At 643, the inquiry is made whether there is an error using the analysis of 642. If no error is found, the process ends. If an error is found, the process progresses to step 650 of FIG. 6A where the missing or corrupted packets are retransmitted.

D. Content Receipt

Figure 7:
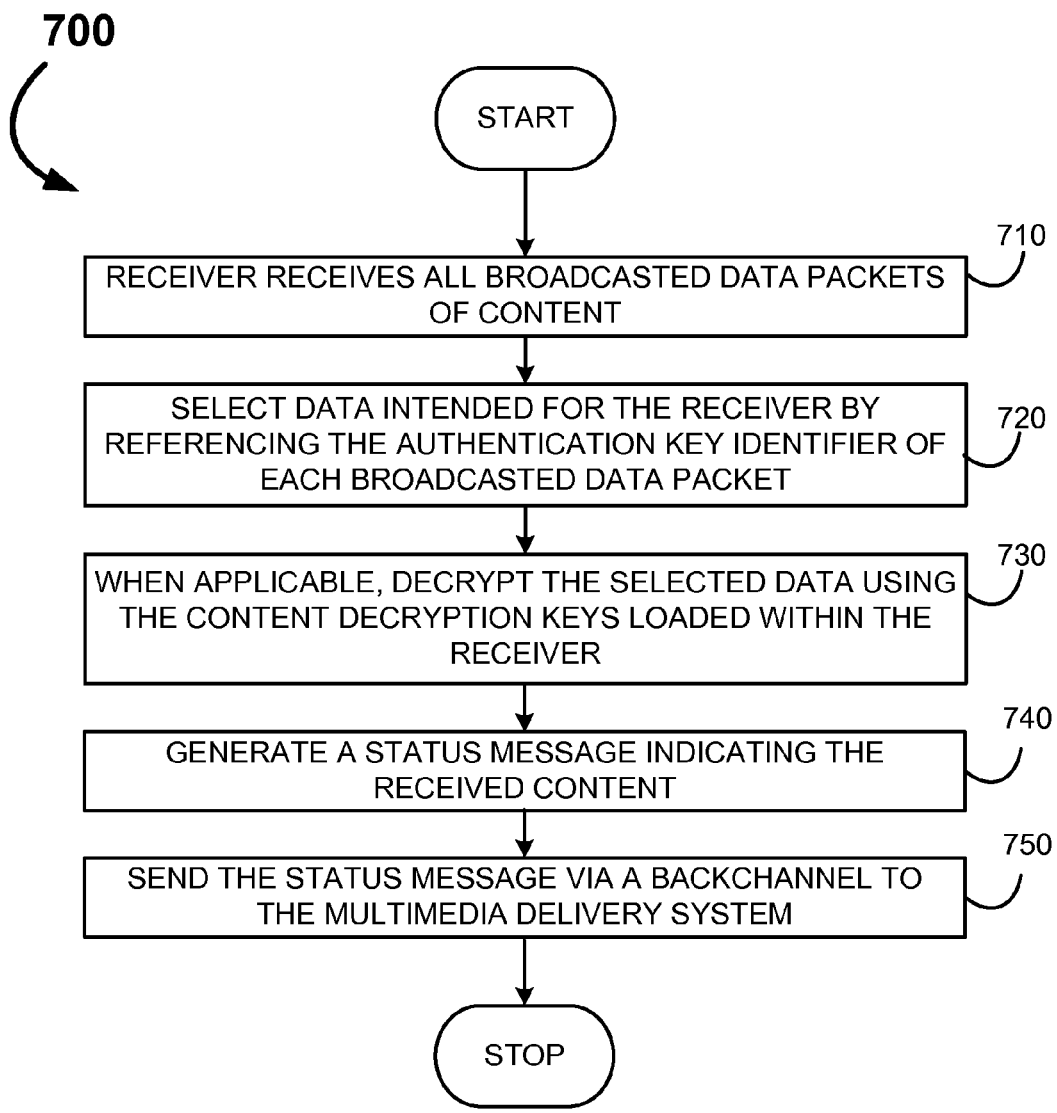
FIG. 7 is an example flow diagram for the process of receiving the transmitted content, using a receiver device, in accordance with an embodiment of the present invention.

FIG. 7 is an example flow diagram for the process of receiving the transmitted content, using a receiver device, shown generally at 700. This process begins with the receiver receiving all broadcasted data packets, at 710. The receiver may then parse through the packets and select the data packets which are intended for it, at 720. This selection (authentication) may be performed by reviewing each of the authentication key identifiers embedded with the data packets.

An inquiry may be made as to whether the data packets are encrypted. If so, these selected data packets may then be decrypted using the content decryption keys in the receiver when the content is encrypted, at 730.

The receiver may then recreate the content from the individual data packets. Any errors in the content (due to missing or corrupted packets) may then be reported back to the delivery system. This may include generating a status message, at 740, indicating the content received (or the missing content). Then sending the status message to the multimedia delivery system, at 750, via a backchannel. The process then ends.

Backchannels may include cellular network transmission, modem transmission or wired transmission. Due to the relatively low bandwidth required by the backchannel, relatively "slow" transmission mediums may be acceptable. Use of a different backchannel medium from the original transmission medium also increases the likelihood that feedback reaches the system because a failure in the primary medium would not prevent feedback from being received by the system.

E. User Profile Generation

Figure 8:
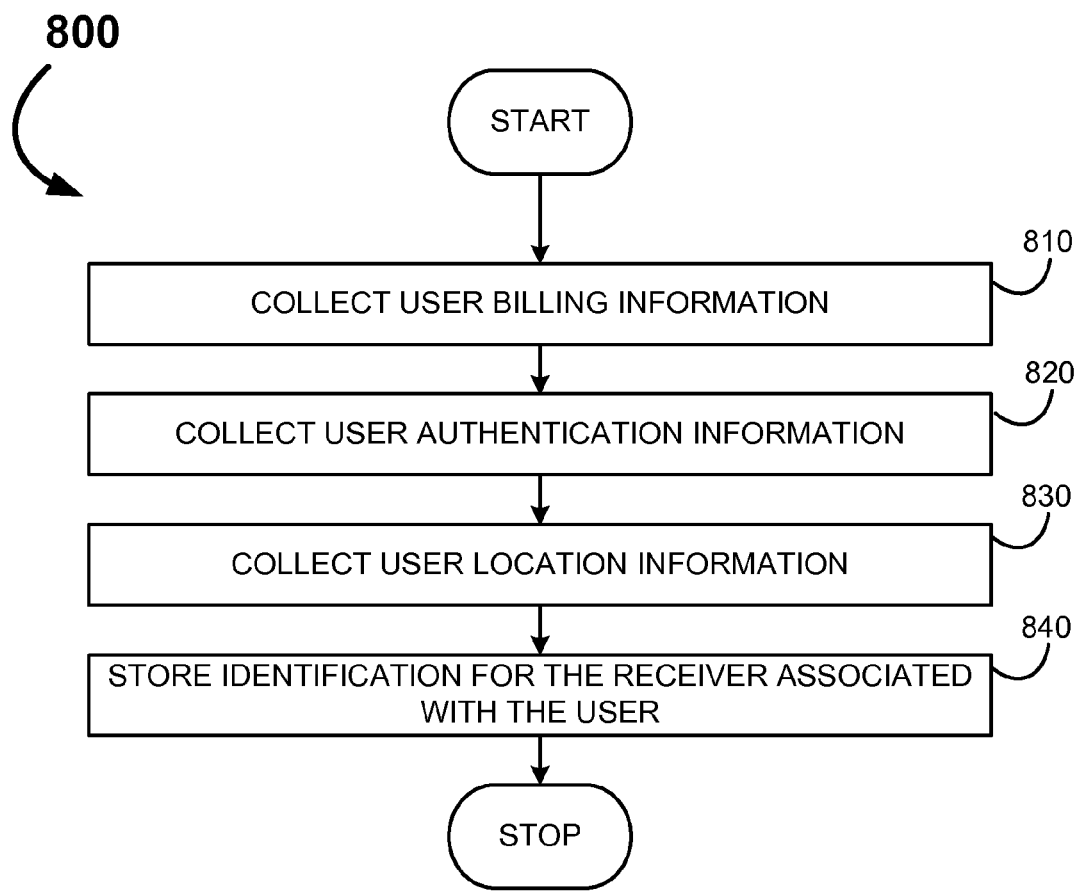
FIG. 8 is an example flow diagram for the process of generating a user profile, using the content delivery system, in accordance with an embodiment of the present invention.

FIG. 8 is an example flow diagram for the process of generating the user profile, shown generally at 800. This process begins where user billing information may be collected (at step 810), authentication information is collected (at step 820), and user location is collected (at step 830). User location may include location coordinates for each receiver associated with the user. Location coordinates may include fixed coordinates and/or GPS coordinates. User authentication information may include a username and password, or any other known authentication methodology. Lastly, the identification of receivers associated with the user are stored (at step 840) as part of the user profile.

The identification of the receivers associated with the user may include information such as a serial number, authentication keys and user decryption keys actively stored within the receivers, receiver locations, receiver type and other useful information The user profile may also include user selections and preferences. One such preference is the type of content desired by the user. Content selection may be received via a web-based application, web-service or mobile applications, accessible by the registered user. Likewise, delivery time of content may be selected by the user.

F. Transmission Penetration

Figure 9:
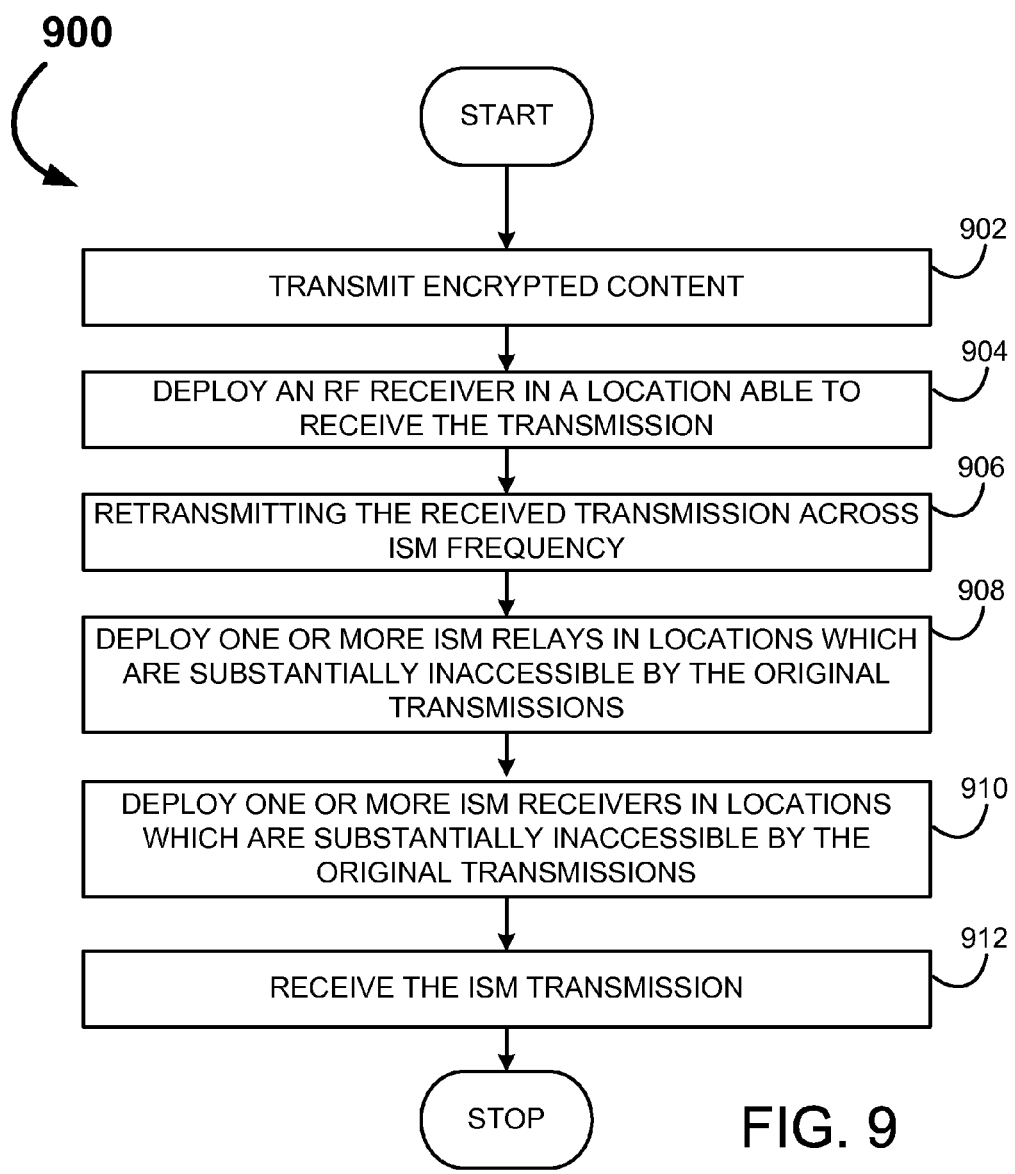
FIG. 9 is an example flow diagram for the process of relaying broadcast content to an inaccessible endpoint location, using receivers and ISM relays, in accordance with an embodiment of the present invention.

FIG. 9 is an example flow diagram for the process of relaying broadcast data to an inaccessible endpoint location, using a receiver and ISM relays, in accordance with an embodiment of the present invention, shown generally at 900. This process begins, again, with the transmission of the encoded data packets, at step 902. A receiver is deployed at a location capable of receiving the transmission, at step 904. In some embodiments, this process may be useful in scenarios where transmission penetration is difficult. For example, in a large office building FM radio bands do not typically penetrate the interior of the building very well. Thus, a receiver in the inside of an office building may require relays in order to function.

The process then proceeds to step 906, where the receiver retransmits the data packets over Industrial, Scientific and Medical (ISM) band (or other unlicensed bands suitable for localized low power transmissions). The benefit of using an ISM or other unlicensed band transmission is that there are fewer regulations placed upon this range of the radio frequency spectrum. Of course, additional retransmission bands may be utilized in alternate embodiments. In fact, in some embodiments, the receiver may be configured to couple to a wired corporate or building-wide network, thereby enabling endpoint receivers to directly couple to the network to receive the encoded data packets.

At step 908, one or more relays for the ISM transmission may be deployed within the building in regions where the original transmission is incapable of penetrating. ISM relays may be configured to receive the ISM transmission and retransmit the signal. Thus, relays may provide range extension for the original ISM transmitter. Further, at step 910, one or more ISM receivers may be deployed. The ISM receiver may be similar to the relays; however, the receivers may lack the ability to retransmit the ISM signal. These receivers may receive the ISM transmission at 912. The receivers with corresponding content authentication keys, and optional decryption keys, may then authenticate the appropriate data packets. In this way, the transmitted data may be received and decoded in an area where traditionally the RF transmission would not have been able to penetrate. The process then ends.

III. EXAMPLES

A. Radio Frequency SCA Subcarrier

As previously noted, data transmission may be performed, in some embodiments, utilizing one or more subcarrier signals. Again, for the purposes of this application, the term 'subcarrier' is defined as a separate signal carried on a main radio (or television) transmission, which carries additional data. The subcarrier is an already modulated signal, which is then modulated into yet another signal. A subcarrier may refer to Subsidiary Communications Authority (SCA) transmissions.

In the United States, the analog broadcast FM-band is the frequency region between 87.9 MHz and 107.9 MHz, inclusive. The region is subdivided into a plurality of one-hundred and one (101) channels (known as channels 200 to 300, inclusive) with 200 kHz frequency spacing between adjacent channels. A radio station emits a RF signal, which is modulated with analog frequency modulation (FM) with certain limitations on the permitted frequency deviation, and which is nominally centered (i.e., without modulation) about the allocation frequency (e.g., 90.9 MHz which is channel 210). The RF signal emissions are required to comply with an emissions "mask". The mask is a power spectrum density envelope. The maximum emitted power varies as a function of the frequency offset from the nominal allocation center frequency. In other words, the emission mask determines the maximum power which may be emitted at a specific frequency (emission), for each frequency within the channel allocation. The signal emitted by the analog FM-band transmitter typically does not substantially exceed the mask frequency-envelope. The mask characteristics are determined by the FCC in the United States.

The Subsidiary Communications Authority (SCA) is a subcarrier on a broadcasting station. The subcarrier is a modulated signal transmitted with the baseband signal. As noted above, each FM channel is separated by 200 kHz. It is possible for a radio station to transmit audio up to 100 kHz (under current FM SCA rules). As the range of human hearing is generally restricted to 15 kHz, there is substantial spectrum available for other uses. Typical subcarrier frequencies are 67 kHz and 92 kHz; however these frequencies are reserved for analog signals. The subcarrier at 67 kHz is typically received with more clarity and less interference. Additionally, sometimes data transmissions may occur at 71 kHz. Additional frequencies may be utilized as well.

B. Datagram Protocols

Below in reference to FIGS. 10 to 13 is provided examples of datagram protocol formats. Alternate protocols are also possible, in some embodiments.

Figure 10:
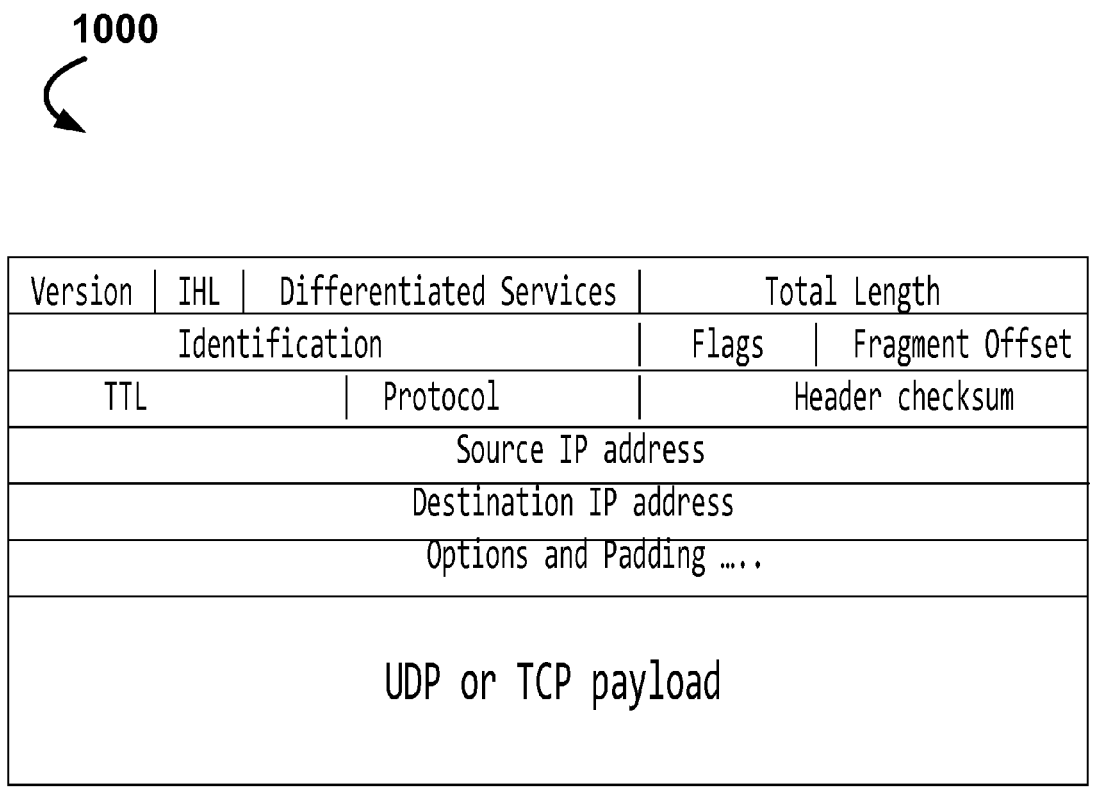
FIGS. 10-13 provide example illustrations of datagram protocol formats in accordance with some embodiments of the present invention.

FIG. 10 is the known Internet Protocol (IP) format for datagrams, shown generally at 1000. In an IP datagram, there are fields for logical IP addresses of the datagram source endpoint and the datagram destination endpoint. The IP addresses may have a correspondence to physical device media access control (MAC) address. The IP address uniquely identifies the destination endpoint among all possible IP endpoints. An IP datagram is inherently a unicast transfer.

Figure 11:
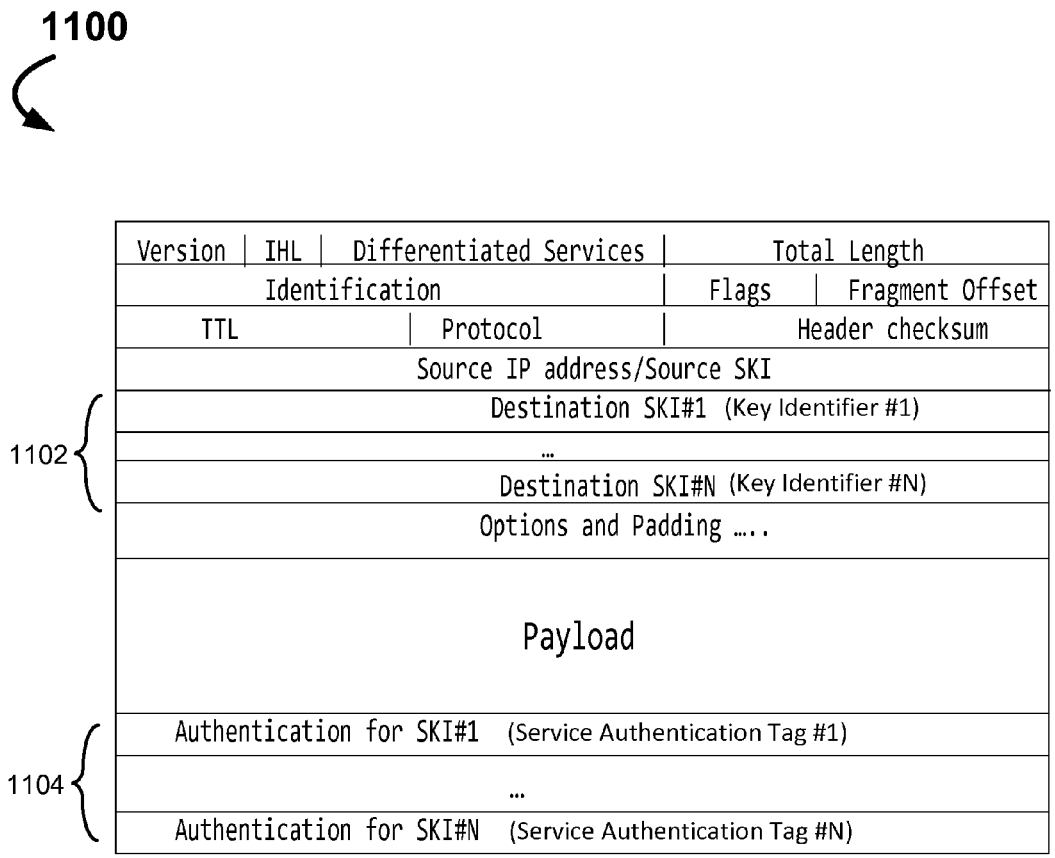
Figure 12:
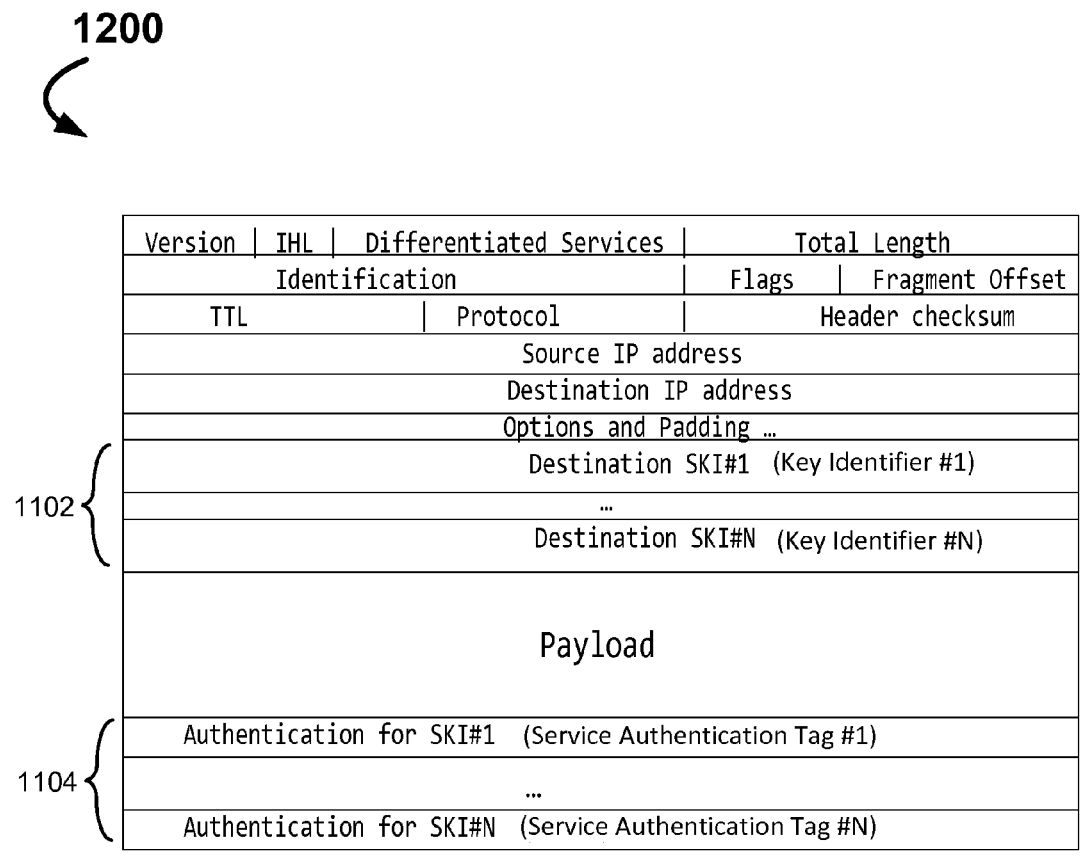

In contrast, a multicast datagram format shown in FIG. 11 is invented which replaces the logical endpoint address with one or a plurality of Service (authentication) Key Identifier (SKI) fields (1102). In some embodiments, a SKI header field (SKIH) is included in the datagram, preferably in the variable length Options field, in order to establish the number of SKI fields present in the datagram and format information for each SKI that is present. The SKI field represents an underlying authentication and/or service encryption key (SEK) which is used to cryptographically validate datagram traffic. There may be a one-to-one corresponding between the SKI and the SEK, so that routers and endpoints may identify the appropriate (secret) SEK on the basis of the revealed SKI. In some embodiments of the invention, shown in FIG. 12, it may be desirable to retain the IP destination IP address field for maximum compatibility even though the destination IP address will not, in general, correspond to the actual endpoint address. In these embodiments, the SKI fields may be generated in the variable length Options field. For example, the destination IP address may be used to route the multicast datagram traffic en masse as part of the network infrastructure for data distribution.

The SKI fields, as an aggregate, define a set association among endpoints for efficient data delivery. A SKI may represent a single physical endpoint device, all possible endpoints devices, or any possible grouping of endpoint devices. Thus, according to the invention, the SKI defines set membership in a plurality of possible set organizations. By incorporating multiple set identifiers in the datagram, the method and system of the invention significantly reduces the number of redundant datagram transfers to individual set members for shared content.

According to some embodiments of the invention, the datagram is authenticated by incorporating a service authentication field (Service Authentication Tag) in the data message. For each SKI in the datagram, there is a corresponding Service Authentication Tag field (1104). Endpoints which possess the correct SEK information can determine if the datagram is valid by computing the corresponding authentication field and comparing it to the field in the datagram. The authentication is computed over the header and including the datagram data payload. If the computed authentication field is identical to the authentication field in the datagram, then the endpoint may be assured that the datagram is valid. Thus, the SKI identifies the underlying authentication key which is used to determine datagram validity. A 'spoofing' datagram which may have a correct SKI field will not, in general, have the appropriate authentication field because the authentication is a unique function of the datagram content and the hidden key.

In certain embodiments where the privacy (versus the validity) of the datagram is not a concern, when, for example, the datagram payload includes information in the public domain, then only datagram authentication may be needed. However, when datagram secrecy is important, the datagram may be encrypted with one or a plurality of cryptographic codes. The content decryption key required to properly decrypt the datagrams is also identified by the SKI but the content decryption key is not necessary the same key as used for authentication. For example, the SKI may identify an underlying master key which is subjected to further one-way cryptographic transforms in order to determine separate authentication and content decryption keys. This approach is advantageous because the loss of security in one of the derived keys does not necessarily compromise the master key.

When the datagram contains one SKI field, encryption and authentication may be performed according to the derived keys. However, when more than one SKI field is present, the hierarchical relationship, if any, among the SKI fields should be taken into consideration, in some embodiments. If the SKI fields are not hierarchically related, it may be necessary to separately encrypt the datagram which different cryptographic codes. In this event, multiple datagrams with individual SKI fields may be required because duplication of the datagram body substantially eliminates the advantage of having multiple SKI's in a single datagram.

The system and method of the invention, in some embodiments, do not require specific bit field widths or specific methods of implementing authentication and encryption. However, in some embodiment, each SKI is a 128-bit field, and authentication may be accomplished by HMAC SHA-1 or SHA-2 algorithms, for example. Also, in some embodiments, authentication fields may be between 2 and 16 bytes, depending upon the level of security required. Payload encryption, when present, may be implemented using AES128 or AES256 algorithms, in some embodiments.

Figure 13:
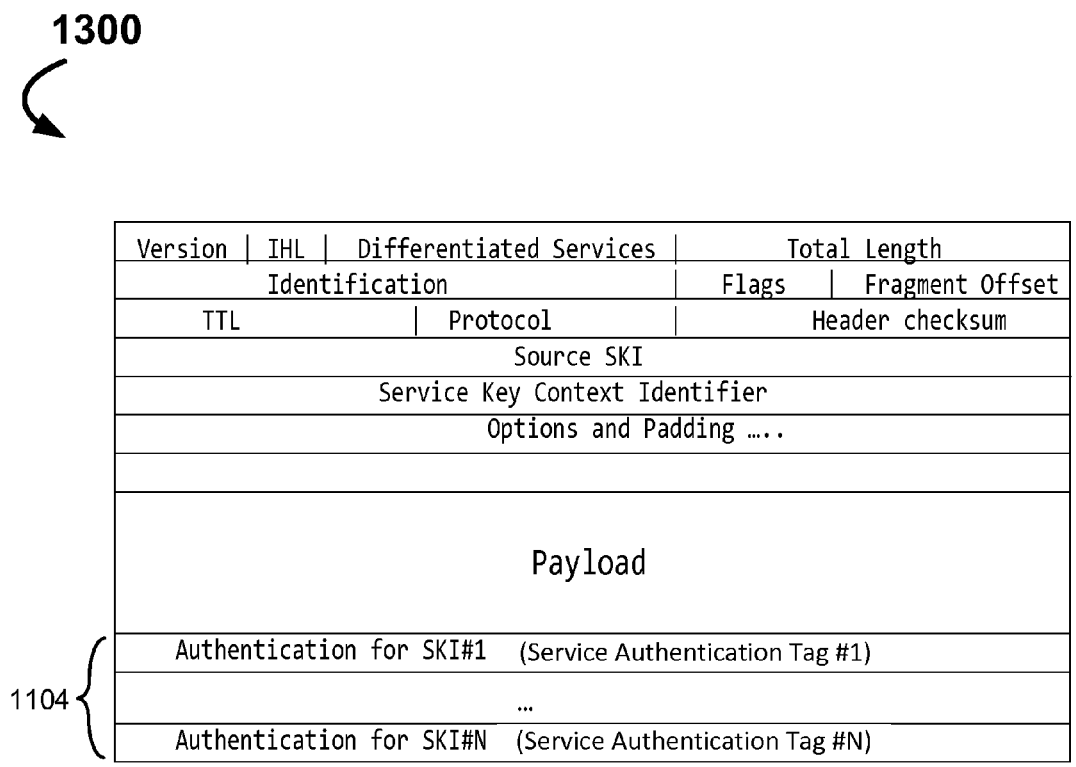

According to some embodiments of the invention, when a temporal sequence of datagram transfers is made with common SKI fields, the SKI information may be grouped together in a SKI context as shown in FIG. 13, shown generally at 1300. For individual datagrams within the sequence, an abbreviated service key context identifier (SKCI) may be used instead of the full SKI field information in order to reduce the required datagram size. Such datagrams sequences may be preceded by a datagram which identifies the correspondence between the SKI fields and the SKCI.

C. Datagram Delivery

Figure 14:
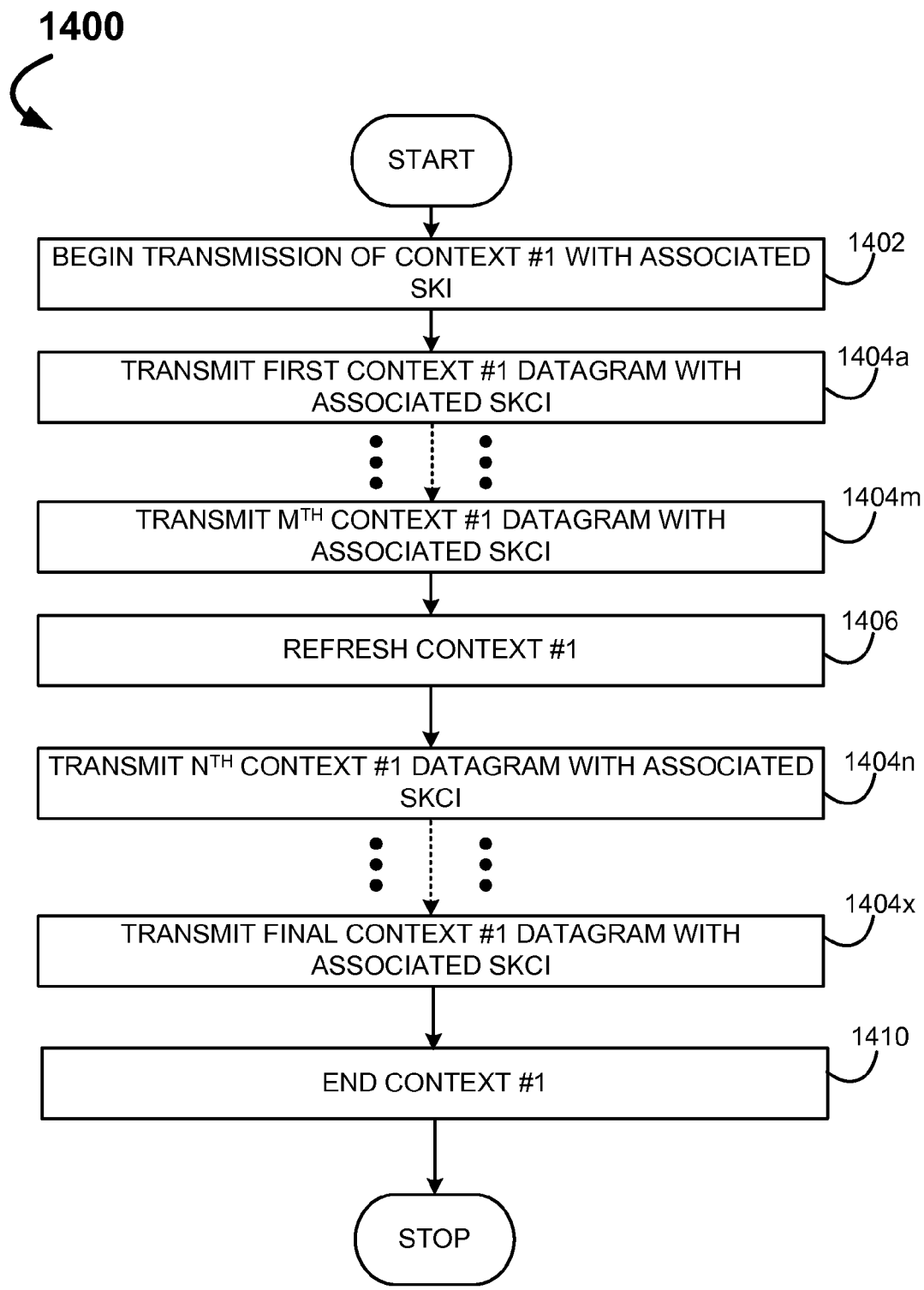
FIG. 14 is an example process flow for the delivery of datagrams associated with a single context, using the content delivery system, in accordance with some embodiments of the present invention.
Figure 15:
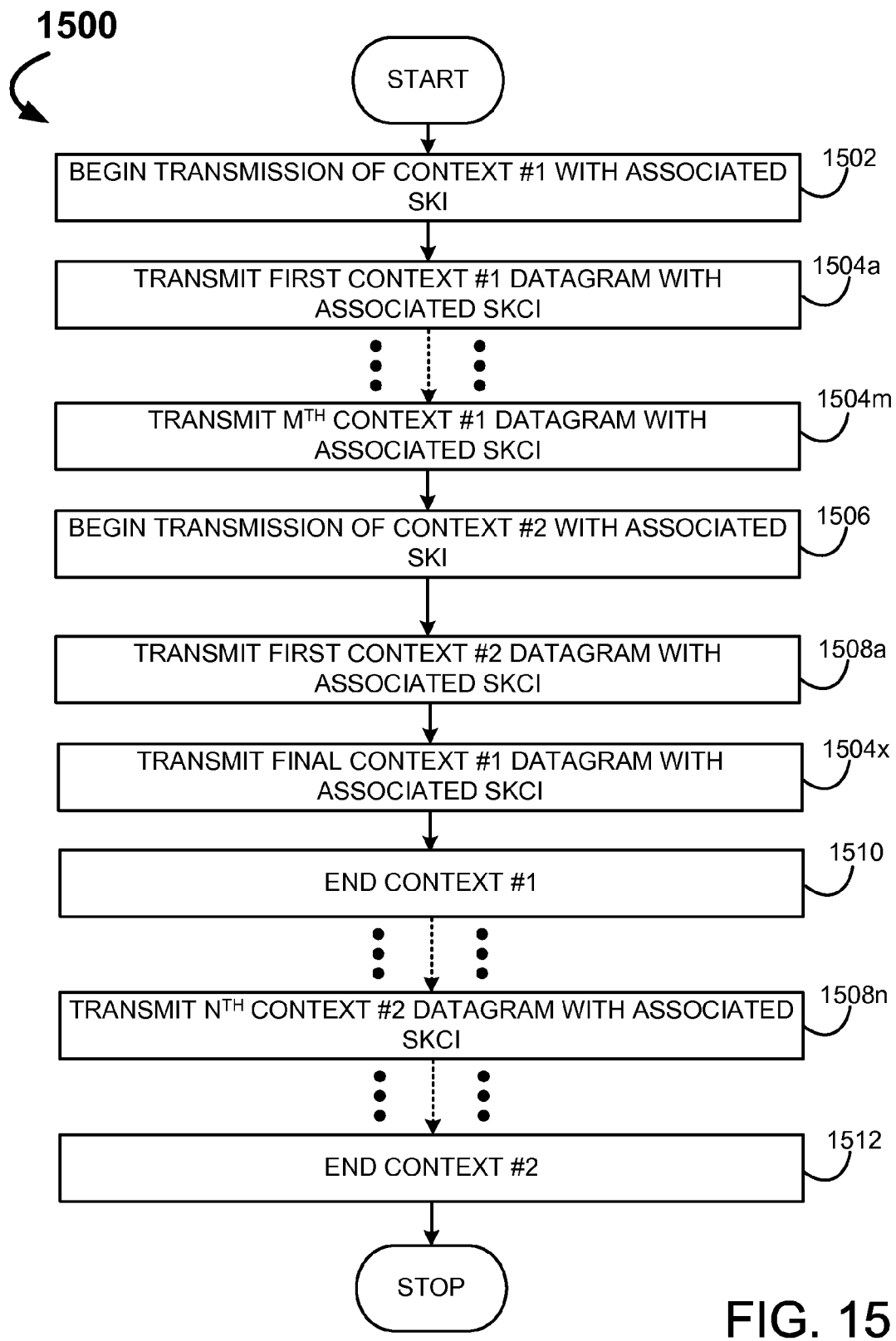
FIG. 15 is an example process flow for the delivery of datagrams associated with a pair of contexts, using the content delivery system, in accordance with some embodiments of the present invention.

In some embodiment shown in FIG. 14, a start-of-context datagram is sent immediately prior to the sequence of datagrams with a common SKI context (at step 1402) and an end-of-context datagram is sent immediately subsequent to the transmission of the last datagram in the context (at step 1410). In order to facilitate alternating between contexts on a packet-by-packet basis, multiple contexts may be used. Thus, as shown in FIG. 15, it is possible to interleave packets from different contexts so long as i) the context identifiers are uniquely distinguishable and ii) the transfers within the context are properly framed by start-of-context and end-of-context datagrams. Datagrams transferred within the context are still needed to be authenticated and/or encrypted according to the SKI. In many instances, it is desirable to include other large bit field information in the SKCI datagram which may be necessary to authenticate and/or decrypt the datagram, for example, cryptographic initialization vectors (IV).

According to some embodiments of the invention, when long sequences of datagrams with SKCI compression are transferred over a medium where packet losses occur without the possibility for repair (for example, one-way transmissions with no return channel), additional start-of-context datagrams may be sent at periodic intervals as shown at step 1406 of FIG. 14 to refresh the SKCI information, so that the loss of a single start-of-context datagram does not compromise the entire transfer. For example, when streaming digital audio using one-way digital radio technologies, a return path to confirm datagram reception may be too expensive or otherwise unavailable. In this case, the exact time at which the endpoint receiver is directed to receive packets for a given service may not be coincident with the arrival of a SKCI datagram. In this event, even if no further packet losses occur, datagram packets are not decodable until the arrival of the next SKCI datagram which identifies the appropriate context. For media applications, a repetition interval of less than about 4 seconds is recommended in order to accomplish acceptable acquisition delay. According to some embodiments of the invention, the endpoint receiver may cache SKCI datagram packets in its memory in order to quickly reconfigure for a service for which a SKCI datagram was previously received.

When a return path (backchannel) is available to determine reliable delivery of the datagrams (i.e., packet acknowledgement), the returned information is, in some embodiments, authenticated by the same key or a key common derived from the same master key as the received datagram that requires acknowledgement. This provides a guarantee of delivery without risk of datagram spoofing since the return acknowledgement packets require knowledge of the underlying authentication key for the transmitted datagram. The return path datagram may be a relatively low-level (for example, confirmation of the receipt of a specific datagram) or at an application level (for example, conformation of a playlist having successfully played out individual media items at specific times). According to some embodiments of the invention, the separation of the data communication paths into a separate 'downlink' and 'uplink' limits the system's vulnerability to the occurrence of datagram flooding, either intentionally initiated by malicious action or unintentionally in emergency situations (for example, civilian disasters), because i) the downlink throughput is unaffected by such attacks and ii) the uplink datagrams can be screened by fast authentication of the datagram sequences.

Figure 16:
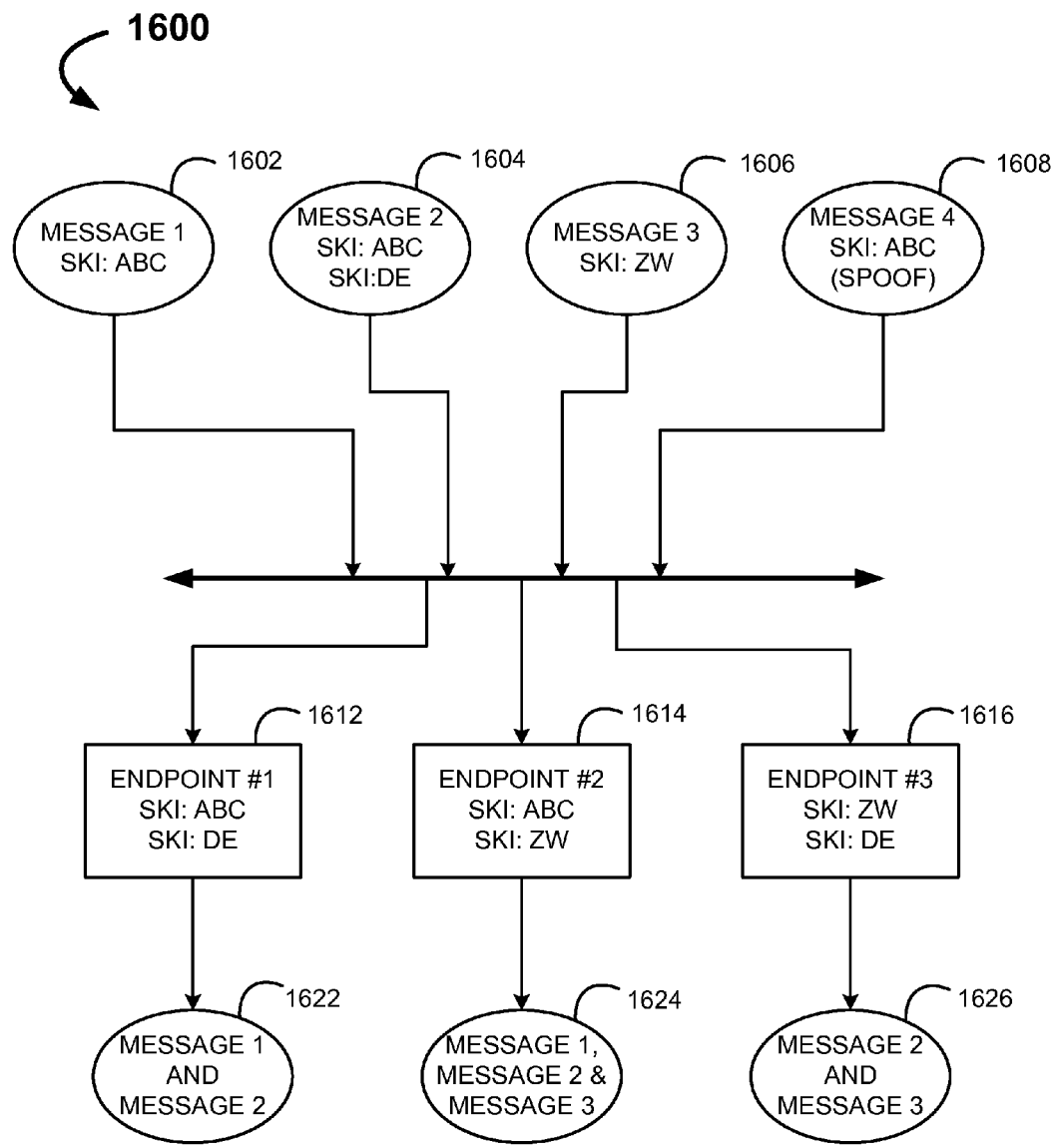
FIG. 16 is an example block diagram of the coding of data messages with differing Service Key Identifiers (SKIs) for the delivery to particular endpoints in accordance with some embodiments of the present invention.

In some embodiments, in order to determine if datagrams are to be received by a specific endpoint (often a receiver, router or relay), each endpoint maintains a table of (visible) service (authentication) key identifiers and their corresponding (secret) service encryption keys. As datagrams are received by the endpoint, the SKI entries in the datagram (or current context) are compared to the table entries. Authentication of the datagram payload is attempted if a match is found. Once a match is found, further examination of other SKI entries is not required. If none of the SKI fields in the datagram match the SKI fields in the internal endpoint table, the datagram is discarded. For example, in FIG. 16, four datagrams 1602, 1604, 1606 and 1608 are created for delivery to endpoints 1622, 1624 and 1626. The service keys are shortened and shown as alphabetic sequences for sake of clarity in the example. The visible keys are ABC, DE, and ZW. Three of the datagrams are valid (Msg1 1602, Msg2 1604 and Msg3 1606) and one datagram (Msg4 1608) is a 'spoof' datagram. The spoof datagram 1608 has the same SKI field (e.g., ABC, same as Msg1 and Msg2) but its authentication field does not correspond to the correct underlying key. For example, the spoof datagram 1608 may be introduced by a hacker in an attempt to send invalid data to an endpoint. The set grouping defines that Msg1 1602 is to be delivered to endpoints#1 and #2 1622 and 1624, respectively. Msg2 1604 is to be delivered to endpoints#2 and #3 1624 and 1626, respectively. Msg3 1606 is to be delivered to endpoints#2 and #3 1622 and 1624, respectively. Msg4 1608 is not received by any endpoint because none of the endpoints can successfully authenticate the spoofed packet even though the SKI is present in the endpoint table.

According to some embodiments of the invention, the SKI table entries in the endpoints may be perishable, in other words, the keys may have a specific time interval of validity, or the keys may be restricted in terms of use count. When the keys are validated by time, periodic time-of-day datagrams are sent to the endpoints in order to refresh current endpoint time unless the endpoint has a tamper-proof internal real-time clock (RTC). The timestamp datagrams, when sent, may, in general, be authenticated by the corresponding service (content) decryption keys. When a trusted source of timestamp datagrams is available, for example, from the network provider, it may be possible to use a 'system-information' key instead of a specific service decryption key, although timestamp authentication by actual service decryption keys (or derivable keys) is recommended in most applications to eliminate so-called "man-in-the-middle" risks. Thus, the timestamp identifies the time validity of the key. In some embodiments, the timestamp is signed by the appropriate key. If it is a timestamp on the encryption key, then the encryption key is used to sign the timestamp. On the other hand, if it is an authentication key, then the authentication key is used to sign the timestamp, in some embodiments of the invention.

Figure 17:
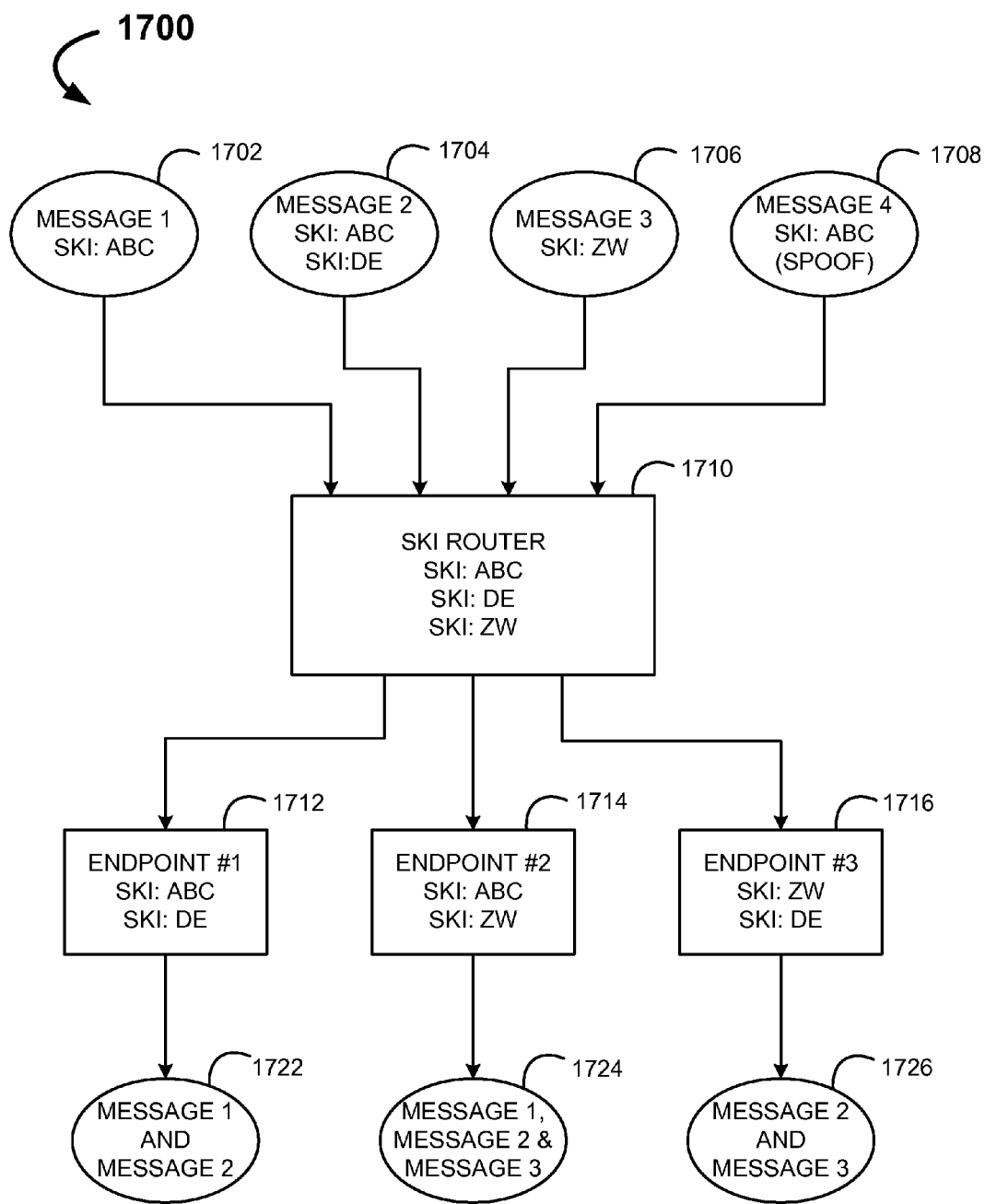
FIG. 17 is an example block diagram of the coding of data messages with differing SKIs through a SKI router for the delivery to particular endpoints in accordance with some embodiments of the present invention.

When the physical transport media is radio broadcast, as in some embodiments, there may be a direct physical connection (e.g., line-of-sight free space) between the source of the datagrams and the end points. In these implementations, further datagram routing is usually not required. However, when datagrams are needed to be transported across different physical media, it may be necessary to receive and re-transmit datagram traffic, for example, when converting from a short-range wireless physical link to a long-range optical fiber interconnection. In some embodiments it may be possible to re-transmit all of the datagram traffic, especially when transporting from a physical media with less bandwidth capacity to one with much greater capacity (for example, converting from FM SCA to short range wireless such as 900 MHz ISM-band). However, in many applications, it may be preferable to reduce the datagram traffic to those datagrams required for delivery to endpoints with a specific subset of authentication keys. According to the invention, in these embodiments, a service key router as shown in FIG. 17 may be implemented in order to determine the validity of datagrams prior to forwarding of the datagrams. The service key router 1710 needs to have service authentication key information for all authentication keys for endpoints 1712, 1714 and 1716 beyond the service key router 1710 boundary. An advantage of the service key router approach is that the router 1710 guarantees packet validity so that endpoints 1712, 1714 and 1716 beyond the router 1710 are not required to validate all of the datagrams, which may reduce the power and/or cost of endpoint implementation.

IV. Power and Cost Savings

Now that the specifics of content delivery have been explained, numerous ancillary methods of reducing the cost of data delivery and reducing battery power loads will be discussed in greater detail. These systems and methods of reducing receiver cost, delivery cost, and power requirements on the receiver may be separately implemented, or may be implemented in context of the greater content delivery scheme.

Note that, for instances where multicast delivery is most desired over unicast delivery (i.e., availability constraints and financial constraints) both cost and power are of particular issue. For example, in a developing country the average per-capita income tends to be very low. In these cases, reducing costs of the receivers is very important for the users. Likewise, recharging may be logistically difficult; therefore, a long device battery life becomes very important as well.

Another example of where battery life is of particular concern is for e-reader (e-book) type devices. These devices are intended to mimic actual books and other printed materials. This includes having a long battery life in order to minimize recharging events. With the advent of E-Ink many e-readers have excellent battery life since no additional power is consumed once the page is displayed. Only changes in the displayed content consumes display power for these devices, the main source of power consumption. Many main-stream e-reader devices operate using E-Ink technology, including the Kindle®. However, what should be an extremely long battery life of the e-reader is often cut short by the power consumed by the wireless transceiver. For example, the Kindle® may last a couple weeks (or longer) with a single charge if the wireless is shut off. This battery life drops to a mere few days once the wireless is enabled. Some embodiments of the present invention address this need for long battery life while fulfilling the connectivity needs of the device.

Embodiments of the present invention are disclosed below which address these concerns for reduced costs and increased battery life. These include 1) methods of leveraging existing hardware in order to increase the range of devices capable of receiving content, as well as reducing costs of developing and manufacturing new receiver devices, and 2) reducing the time that a receiver needs to remain active, thereby saving battery power.

A. Automatic Updating for Lower Cost Devices

Figure 18:
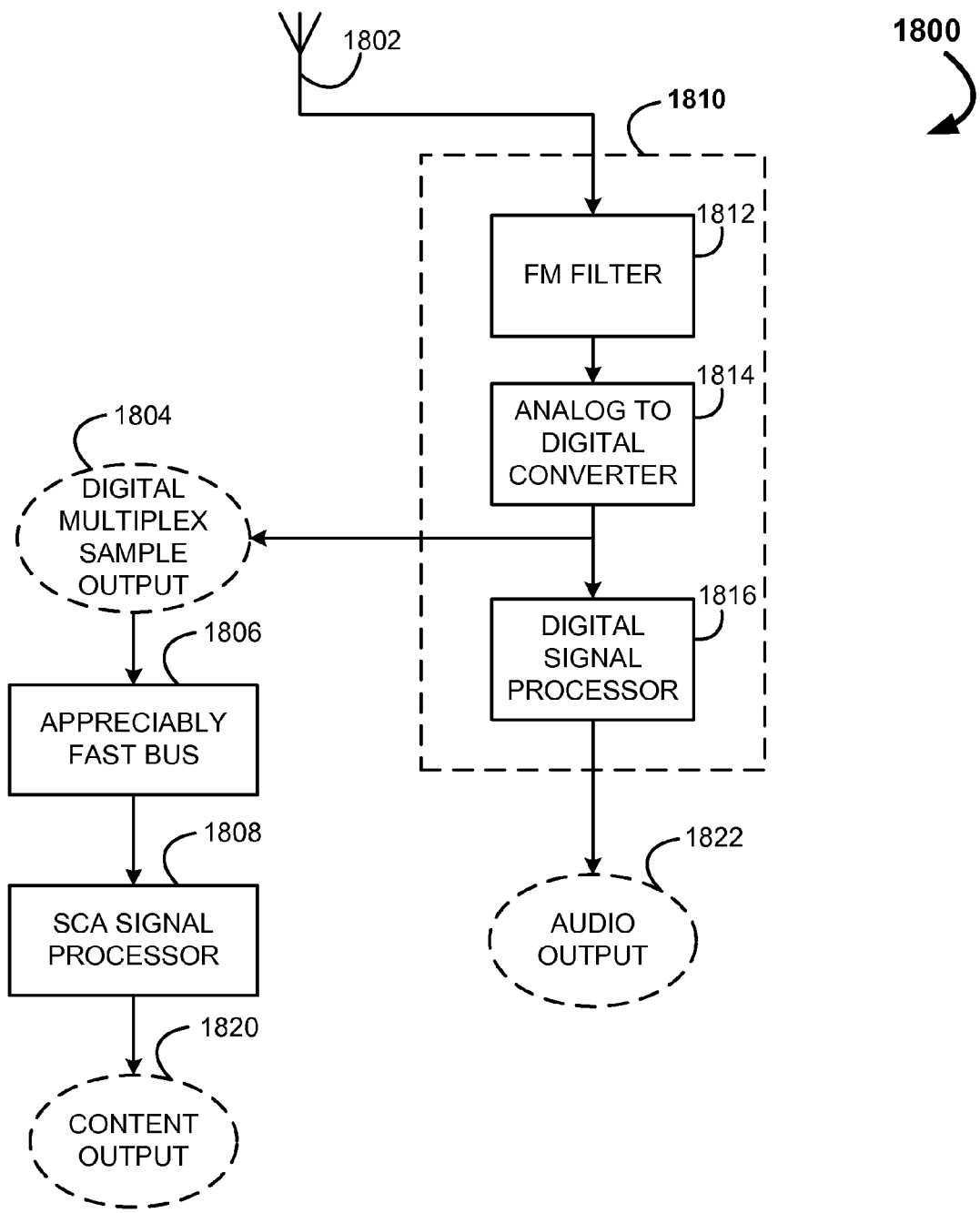
FIG. 18 is an example block diagram of a combo receiver chip design in accordance with some embodiments of the present invention.

FIG. 18 is an example block diagram of a combo RF subsystem for use in a low cost, mass-market, consumer device in accordance with some embodiments of the present invention. As noted previously, most RF subsystems 1810 are embodied on a singular combo chip, and are typically designed today to include a RF transceivers as part of the chip design. These RF subsystems 1810 include a digital FM filter 1812, an Analog to Digital (A/D) Converter 1814, and a Digital Signal Processor (DSP) 1816. In some embodiments, the RF subsystem 1810 may likewise have additional functionality such as a cellular transceiver, GPS receiver, and the like. Typically, RF combo chips include WiFi and Bluetooth at minimum, and often also include GPS and/or FM. Cellular transceivers are often provided in separate combo chips, since they are fairly complex and large subsystems in and of themselves, incorporating multiple radio frequencies and/or protocol stacks, although they can be combined with other wireless features when targeted at mobile handsets. An example of a typical combo chip: includes Broadcom's combo chip number BCM4325.

RF subsystems are often embodied on a single chip because, as previously discussed, the cost of including the FM circuitry on the chip is often substantially lower than generating multiple chip types. Thus, many combo chips include a FM tuner circuit in case a purchaser of the chip desires its functionality. Thus, many devices which do not currently have FM receiver functionality actually include the required hardware to enable the receipt of these signals. In many cases, minor firmware and/or package pin-out changes are all that is necessary to enable current devices to become capable of receiving FM multicasts.

An Antenna 1802 may receive the FM radio transmission and provide the analog signal to the FM Filter 1812. The signal is then provided to the A/D Converter 1814. In a typical audio receiver setup, the DSP 1816 would then process the digital signal to produce the Audio Output 1822. However, for receiving data, a Digital Multiplex (MUX) Sampling 1804 may be taken prior to the DSP 1816. This Digital MUX Sample 1804 may be provided to an appreciably fast Bus 1806. For the purposes of this application, "appreciably fast" may be defined as 4 Mbytes per second. In some embodiments, an I²S bus may be sufficient for use as the appreciably fast Bus 1806. As is known in the art, an I²S (Integrated Interchip Sound, or IIS) is an electrical serial bus interface standard used for connecting digital audio devices together. It is commonly used to carry PCM information between the CD transport and the digital analog converter in a CD player. The I²S bus separates clock and data signals, resulting in a very low jitter connection.

The Digital MUX Sample 1804 may then be processed by a SCA Signal Processor 1808 in order to generate the Content Data 1820. This sampling prior to the integrated DSP 1816 occurs because the data content is typically at a higher frequency then the audio component of the transmission. The DSP 1816 removes this higher frequency portion of the transmission in order to isolate the audio feed. Thus, in order to maintain the data content, the sampling needs to be taken prior to the removal of the higher frequency data portion.

Under some circumstances, nearly all of the requisite hardware is in existence in the device to enable receipt of radio signals encoding content data. For example, most cellular enabled devices (i.e., cell phones, e-readers, GPS, etc.) include an antenna, a combo chip including the FM receiver, and processing power. Note, however, that antennas are specific to frequency bands, and most devices do not include an internal FM-band antenna, even if they have an FM receiver. Many devices require the user to attach a headset to listen to FM and use the headset cord itself as the antenna; others (like car GPS devices) use the power cord of the device as a FM antenna. These devices, in many circumstances, only require minor firmware adjustments to gain the added functionality of being able to receive data content over FM radio waves. Other times, minor adjustments to hardware configuration are required, such as the inclusion of an internal FM antenna. However, the cost of a radio receiver chip is relatively low (typically sub-dollar level); thus, the inclusion of these chips in future consumer electronics is readily doable since the overall manufacturing cost increase is low when compared against the retail price of the finished device.

In some embodiments, a device may be further configured to include multiple FM receivers. Such a device may be configured that a first FM receiver provides the digital Multiplex Sample Output 1804 in order to enable the receipt of content data, and a second FM receiver undergoes DSP in order to generate an Audio Output 1822. Thus, such a device could be enabled to play audio while simultaneously receiving data on an unrelated frequency.

The importance of such a simple, and low cost, receiver setup is that a much wider range of devices may thus be configured to receive data updates. This includes lower cost, and ultra-low cost devices. For example, a universal remote control could become wirelessly updated. Current remotes, when capable of updating, rely upon being physically synched up to a computer in order to be updated.

Another example, where connectivity of lower cost devices being updated is particularly helpful includes thermostats. These devices could receive updates on future weather patterns in order to modify their programming. For instance, if the following day is supposed to get very hot, a connected thermostat may avoid operating the heater in the cold morning in order to keep the temperature as cool as possible prior to the hot portion of the day. It may even start using the air conditioner prior to the rise in temperature to avoid placing a heavy load on the power grid latter, and also in order to provide a buffer once the outside temperature rises.

Many lower cost, mass marketed, consumer devices are considered which may benefit from connectivity for automated updates in this manner. These include cameras, camcorders, GPS, televisions, media players, appliances, automobiles, construction equipment, and virtually any consumer electronic device, to name a few.

Figure 19:
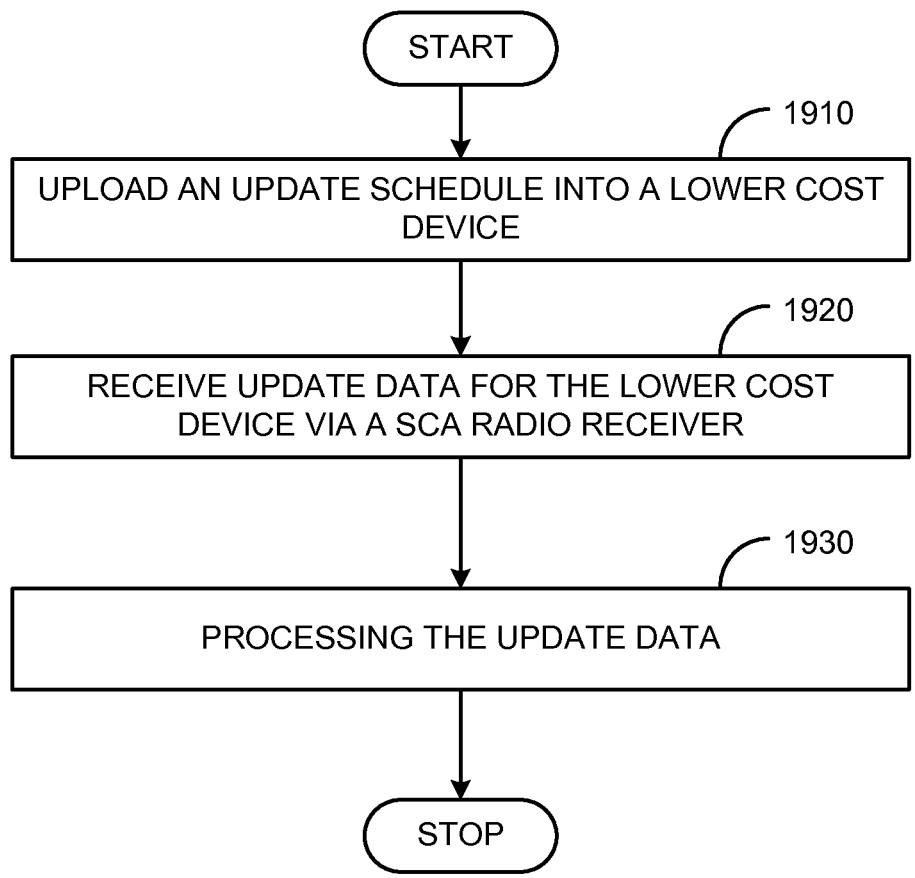
FIG. 19 is an example flowchart for updating a lower cost electronic device in accordance with some embodiments of the present invention.

FIG. 19 is an example flowchart for updating a lower cost electronic device in accordance with some embodiments of the present invention. This method relies upon an update schedule being uploaded within the device, at step 1910. The schedule enables the device to tune in at particular times in order to receive updates. This reduces power requirements since the receiver may be disabled at other times.

Update data may then be transmitted for receipt by the lower cost device, at step 1920. By using a SCA receiver for multicast, instead of a unicast cellular receiver, the cost requirements on the receiver device, as well as delivery costs are greatly reduced. Thus, in circumstances where it would typically be financially prohibitive to have a wirelessly updatable device (i.e., universal remote control), the costs may be reduced to levels where wireless automated updates are now possible via FM radio frequency data transmission.

After receipt of the data the device processes it for the update, at step 1930. In many low power devices the processing resources available are typically limited. Updates may be formatted and transmitted in enough time for these lower power devices to process and implement the updates before they become applicable. The process then ends. In this way, a wide variety of low cost devices may be enabled to update automatically without any appreciable increase in device manufacturing cost, an appreciable decrease in battery power consumption, or without any reduction in device functionality.

B. Delayed Processing of Delivered Content

Another way to reduce manufacturing costs for devices is to reduce the processing requirement of the device. In a typical media device (including cellular phones), the processor selected is just powerful enough in order to meet the most demanding application on the device. Using a processor more powerful than this is unnecessary and costly, since one of the single largest cost of manufacturing these devices is the microcontroller processor.

By adding wireless receipt of content data in a RF transmission, and the required processing to extract out the data from the radio signal, the overall processing requirements of the device are increased. This may be remedied by increasing the processor's capabilities; however, this also results in a higher manufacturing cost for the device. Instead, systems and methods of delaying the processing of the received transmissions are provided. Thus, the device may delay processing requirements until the device has excess available processing resources. In this way the existing processor capacity of the devices remains sufficient, even though functionality is being added. This makes it economical to incorporate FM multicast receivers in devices that could not bear the costs of upgrading a processor, upgrading its power (battery) source or adding a separate FM data receiver subsystem.

Figure 20:
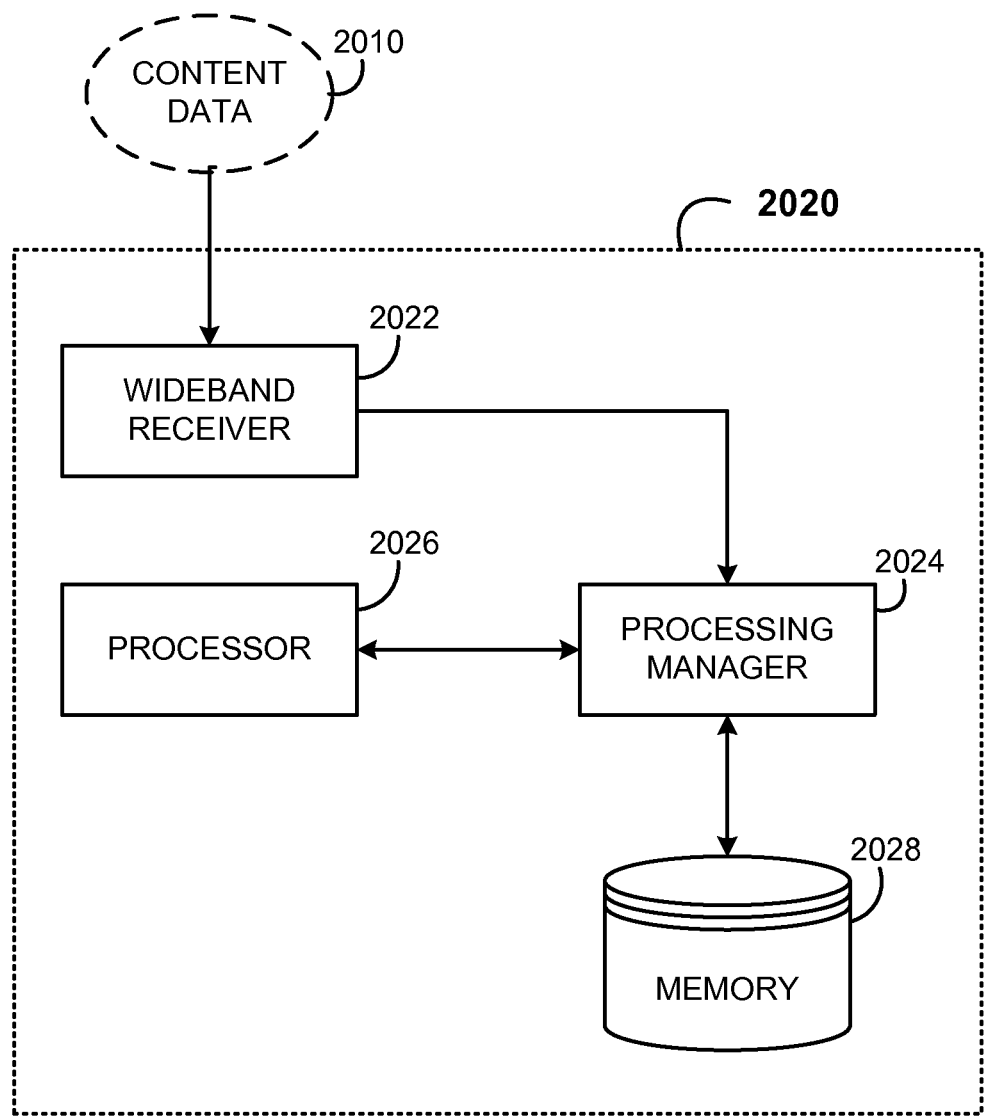
FIG. 20 is an example block diagram for a system configured to intelligently process received data in accordance with some embodiments of the present invention.

FIG. 20 is an example block diagram for a System Configured to Intelligently Process Received Data 2020, in accordance with some embodiments of the present invention. Here content Data 2010 is being received by the Wideband Receiver 2022. A Processing Manager 2024 reviews the current Processor 2026 utilization. If excess processing power is available, the data may be processed into a media file. If there is insufficient processing power available, on the other hand, the Processing Manager 2024 may instead store the raw content Data file 2010 in Memory 2028. Memory 2028 may often be flash memory or other solid state memory type. Memory 2028 may also include a disk drive, or the like.

The action of storing the raw content Data 2010 to memory does not require much processing power, and thus even if the bulk of the processor is being utilized, this action may be performed without requiring the device to have a larger processor than would be required for a similar device without the ability to receive data over a RF signal. After the Processor 2026 is no longer being utilized as rigorously, then the system may recall the stored content Data 2010 and finish processing the file.

Figure 21:
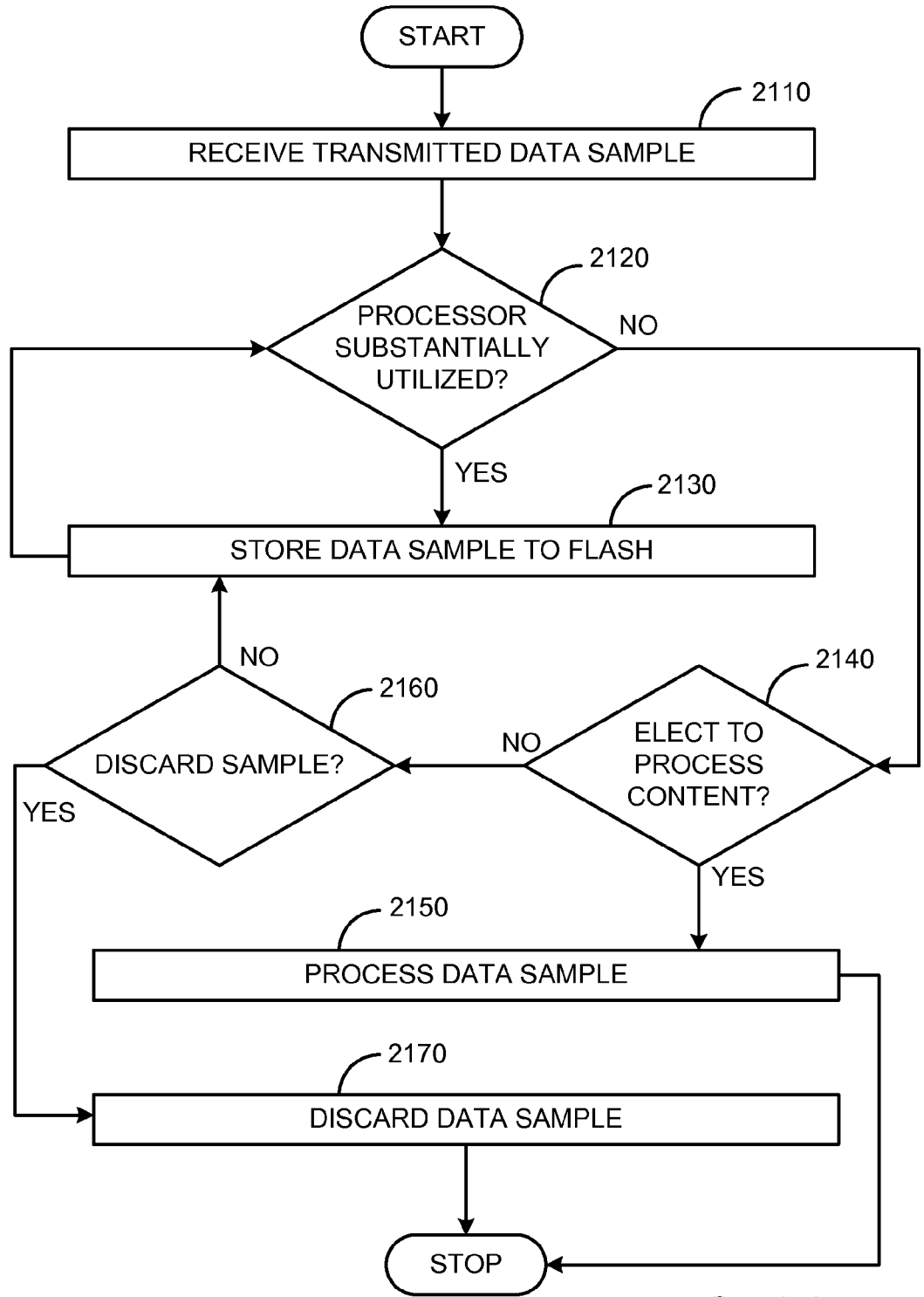
FIG. 21 is an example flowchart for intelligently processing received data in accordance with some embodiments of the present invention.

FIG. 21 is an example flowchart detailing the processing of received data in accordance with some embodiments of the present invention. The method begins by receiving a transmitted data sample, at step 2110. Although this receipt of the sample is described in context of FM SCA radio transmission, other samples received via other transmission mediums may also be considered by this cost saving method. For example, this delayed processing of samples may work equally well with a data clip (packet) received over a unicast transmission, in some embodiments. However, due to the special needs of multicast delivery systems to reduce costs as much as possible, the remainder of the discussion regarding this cost saving technique will center on FM radio multicast transmissions.

The flow then progresses to step 2120 where an inquiry is made as to whether the processor is substantially being utilized. Substantial utilization may be based upon a percentage of processor usage (i.e., 80% or above), or may be dictated by the processing needs of the received data sample.

If the processor is substantially being utilized, then the process proceeds to step 2130 where the data sample is stored to flash (or other memory). Then the process returns to step 2120 until the processor is no longer being substantially utilized.

Else, if the processor is not being substantially utilized, then the process progresses to step 2140 where an inquiry is made as to whether to elect to process the content. In some embodiments, data may be sent to a receiver device that the user may never desire to access. In these cases it may be desirous to be able to only process the data when it is needed in order to further reduce processor demands, and reduce power consumption. For example, a user may receive a copy of the New York Times® on her e-reader device daily. She may routinely view the world news section, sports section and entertainment section. However, she may find her political, business, and local news elsewhere. It may be desirous then to not process the entire issue of the New York Times® for this user, as substantial portions of the paper go unread.

If there is an election to process the content, this may then be performed at step 2150. Otherwise, if the processing of the content is not elected at step 2140, the process may continue to step 2160 where an inquiry is made whether to discard the sample. Samples may be discarded after an expiration time or by an active selection by the user. Discarding of the sample may be performed at step 2170. If the sample is not to be discarded, however, the process may return to step 2130 where the sample data is stored (or remains stored) within the memory.

Delayed processing, as described above, may lower peak processor requirements in exchange for longer processing sessions. While there is little aggregate effect on battery life when samples are processed, this method enables samples which are not of interest to be deleted prior to processing, which may result in longer battery life. Further, by reducing peak processing requirements, the hardware necessary to enable a device to receive and process media content via a FM radio transmission may be substantially similar to current hardware within these devices.

In some embodiments, an intermediate form of the received signal, between raw samples and content data bits, may be stored by partially processing the received samples before storing. For example, the raw samples might be processed by the FM demodulator (if sufficient processor resources are available for this step), but other receivers functions such as forward error correction coding and/or decryption processing (if used by the reception system) might be deferred until increased processor resources are available or be queued for processed at a less-than real-time rate. In this example, demodulator output values would be stored for deferred processing, possibly in the form of hard-decision base-band bits or soft-decision arbitrary-precision approximated deviations from base-band bits.

C. Reduced Operational Battery Power Requirements

In addition to reducing power and hardware manufacturing costs associated with receiver devices, it is equally important in many multicast scenarios to reduce the battery power requirements on the devices. Radio receivers, by their very nature, tend to have lower battery power requirements than cellular transceivers. This is because the radio receiver merely 'listens' to the RF spectrum, whereas cellular transceiver also have to periodically transmit in order to ping nearby cellular base stations. This battery power requirement for a cellular transceiver becomes even more burdensome the further the device is from a cellular base station. This is because the device must transmit at a higher power level in order to be 'heard' by the base station when further from it.

Regardless of the fact that a FM receiver has a lower battery power consumption rate than a cellular transceiver, there is still a need to further reduce battery power consumption. As discussed earlier, e-reader (e-book) devices may benefit dramatically by longer battery life. Likewise, emergency receivers, non-rechargeable, or infrequently rechargeable, battery-operated devices, and other low cost receivers may also benefit immensely from extended battery life. One method for reducing power consumption would be to reduce the time period the receiver remains active.

Figure 22:
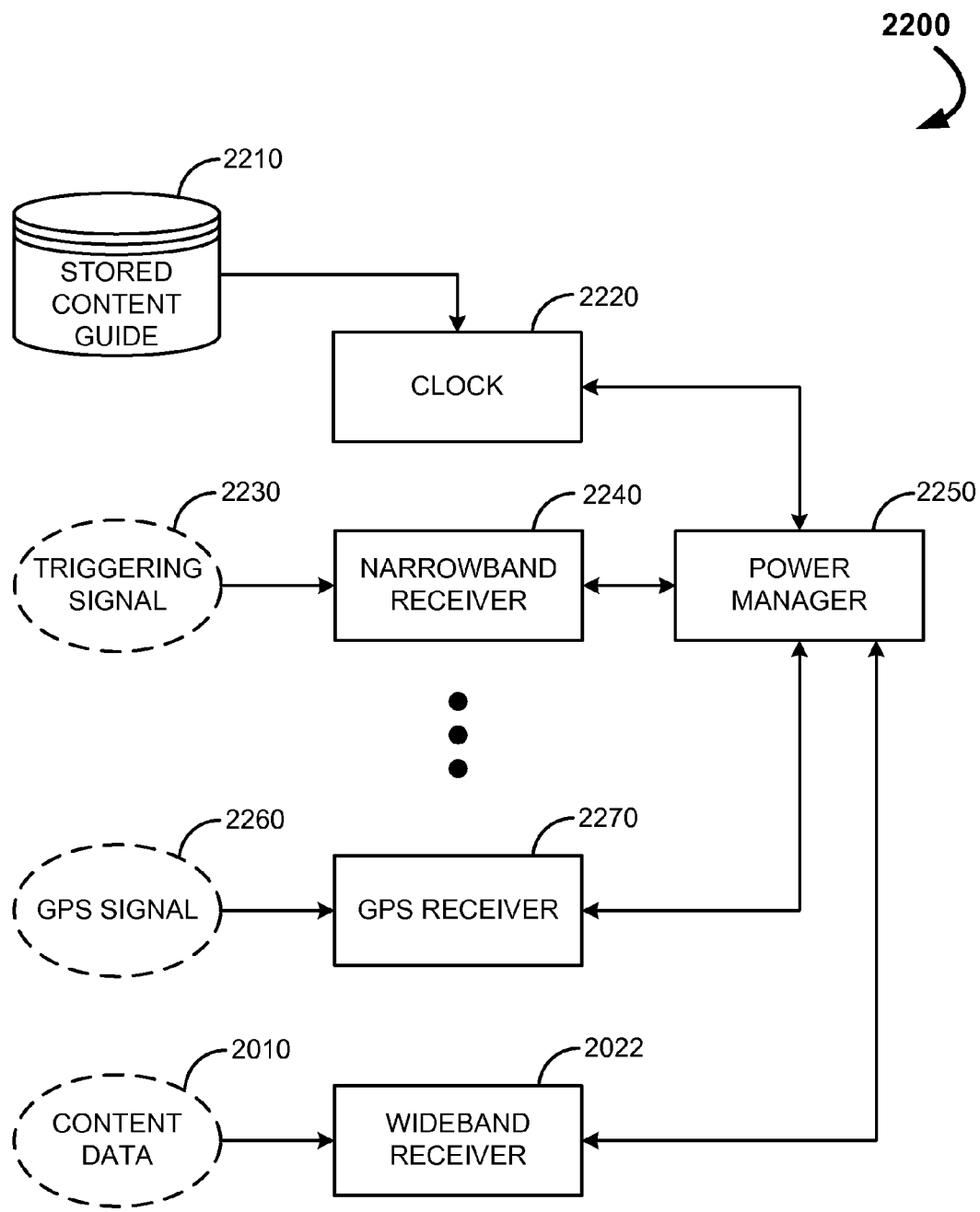
FIG. 22 is an example block diagram for a power management system in accordance with some embodiments of the present invention.

FIG. 22 is an example block diagram for a Power Management System 2200 in accordance with some embodiments of the present invention. A Power Manager 2250 may utilize one or more inputs in order to determine when to activate and deactivate (standby mode) the wideband Receiver 2022, which in turn then receives the Content Data 2010. In the most basic embodiments, the Power Manager 2250 may access a stored Content Guide 2210 and a Clock 2220. The Content Guide 2210 may indicate scheduled transmission times for the device, and the clock may be used to track time. When data is supposed to be transmitted, the Power Manager 2250 may activate the Receiver 2022 to receive the Content Data 2010. Often the content Data 2010 may include updates to the Content Guide 2210 such that a current guide is always in effect. In some embodiments, the Power Manager 2250 may instruct the Receiver 2022 to remain active more frequently as the end of the content Guide 2210 is nearing without an update.

Another mechanism for determining when to activate the Wideband Receiver 2022 may include using an ultra low power Narrowband Receiver 2240. A triggering Signal 2230 may be transmitted prior to transmission of the Content Data 2010, in some embodiments. This Triggering signal 2230 may be received by the Narrowband Receiver 2240 in order to indicate to the Power Manager 2250 to activate the Wideband Receiver 2022 to receive the Content Data 2010. The benefit of such a system is that the Wideband Receiver 2022 is only activated when data is actually being transmitted. Further, there is no need to rely upon a schedule which may expire or otherwise become invalid in this embodiment.

Another mechanism for determining when to activate the wideband receiver may include monitoring location data Signals 2260 using a GPS Receiver 2270. A change in location may prompt the Power Manager 2250 to activate the Wideband Receiver 2022. Further, additional inputs may prompt the system to activate the Wideband Receiver 2022, such as user input, device configuration, application installation, or any other reasonable inputs.

Figure 23A:
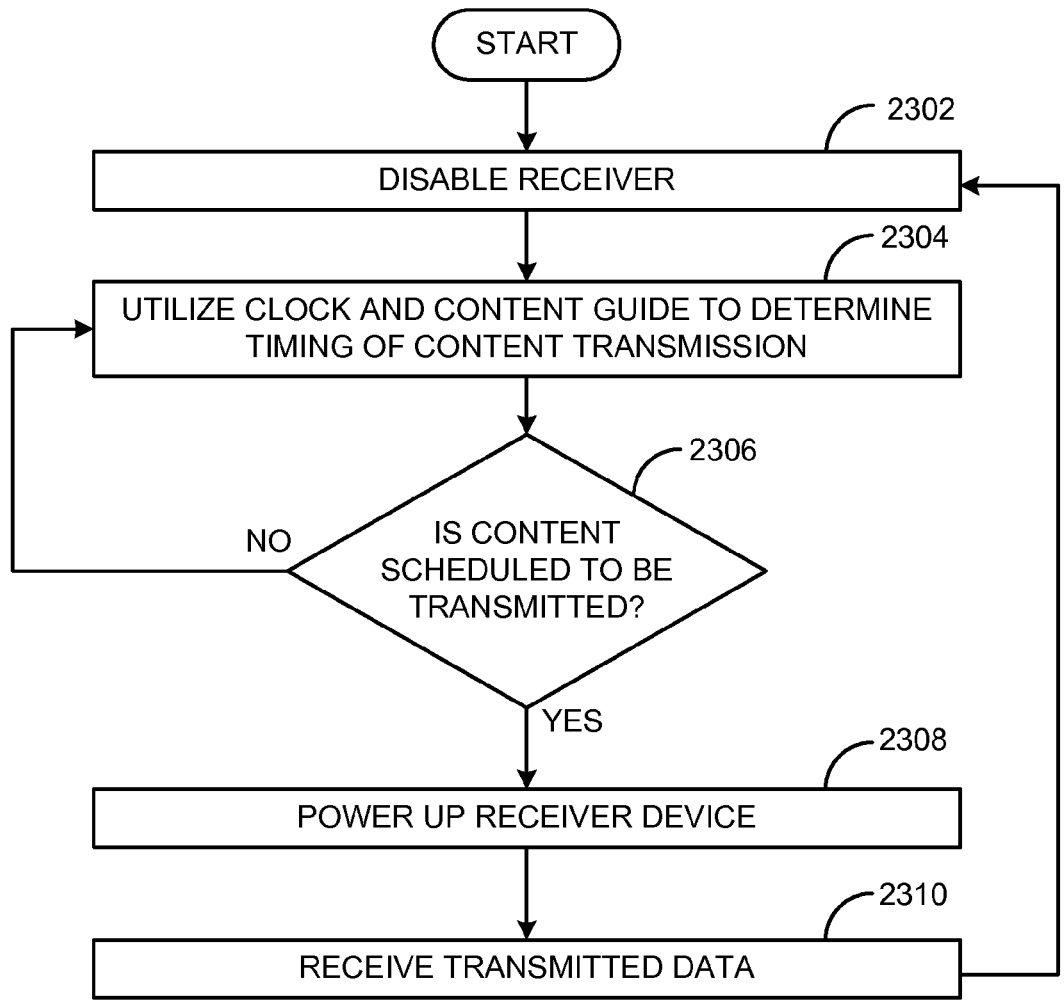
FIG. 23A is a first example flowchart for regulating receiver power using a clock in accordance with some embodiments of the present invention.

FIG. 23A is a first example flowchart for regulating receiver power using a clock in accordance with some embodiments of the present invention. Here the wideband receiver is first disabled (i.e., in standby) at step 2302. At step 2304 the power manager may access a clock and a content guide to determine timing of the next content transmission.

The process continues to step 2306 where an inquiry is made whether content is presently being transmitted. If not, the process returns to step 2304. Otherwise, if content is being transmitted, at step 2306, then the process continues to step 2308 where the wideband receiver is powered up (activated). Then the transmitted data may be received, at step 2310. After which, the process may return to step 2302 where the receiver may repeat the process by deactivating the wideband receiver again (standby mode).

Figure 23B:
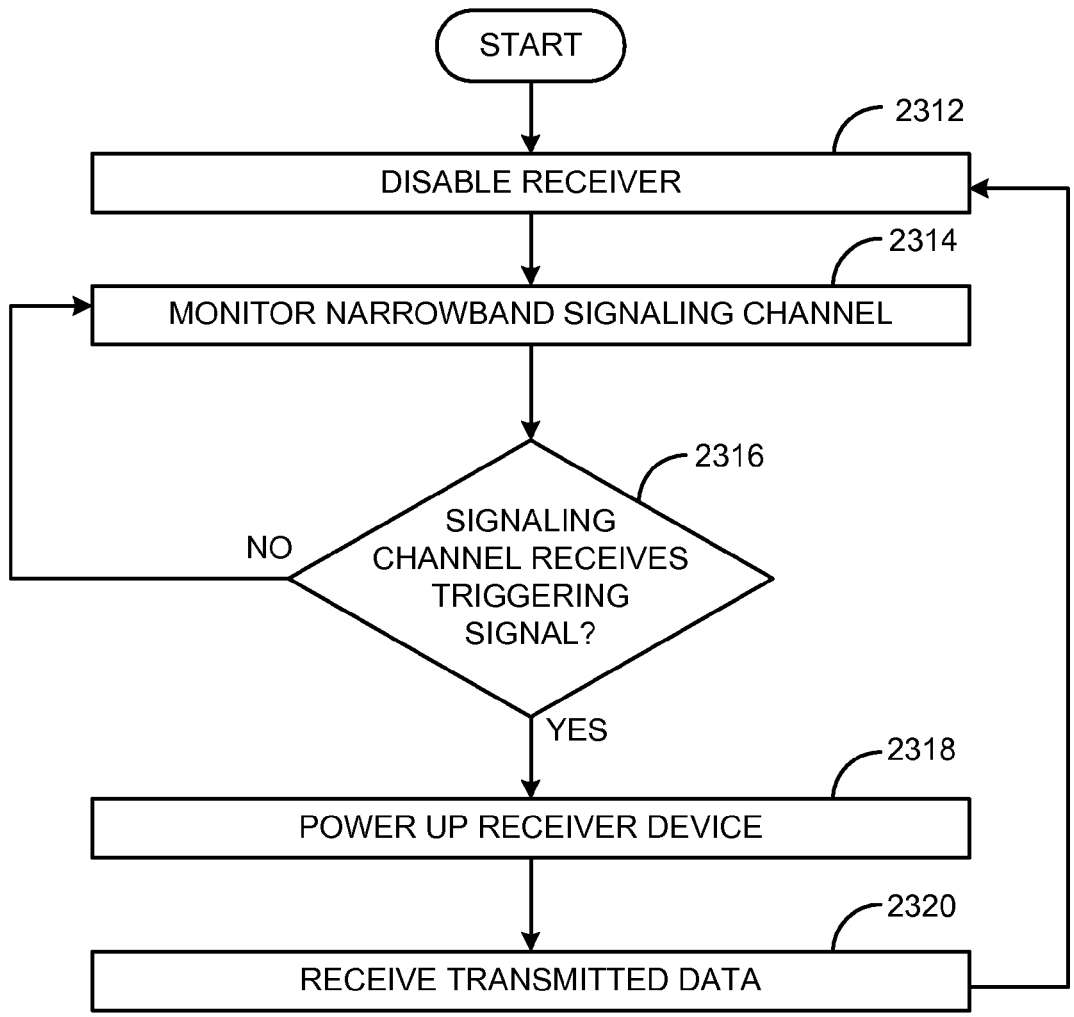
FIG. 23B is another example flowchart for regulating receiver power using a signaling channel in accordance with some embodiments of the present invention.

FIG. 23B is another example flowchart for regulating receiver power using a signaling channel in accordance with some embodiments of the present invention. Like with the previous example, here the wideband receiver is first disabled (in standby) at step 2312. At step 2314 the Power Manager 2250 may monitor a low power narrowband signaling channel.

The process continues to step 2316 where an inquiry is made whether a triggering signal is being received by the signaling channel. If not, the process returns to step 2314, where the signaling channel is continued to be monitored. Otherwise, if a triggering signal is being received via the narrowband, at step 2316, then the process continues to step 2318 where the wideband receiver is powered up (activated). Then the transmitted data may be received, at step 2320. After which, the process may return to step 2312 where the receiver may repeat the process by deactivating the wideband receiver again.

Figure 23C:
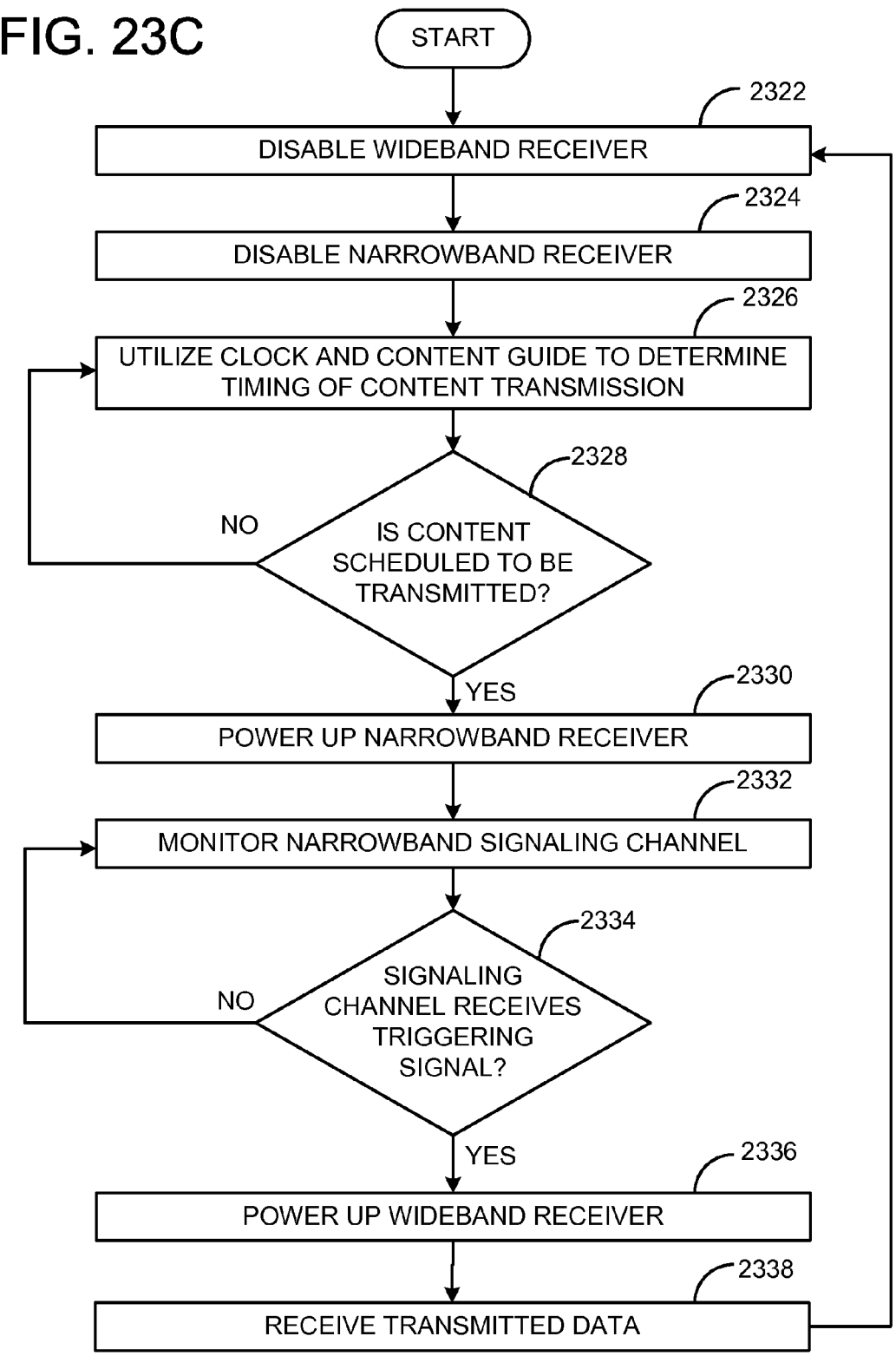
FIG. 23C is another example flowchart for regulating receiver power using a clock and a signaling channel in accordance with some embodiments of the present invention.

FIG. 23C is yet another example flowchart for regulating receiver power using a clock and a signaling channel in accordance with some embodiments of the present invention.

Like the previous power saving methods, this process begins by first disabling the wideband receiver at step 2322.

The narrowband receiver may then also be disabled at step 2324. At step 2326 the power manager may access a clock and a content guide to determine timing of the next content transmission.

The process continues to step 2328 where an inquiry is made whether content is presently being transmitted. If not, the process returns to step 2326. Otherwise, if content is being transmitted, at step 2328, then the process continues to step 2330 where the narrowband receiver is powered up (activated). At step 2332 the power manager may monitor a low power narrowband signaling channel.

The process continues to step 2334 where an inquiry is made whether a triggering signal is being received by the signaling channel. If not, the process returns to step 2332, where the signaling channel is continued to be monitored. Otherwise, if a triggering signal is being received via the narrowband, at step 2334, then the process continues to step 2336 where the wideband receiver is powered up (activated). Then the transmitted data may be received, at step 2338. After which, the process may return to step 2322 where the receiver may repeat the process by deactivating the wideband receiver again.

This method of power management may be useful for extremely low power devices which power down almost completely between content transmission events. When such an event may occur, the device powers up only a low power narrowband to determine if there is actually data being transmitted. This may be useful when many of the scheduled transmission times do not necessarily have content for the receiver device. Thus, only when data is actually being transmitted will the system power on the wideband receiver.

This kind of 'hybrid' power regulation method may rely upon multiple inputs in order to determine when to power up the wideband receiver. This example method utilizes the clock and the triggering signal to determine when to activate the wideband receiver. Alternate methods exist which utilize more, or other, inputs (such as GPS location data) to determine when to activate the wideband receiver.

V. Content Processing for Delivery

Unlike the previous section which was dedicated to the reduction of power usage and cost associated with delivering content over a radio based multicast delivery platform, the present section will instead focus on the handling of data in order to deliver the widest range of content to receivers in the most efficient way possible to enhance user experience. Through the use of error tolerant streaming of content, preemptive retransmission, and/or special handling of Data Rights Management (DRM) content, a rich set of data may be provided in an efficient manner to a wide range of devices in a cost effective manner.

One of the problems associated with content delivery over a broadcast medium, such as radio signals, is that the data is subject to loss, interference and corruption. Backup of the delivery by unicast may correct for known delivery problems; however, in some cases this mode of delivery eliminates the cost savings inherent to the multicast content delivery technology. Thus, a balance is necessary between multicast retransmission and unicast delivery which minimizes costs.

Likewise, by making the delivery of content error tolerant, the need for retransmission may be greatly reduced. Most media includes some error. For example, newspapers include small tears and smudges; television includes artifacts, blurs and missing frames; and audio radio includes static. Even though the delivery of content is not 100%, there is an acceptance by the user. The level of error in media does not linearly relate to the value a user feels the content provides. Thus, content only needs to meet an acceptable threshold in order to be perceived by the user as properly delivered. By matching the error tolerance in the delivery of content to this acceptable user expectation, the need for perfect transmission is greatly reduced, as is the need for retransmissions of damaged files or data blocks.

Another problem associated with content delivery over a broadcast medium, such as radio signals, is that the data needs to be common to all end users. This leads to complications when dealing with Data Rights Management (DRM). DRM is a generic term for access control technologies that can be used by hardware manufacturers, publishers, copyright holders and individuals to impose limitations on the usage of digital content and devices. The term is used to describe any technology that inhibits uses of digital content not desired or intended by the content provider. Many forms of DRM rely upon unique versions of content being distributed to each end user. Thus, distribution of DRM content via broadcast typically is problematic at best. Special processing is required to effectively deliver DRM content over a multicast transmission.

A. Statistical Preemptive Retransmission

As noted above, radio transmission is subject to interference and data loss. For any given location, a statistical probability of delivery may be modeled (or empirically measured). Thus, a given receiver may have an X % probability of receiving any single transmission. One method to address data loss is to repetitively transmit the content. After sufficient retransmissions over the radio spectrum, receivers still missing the content may instead receive the content via a unicast transmission. The key of this process is to balance the multicast transmissions and the required unicast deliveries in such a way as to minimize total costs.

Figure 24:
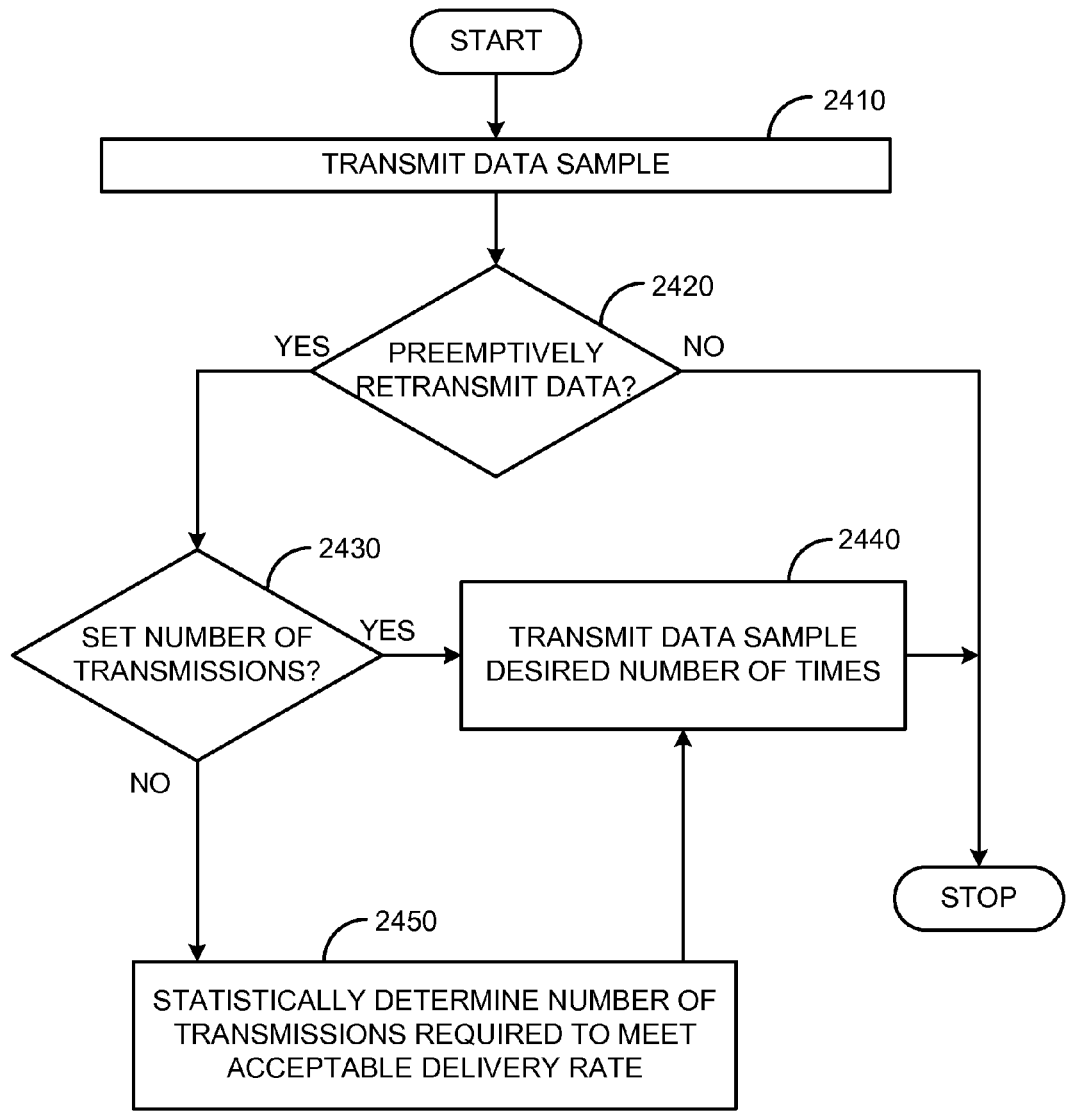
FIG. 24 is an example flowchart for preemptive retransmission of content in accordance with some embodiments of the present invention.

FIG. 24 is an example flowchart for preemptive retransmission of content in accordance with some embodiments of the present invention. Here the data is transmitted at step 2410. Then the process continues to step 2420 where an inquiry is made whether to preemptively retransmit the data. Some data is not sensitive, and non-delivery to some receivers is considered acceptable. For example, an advertisement may be transmitted. Assume that the probability of delivery in the given area is 90%. One transmission of the ad thus reaches 90% of consumers. Two transmissions reach 99% of consumers; however, the advertisement then costs twice as much in transmission costs for a relatively small coverage gain (additional 9%). In these circumstances, a single transmission is all that is desired.

However, if the user is paying for the content, or if the content is particularly important, such as an emergency notification or firmware update, then more complete delivery is necessary. If retransmission is desired, the process may progress to step 2430 where an inquiry is made whether a set number of transmission is to be utilized. In some cases, average delivery statistics may be utilized to generate tables for delivery retransmission numbers. Instead of calculating the optimal number of retransmissions for every given broadcast, the delivery tables may be simply used in order to look up the number of retransmissions that will likely work best. This information may then be utilized at step 2440 to retransmit the data the desired number of times.

Otherwise, in some instances it may be desired to not utilize presets, but rather calculate the optimal number of retransmissions using delivery statistics. This may be performed at step 2450. Once the number of retransmissions is calculated, the information may then be utilized at step 2440 to retransmit the data the desired number of times.

Optimization of retransmission rates may be performed by solving for a cost algorithm. For example, cost may be given by the following equation:

$$C(n) = M \times n + (1-P)^n \times R \times U;$$

where:
M=cost of the multicast transmission;
U=cost of the unicast transmission;
n=number of multicast transmissions;
P=the probability of receipt of the data per receiver device for the multicast transmission; and
R=total number of the plurality of receiver devices.

Thus, in this example equation it may be seen that n, the number of multicast transmissions, is the only variable. Multicast transmission cost, cost per unicast transmission, probability of delivery and the number of receivers as all known values. Thus, the cost C(n) may be minimized for by varying the term n (multicast retransmissions) by whole number increments.

B. Error Tolerant Content Delivery

In addition to intelligently determining the most cost efficient number of retransmissions for the data, multicast delivery may be further improved by delivering content in an error tolerant manner. As noted above, the value perceived by the user for a given piece of media is not directly related to the quality of the content. When listening to the radio most people readily tolerate some static noise. Often this static noise isn't even noticed by the user until it hits a threshold level. After the threshold, the perceived value of the content drops dramatically, however. By understanding this perception, broadcast of content data may be performed with some level of error tolerance. Often, media content container formats include control structures (such as pointers) that render the content largely, or completely, unusable if damaged. On the other hand, other media container formats, such as are commonly used for streaming media, are designed so that losses of small portions of the data stream only have a negative impact on the content contained locally to those losses. Therefore, it can often be advantageous to convert the content files from non-streaming formats into streaming formats for transmission over a lossy medium, and then reconstituting the original file type on the receiver end. The original file and the reconstituted file may differ slightly, incorporating errors encountered during transmission; however this conversion process prevents large-scale damage to the content, removing requirements for error-free reception of non-error-tolerant container format files.

Figure 25:
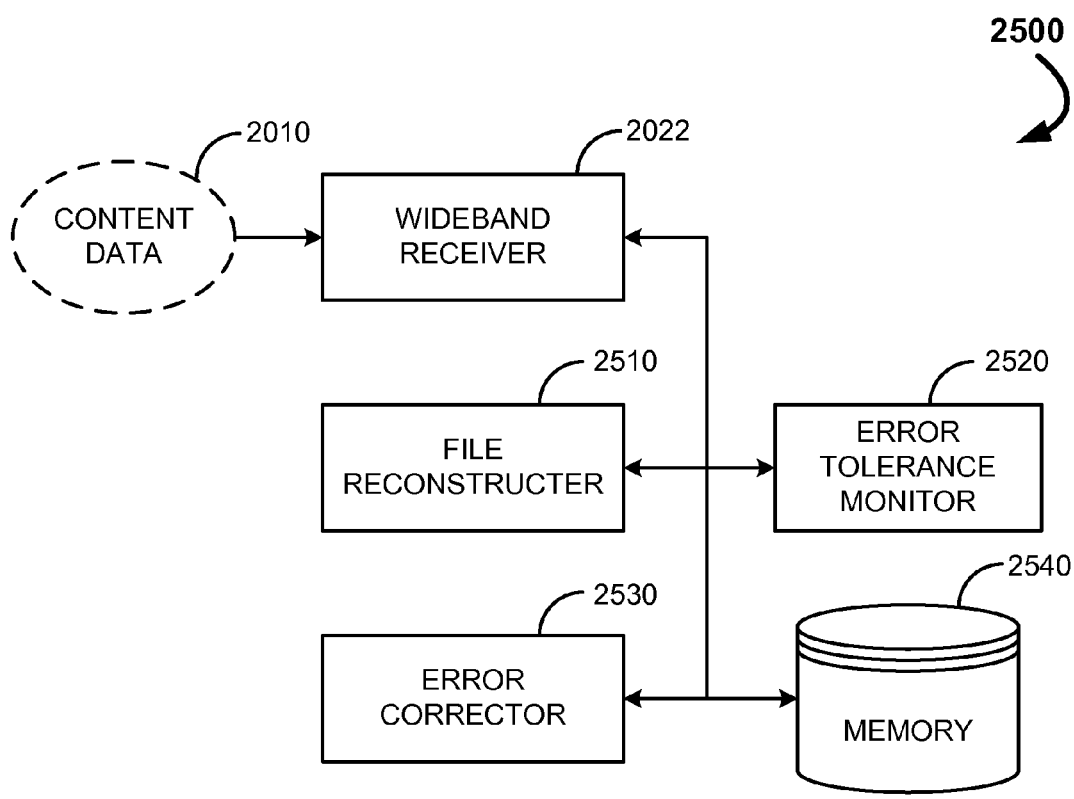
FIG. 25 is an example block diagram for an error tolerant content receiver system in accordance with some embodiments of the present invention.

FIG. 25 is an example block diagram for an error tolerant content receiver system in accordance with some embodiments of the present invention. Here the content Data 2010 is being received by the Wideband Receiver 2022. For error tolerant data transmission, the Data 2010 may be transmitted in a streaming format. An Error Tolerance Monitor 2520 may identify uncorrectable fatal errors in the content. For example, control data for the content file cannot include errors since this may shift the read frame. If a fatal error is identified, that portion of the transmission may be discarded and the system may await another transmission of the content (or delivery via unicast).

Likewise, the Error Tolerance Monitor 2520 may also identify the file type, number of uncorrectable (but nonfatal) errors in the content, and error locations. This information may be compared against error tolerances to determine if the content meets user expectations. These tolerances may be based as a percentage of total data (i.e., 5% pixel loss in an image).

Different data types may have differing error tolerances. For example, audio content may include more error than video, and video more than still images. Likewise, source or subscription level may impact error tolerances. For example, a premium subscriber to Sports Illustrated® may require minimal to no errors within the content, whereas a free subscription to local news may tolerate a higher error rate. Lastly, the location of errors may have an impact on tolerance. For example missing pixels in the periphery of an image may be tolerable to a greater degree than errors in the center of the image. Likewise, clustered errors may be tolerated less than the same number of errors distributed throughout a text document. Thus, the Error Tolerance Monitor 2520 may perform differing levels of error tolerance analysis on a given data sample. If errors in the data are found above tolerances, the system may discard the sample in favor of a retransmitted copy (or unicast delivery).

An Error Corrector 2530 may attempt to correct for errors. Error correction methodologies are currently well known, and will not be discussed in great detail here for the sake of brevity. For text files, basic spelling and grammar checking algorithms may be utilized to correct for missing letters and/or words. Cloning technology may be utilized to repair damaged video feeds and damaged still pictures. Filters may be utilized for audio errors, as well.

A File Reconstructer 2510 may receive the corrected streaming Data 2010 and convert the file back into its original file format. This action generates a new file with errors included within the content. Uncorrectable errors may be replaced with generic data. For example, a grey pixel in an image, or a symbol for missing text. The error tolerant file may then be stored within Memory 2540 for subsequent consumption by the user.

Figure 26:
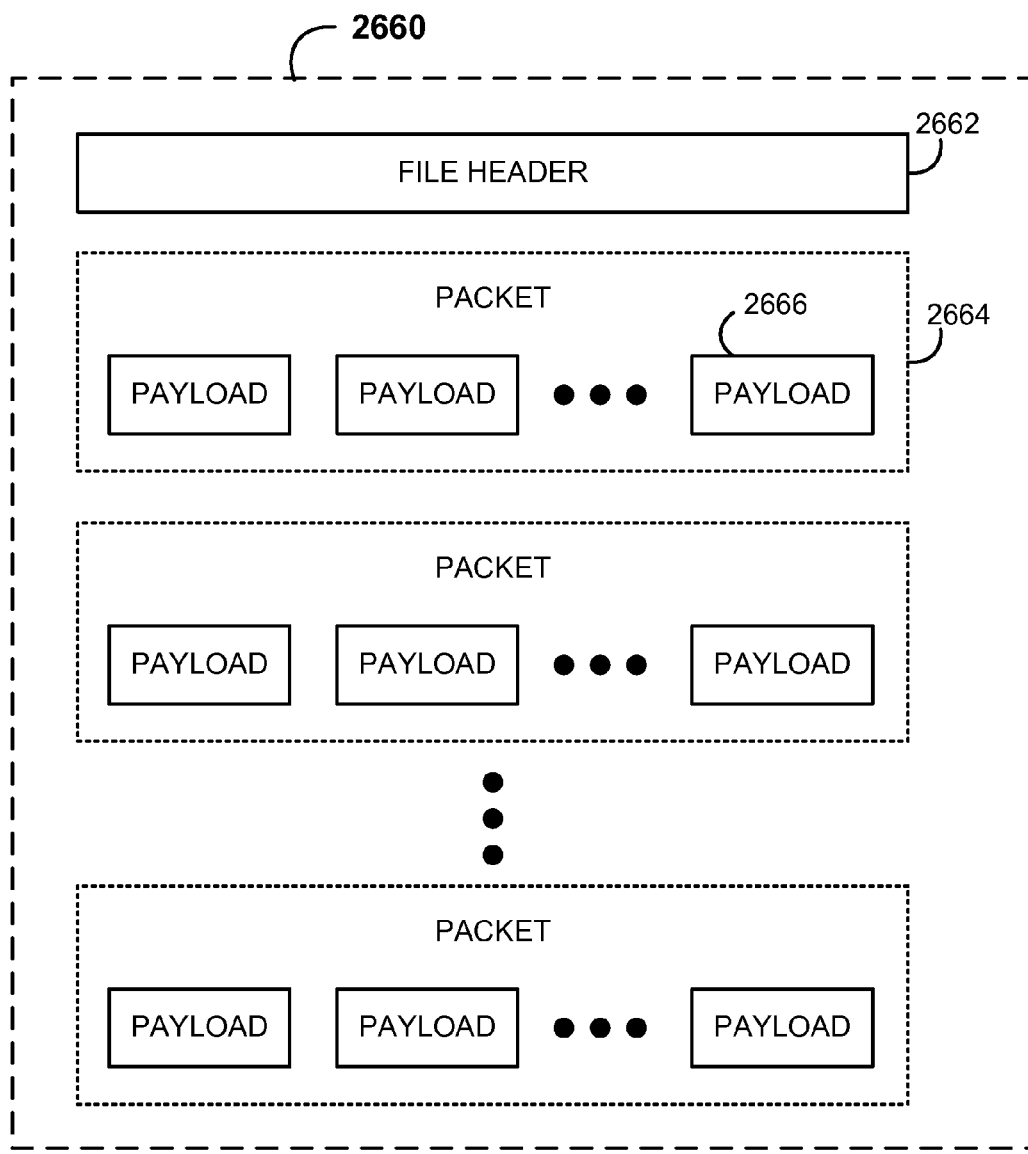
FIG. 26 is an example file structure diagram for error tolerant transmitting of content in accordance with some embodiments of the present invention.

FIG. 26 is an example File Diagram 2660 for error tolerant transmitting of content in accordance with some embodiments of the present invention. In this file structure there is a File header 2662 and a plurality of Packets 2664. Within each Packet 2664 are one or more Payloads 2666.

The file header may take the form of:

TABLE 3

| File Header | | | | |
|---|---|---|---|---|
| 00000030 | 5660d7cb-03db-44c4-8907-01a8dc7a9bac | 00000000 | | |
| Length (32) | UUID (128b) | Version (32b) | File Length (64b) | File content SHA1 (160b) |

In this example file header, the Universally Unique Identifier (UUID) may include a fixed value, here 5660d7cb-03db-44c4-8907-01a8dc7a9bac. A version number is provided; as is the source file length and source file Secure Hash Algorithm (SHA).

The packet structure, in some embodiments, may take the form of:

TABLE 4

| Packet Structure | | |
|---|---|---|
| 0x00 Header (8b) | frame type Reserved (8b) | Length (16b) |

In some embodiments, the maximum packet size may be restricted to 4 KB in size. A fixed header value (0x00) may be utilized in some embodiments. Additional information may be encoded in the reserved section. For some embodiments the reserved portion of the packet may be used to store the frame type.

Lastly, the payload structure, in some embodiments, may take the form of:

TABLE 5

Payload Structure

| Offset (32b) | Length (16b) | data |
|---|---|---|

The offset is the physical source file offset. The data chunk is encoded the content data. Thus, any given packet may include multiple data chunks.

Figure 27A:
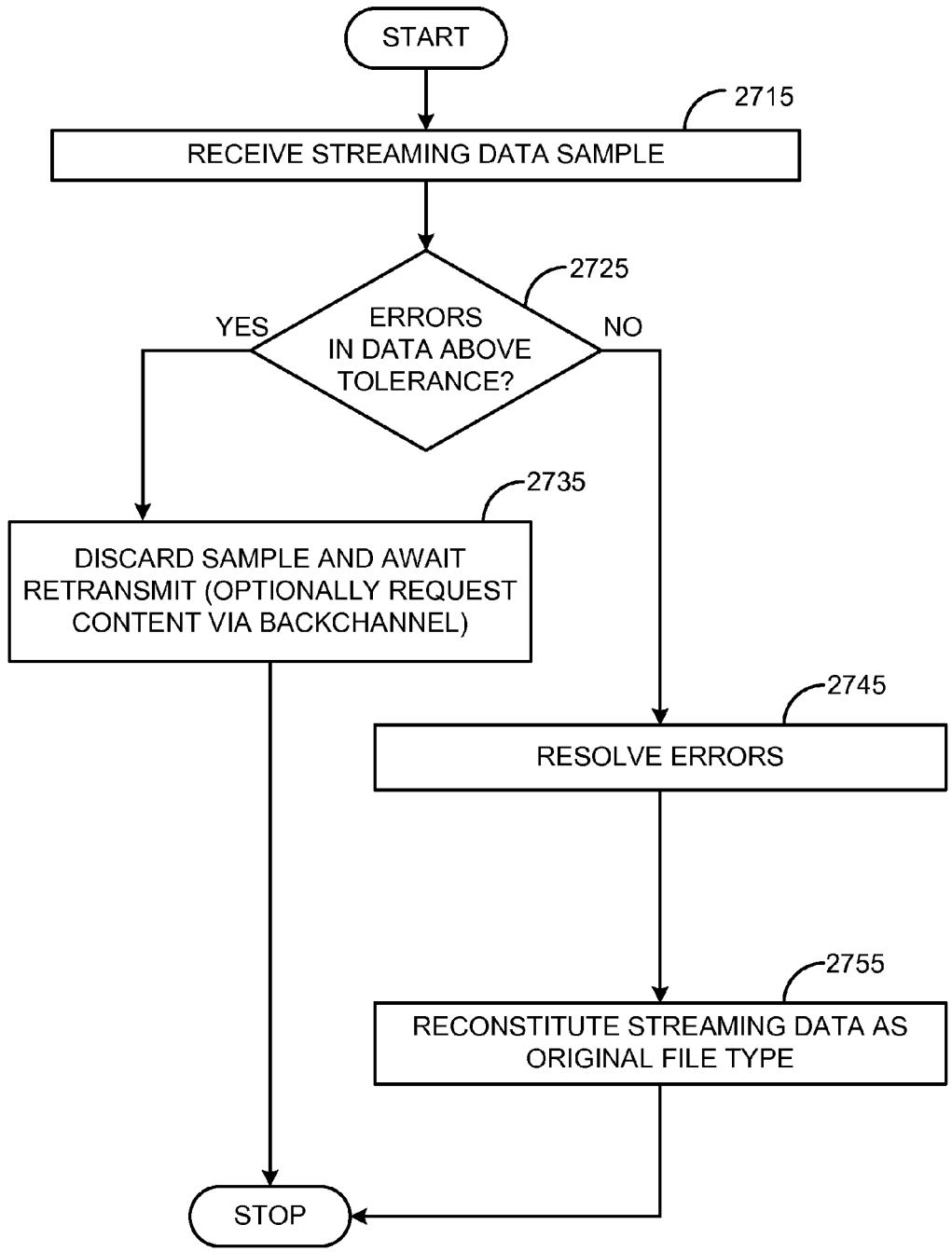
FIG. 27A is an example flowchart for error tolerant receiving of content in accordance with some embodiments of the present invention.

FIG. 27A is an example flowchart for receiving error tolerant content in accordance with some embodiments of the present invention. In this method, the streaming data sample is received at step 2715. After receipt of the streaming data samples, the process progresses to step 2725 where an inquiry is made whether errors in the streaming data are above tolerances. This inquiry is performed as indicated above. Fatal errors are first identified. These errors exist within the control logic of the file and, if present, render the file unusable. If a fatal error is identified, then the errors are above tolerance levels. Likewise, if the total number of non-correctable errors is above an acceptable level, then the errors in the data may also be above the tolerance. In determining how many errors are "too many" the system may be enabled to consider the file type, location of errors, and user expectations.

If errors are beyond tolerances, then the process progresses to step 2725 where the sample is discarded and the method awaits retransmission of the content. Alternatively, the system may signal that the transmission failed (via a backchannel) and receive the content via unicast or other redundant delivery method.

Otherwise, if the errors in the streaming file are not beyond tolerances, then the system may retain the file. This may include resolving errors (at step 2745) and reconstituting the streaming samples as the original file type (at step 2755).

Error resolution may include replacing correctable errors with new data and replacing erroneous data with generic placeholders where the error is not correctable. Error correction is known in the art, as stated earlier. Spelling and grammar checks, image cloning and filtering may be utilized to correct errors.

Figure 27B:
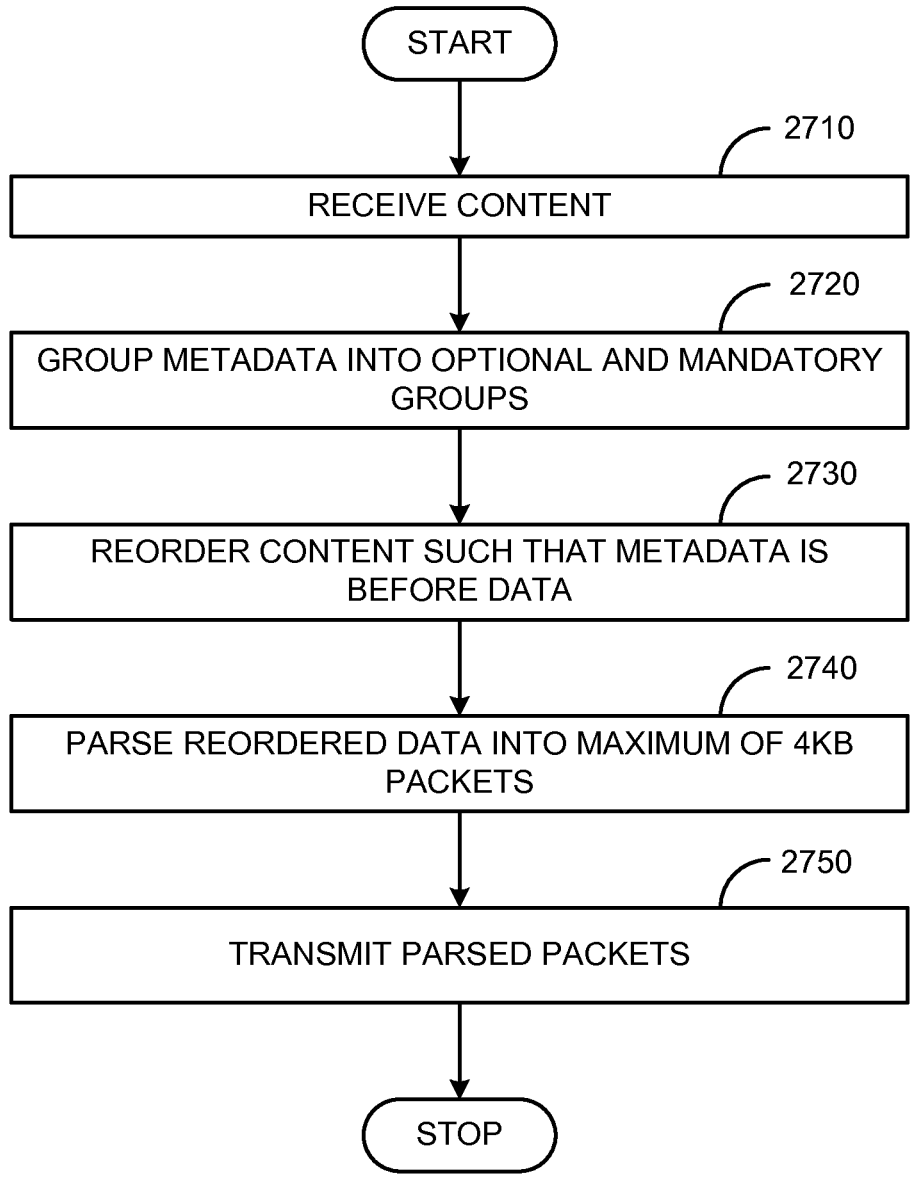
FIG. 27B is an example flowchart for error tolerant transmitting of content in accordance with some embodiments of the present invention.

Now the discussion will turn to FIG. 27B, which is an example flowchart for error tolerant transmission of content. This process begins with the receipt of content data, at step 2710. Content may be received from a distributor, publisher, database, user upload, or the like.

Metadata within the received content may be identified and grouped as either optional or mandatory metadata at step 2720. The file may then be reordered such that the metadata is before the data of the content, at step 2730.

The newly reordered file may then be parsed into packets at step 2740. Packet size may be limited to 4 kB each. Finally, the streaming file may be transmitted at step 2750.

In another embodiment, error-intolerant file content, such as control structures, may be preemptively retransmitted or be encoded with forward-error correction techniques to increase the probability of error-free reception of this critical content (at the cost of increased transmission capacity use), while not burdening the more error-tolerant content with these increased capacity use costs.

C. Transmission of DRM Content

As previously noted, the e-reader (or E-book) space could greatly benefit from multicast delivery as the media being delivered becomes more "rich" due to financial constraints of large file unicast delivery. However, many electronic publications are subject to Data Rights Management (DRM). Furthermore, many other types of media are subject to DRM as well. This includes some music media, digital videos, gaming media, and the like.

As was previously mentioned, many DRM schemes rely upon a small header portion of the content being uniquely encrypted for each receiver, this header portion often contains the key required to decrypt the main portion of the content. The main content is also encrypted; however, this encryption is typically performed on a distributor level (i.e., common to all users). Thus, the common portion (content) of the file is generally large, whereas the unique portion (header) is relatively small in size. This approach to DRM is currently being used by file formats AZW (Kindle®), Mobipocket (Windows®, Windows Mobile®, Blackberry®, Symbian®, Palm OS®), ePUB (Nook®, Sony®, I-river®, iPhone/Stanza®) and PDF (Kindle®, Sony®, Nook®, I-river®, iPhone/Stanza®). Note that AZW is a very close cousin of Mobipocket, which is owned by Amazon®.

Figure 28:
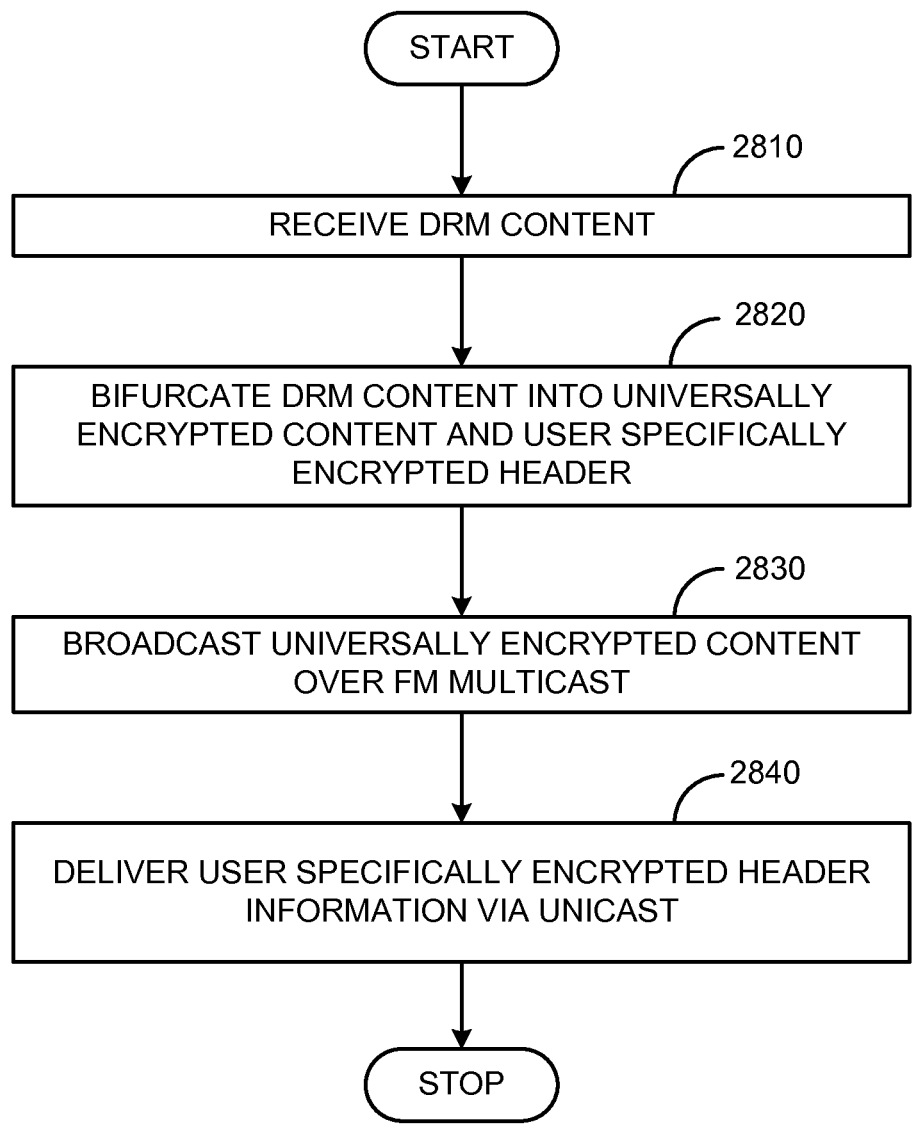
FIG. 28 is an example flowchart for transmitting of data rights management content in accordance with some embodiments of the present invention.

FIG. 28 is an example flowchart for transmitting of data rights management content in accordance with some embodiments of the present invention. In this process the DRM content is received from a distributor or publisher, at step 2810. The DRM file is then bifurcated into the universally encrypted content (common to all users) and the unique user specific encrypted header (at step 2820).

The universally encrypted content may then be multicast to all users over radio frequency carriers, at step 2830. In contrast, each uniquely encrypted file header is then delivered to its corresponding end device using unicast delivery, at step 2840. This aids in reducing delivery cost because the larger portion of the file is being delivered by multicast, whereas only a very small unique portion is delivered via unicast methods.

Figure 29:
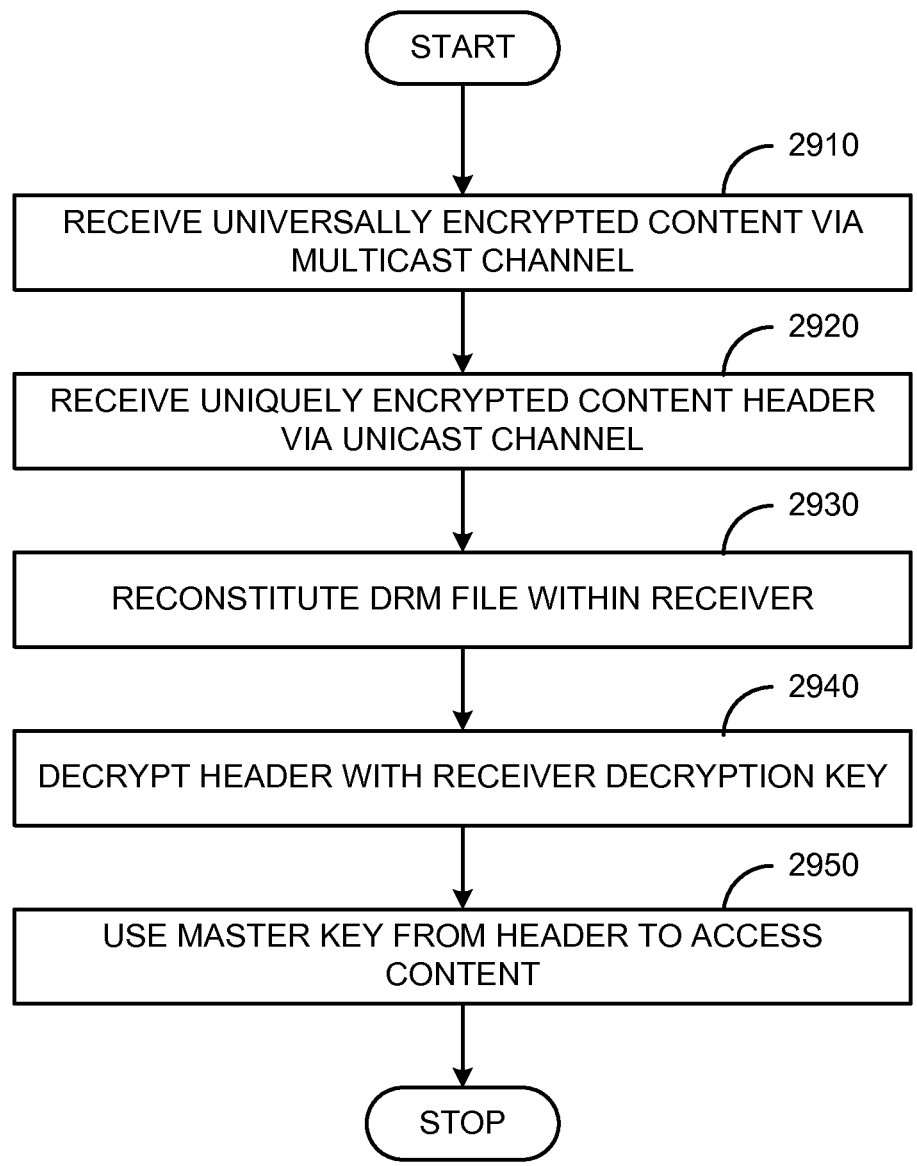
FIG. 29 is an example flowchart for the receiving of data rights management content in accordance with some embodiments of the present invention.

FIG. 29 is an example flowchart for receiving the data rights management content in accordance with some embodiments of the present invention. Here the universally encrypted content is received via a multicast receiver at step 2910. Likewise, the unicast receiver may receive the uniquely encrypted content header, at step 2920.

The original DRM file may then be reconstituted using the content and header, at step 2930. Decryption key(s) within the receiver may be utilized to decrypt the unique header, at step 2940. Part of the header may include a DRM decryption key (master key) which may subsequently be utilized in order to decrypt the body of the content, at step 2950.

In sum, systems and methods for reducing cost and power requirements when delivering content over a multicast broadcast medium are provided. While a number of specific examples have been provided to aid in the explanation of the present invention, it is intended that the given examples expand, rather than limit the scope of the invention. For example, in addition to the techniques described in the application for carrier spacing, frequency modulation and carrier types, it is considered within the scope of the invention to use alternate reasonable methods of data transmission, carrier channel generation and the like. Although sub-section titles have been provided to aid in the description of the invention, these titles are merely illustrative and are not intended to limit the scope of the present invention.

While the system and methods has been described in functional terms, embodiments of the present invention may include entirely hardware, entirely software or some combination of the two. Additionally, manual performance of any of the methods disclosed is considered as disclosed by the present invention. Moreover, particular methodologies described in the detailed description are intended to be exemplary in nature. Known alternatives may be utilized as is desirable in any given circumstance. For example, while error tolerance of streaming content is described separately from low power operation of a device using a narrowband channel, it is equally likely that a receiver device may be enabled to perform both these functionalities.

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A method for error tolerant delivery of transmitted data to a plurality of receiver devices, useful in association with a transmitter configured to periodically transmit data associated with the plurality of receiver devices, the method comprising:
    receiving a file for transmission, wherein the file includes metadata and data;
    grouping optional portions of the metadata into optional groups;
    grouping mandatory portions of the metadata into mandatory groups;
    parsing the file into packets;
    transmitting the parsed packets to a plurality of receiver devices;
    determining a probability of receipt of the transmitted packets per receiver device of the plurality of receiver devices;
    determining a multicast cost of transmission of the packets using the multicast platform;
    determining a unicast cost of transmitting the packets to one receiver device of the plurality of receiver devices using a unicast transmission mechanism;
    minimizing cost of packet delivery, wherein the minimization includes the multicast cost, the unicast cost, and the probability of receipt of the packets per receiver device, and wherein the minimizing cost of packet delivery includes determining an optimal number of multicast retransmissions, wherein minimizing cost of packet delivery includes minimizing an equation:

$$C(n) = M \times n + (1-P)^n \times R \times U;$$

where:
M=cost of the multicast transmission;
U=cost of the unicast transmission;
n=number of multicast transmissions;
P=the probability of receipt of the packet per receiver device for the multicast transmission; and
R=total number of the plurality of receiver devices; and
retransmitting the packets according to the computed optimal number of multicast retransmissions.

2. The method as recited in claim 1, wherein the mandatory portions of the metadata include file control data, and wherein the optional portions of the metadata include descriptive metadata.

3. The method as recited in claim 1, further comprising:
reordering the file such that metadata is before data; and
transmitting a file header prior to the parsed packets.

4. The method as recited in claim 1, wherein the packets include at least one payload.

5. The method as recited in claim 1, wherein the transmitting the parsed packets to a plurality of receiver devices includes a multicast transmission to the plurality of receiver devices and a unicast transmission to a subset of the plurality of receiver devices, wherein the subset of the plurality of receiver devices are devices which unsuccessfully received the multicast transmission.

6. The method as recited in claim 1, wherein the transmitting the parsed packets to a plurality of receiver devices includes multicast transmission to the plurality of receiver devices a set number of times.

7. The method as recited in claim 1, wherein the transmitting the parsed packets to a plurality of receiver devices includes multicast transmission to the plurality of receiver devices on a schedule, wherein frequency of multicast transmission exponentially decays according to the schedule.

8. The method as recited in claim 1, wherein the multicast platform includes frequency modulated radio transmissions.

9. The method as recited in claim 1, wherein the multicast platform includes transmitting the packets over a subsidiary communications authority subcarrier signal.

10. The method as recited in claim 1, wherein the unicast transmission mechanism includes transmission of the packets over a cellular network.

* * * * *